(12) United States Patent
Liu et al.

(10) Patent No.: US 8,658,747 B2
(45) Date of Patent: *Feb. 25, 2014

(54) WETTABLE SILICONE HYDROGEL CONTACT LENSES

(71) Applicant: CooperVision International Holding Company, LP, St. Michael (BB)

(72) Inventors: Yuwen Liu, Dublin, CA (US); Charlie Chen, San Ramon, CA (US); Charles A. Francis, Union City, CA (US); Junhao Ge, Fremont, CA (US); Yuan Xu, Fremont, CA (US); Li Yao, San Ramon, CA (US); Arthur Back, Danville, CA (US); Ying Zheng, Pleasanton, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/906,367

(22) Filed: May 31, 2013

(65) Prior Publication Data

US 2013/0255192 A1    Oct. 3, 2013

Related U.S. Application Data

(63) Continuation of application No. 13/404,037, filed on Feb. 24, 2012, now Pat. No. 8,487,058.

(60) Provisional application No. 61/447,176, filed on Feb. 28, 2011.

(51) Int. Cl.
C08F 230/06    (2006.01)
C08F 290/06    (2006.01)
G02B 1/04    (2006.01)

(52) U.S. Cl.
USPC ..................... 526/279; 523/106; 523/107

(58) Field of Classification Search
None
See application file for complete search history.

(56) References Cited

U.S. PATENT DOCUMENTS

| | | | |
|---|---|---|---|
| 2,393,266 A | 1/1946 | Riddell | |
| 2,989,894 A | 6/1961 | Gordon | |
| 3,228,741 A | 1/1966 | Becker | |
| 3,246,941 A | 4/1966 | Moss | |
| 3,431,046 A | 3/1969 | Conrad et al. | |
| 3,594,074 A | 7/1971 | Rosen | |
| 3,808,178 A * | 4/1974 | Gaylord | 526/279 |
| 3,907,851 A | 9/1975 | Boersma et al. | |
| 4,099,859 A | 7/1978 | Merrill | |
| 4,121,896 A | 10/1978 | Shepherd | |
| 4,136,250 A | 1/1979 | Mueller et al. | |
| 4,182,822 A | 1/1980 | Chang | |
| 4,208,365 A | 6/1980 | LeFevre | |
| 4,217,038 A | 8/1980 | Letter et al. | |
| 4,246,389 A | 1/1981 | LeBoeuf | |
| 4,259,467 A | 3/1981 | Keogh et al. | |
| 4,260,725 A | 4/1981 | Keogh et al. | |
| 4,293,397 A | 10/1981 | Sato et al. | |
| 4,353,849 A | 10/1982 | Lewison | |
| 4,401,371 A | 8/1983 | Neefe | |
| 4,440,918 A | 4/1984 | Rice et al. | |
| 4,487,905 A | 12/1984 | Mitchell | |
| 4,602,074 A * | 7/1986 | Mizutani et al. | 526/245 |
| 4,605,712 A | 8/1986 | Mueller et al. | |
| 4,640,594 A | 2/1987 | Berger | |
| 4,649,184 A | 3/1987 | Yoshikawa et al. | |
| 4,703,097 A | 10/1987 | Wingler et al. | |
| 4,711,943 A | 12/1987 | Harvey, III | |
| 4,879,072 A | 11/1989 | Bourset et al. | |

(Continued)

FOREIGN PATENT DOCUMENTS

DE    2546692    4/1977
EP    0330616 A1    8/1989

(Continued)

OTHER PUBLICATIONS

Declaration of Eri Ito dated Mar. 30, 2010 (4 pages).
Suminoe et al., "Study of new non-water containing soft contact lenses, First Report: Basic physical properties of the material," 1983, pp. 100-104 (in Japanese with English translation attached) (18 pages).

(Continued)

Primary Examiner — Robert S Loewe
(74) Attorney, Agent, or Firm — Kilyk & Bowersox, P.L.L.C.

(57) ABSTRACT

Ophthalmically acceptably wettable silicone hydrogel contact lenses are described. The lenses are derived from a polymerizable composition including a first siloxane monomer represented by formula (1):

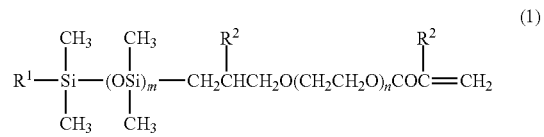

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, the first siloxane monomer having a number average molecular weight of from 400 daltons to 700 daltons; and a second siloxane monomer having a number average molecular weight greater than 7,000 daltons; wherein a total amount of siloxane monomers present in the polymerizable composition is from 30 unit parts to 50 unit parts; the lenses also include units derived from at least one hydrophilic amide monomer having one N-vinyl group that is present in the polymerizable composition in an amount from 30 to 60 unit parts. The lenses have ophthalmically acceptably wettable lens surfaces when fully hydrated. Batches of silicone hydrogel contact lenses and methods of making silicone hydrogel contact lenses are also described.

15 Claims, No Drawings

(56) References Cited

U.S. PATENT DOCUMENTS

| | | |
|---|---|---|
| 4,890,911 A | 1/1990 | Sulc et al. |
| 4,954,586 A | 9/1990 | Toyoshima et al. |
| 5,009,497 A | 4/1991 | Cohen |
| 5,010,141 A | 4/1991 | Mueller |
| 5,023,305 A | 6/1991 | Onozuka et al. |
| 5,034,461 A | 7/1991 | Lai et al. |
| 5,070,169 A | 12/1991 | Robertson et al. |
| 5,079,319 A | 1/1992 | Mueller |
| 5,104,213 A | 4/1992 | Wolfson |
| 5,158,717 A | 10/1992 | Lai |
| 5,166,710 A | 11/1992 | Hofer et al. |
| 5,258,490 A | 11/1993 | Chang |
| 5,260,000 A | 11/1993 | Nandu et al. |
| 5,274,008 A | 12/1993 | Lai |
| 5,312,690 A | 5/1994 | Fukuda et al. |
| 5,314,960 A | 5/1994 | Spinelli et al. |
| 5,321,108 A | 6/1994 | Kunzler et al. |
| 5,347,326 A | 9/1994 | Volk |
| 5,352,714 A | 10/1994 | Lai et al. |
| 5,358,995 A | 10/1994 | Lai et al. |
| 5,387,632 A | 2/1995 | Lai et al. |
| 5,451,617 A | 9/1995 | Lai et al. |
| 5,483,304 A | 1/1996 | Porat |
| 5,486,579 A | 1/1996 | Lai et al. |
| 5,496,871 A | 3/1996 | Lai et al. |
| 5,539,016 A | 7/1996 | Kunzler et al. |
| 5,598,233 A | 1/1997 | Haralambopoulos et al. |
| 5,641,437 A | 6/1997 | Williams et al. |
| 5,712,327 A | 1/1998 | Chang et al. |
| 5,760,100 A | 6/1998 | Nicolson et al. |
| 5,776,999 A | 7/1998 | Nicolson et al. |
| 5,789,461 A | 8/1998 | Nicolson et al. |
| 5,807,944 A | 9/1998 | Hirt et al. |
| 5,817,924 A | 10/1998 | Tuomela et al. |
| 5,849,811 A | 12/1998 | Nicolson et al. |
| 5,945,498 A | 8/1999 | Hopken et al. |
| 5,959,117 A | 9/1999 | Ozark et al. |
| 5,962,548 A | 10/1999 | Vanderlaan et al. |
| 5,965,631 A | 10/1999 | Nicolson et al. |
| 5,969,076 A | 10/1999 | Lai et al. |
| 5,981,675 A | 11/1999 | Valint, Jr. et al. |
| 5,998,498 A | 12/1999 | Vanderlaan et al. |
| 6,020,445 A | 2/2000 | Vanderlaan et al. |
| 6,031,059 A * | 2/2000 | Vanderlaan et al. .......... 526/279 |
| 6,043,328 A | 3/2000 | Domschke et al. |
| 6,288,129 B1 * | 9/2001 | Gruning et al. ................. 516/23 |
| 6,310,116 B1 | 10/2001 | Yasuda et al. |
| 6,359,024 B2 | 3/2002 | Lai |
| 6,367,929 B1 | 4/2002 | Maiden et al. |
| 6,436,481 B1 | 8/2002 | Chabrecek et al. |
| 6,638,991 B2 | 10/2003 | Baba et al. |
| 6,649,742 B1 | 11/2003 | Better et al. |
| 6,652,095 B2 | 11/2003 | Tung |
| 6,689,480 B2 | 2/2004 | Shimoyama et al. |
| 6,727,336 B1 | 4/2004 | Ito et al. |
| 6,779,888 B2 | 8/2004 | Marmo |
| 6,822,016 B2 * | 11/2004 | McCabe et al. ............... 523/107 |
| 6,849,671 B2 | 2/2005 | Steffen et al. |
| 6,861,123 B2 | 3/2005 | Turner et al. |
| 6,867,245 B2 | 3/2005 | Iwata et al. |
| 6,886,936 B2 | 5/2005 | Marmo et al. |
| 6,891,010 B2 | 5/2005 | Kunzler et al. |
| 6,902,812 B2 | 6/2005 | Valint, Jr. et al. |
| 6,921,802 B2 | 7/2005 | Kunzler et al. |
| 6,940,580 B2 | 9/2005 | Winterton et al. |
| 6,943,203 B2 | 9/2005 | Vanderlaan et al. |
| 6,951,894 B1 | 10/2005 | Nicolson et al. |
| 6,992,118 B2 | 1/2006 | Sulc et al. |
| 7,426,993 B2 | 9/2008 | Coldrey et al. |
| 7,540,609 B2 | 6/2009 | Chen et al. |
| 7,572,841 B2 | 8/2009 | Chen et al. |
| 7,934,830 B2 | 5/2011 | Blackwell et al. |
| 2002/0005933 A1 * | 1/2002 | Imafuku ........................ 351/177 |
| 2002/0016383 A1 | 2/2002 | Iwata et al. |
| 2002/0107324 A1 | 8/2002 | Vanderlaan et al. |
| 2002/0120084 A1 | 8/2002 | Valint, Jr. et al. |
| 2002/0137811 A1 | 9/2002 | Turek et al. |
| 2003/0008154 A1 | 1/2003 | Aguado et al. |
| 2003/0039748 A1 | 2/2003 | Valint, Jr. et al. |
| 2003/0095232 A1 | 5/2003 | Mitsui |
| 2003/0109390 A1 | 6/2003 | Salpekar et al. |
| 2003/0109637 A1 | 6/2003 | Kunzler et al. |
| 2003/0125498 A1 | 7/2003 | McCabe et al. |
| 2003/0134132 A1 | 7/2003 | Winterton et al. |
| 2003/0162862 A1 | 8/2003 | McCabe et al. |
| 2004/0039077 A1 | 2/2004 | Baba et al. |
| 2005/0053642 A1 | 3/2005 | Ulbricht et al. |
| 2005/0154080 A1 | 7/2005 | McCabe et al. |
| 2005/0165187 A1 | 7/2005 | Kunzler et al. |
| 2005/0179862 A1 | 8/2005 | Steffen et al. |
| 2005/0228065 A1 | 10/2005 | Nicolson et al. |
| 2006/0001184 A1 | 1/2006 | Phelan et al. |
| 2006/0007391 A1 | 1/2006 | McCabe et al. |
| 2006/0012751 A1 | 1/2006 | Rosenzweig et al. |
| 2006/0063852 A1 | 3/2006 | Iwata et al. |
| 2006/0072069 A1 | 4/2006 | Laredo et al. |
| 2006/0074208 A1 | 4/2006 | Laredo |
| 2007/0066706 A1 | 3/2007 | Manesis et al. |
| 2007/0155851 A1 * | 7/2007 | Alli et al. ....................... 523/106 |
| 2007/0231292 A1 | 10/2007 | Vanderlaan et al. |
| 2007/0291223 A1 | 12/2007 | Chen et al. |
| 2007/0296914 A1 | 12/2007 | Hong et al. |
| 2008/0048350 A1 | 2/2008 | Chen et al. |
| 2008/0067702 A1 | 3/2008 | Yao et al. |
| 2009/0018233 A1 | 1/2009 | Nunez et al. |
| 2009/0234089 A1 | 9/2009 | Ueyama et al. |
| 2009/0299022 A1 | 12/2009 | Ichinohe |
| 2010/0084775 A1 | 4/2010 | McCabe et al. |
| 2011/0009587 A1 | 1/2011 | Awasthi et al. |
| 2012/0220744 A1 | 8/2012 | Liu et al. |

FOREIGN PATENT DOCUMENTS

| | | |
|---|---|---|
| EP | 0330617 A1 | 8/1989 |
| EP | 0908476 A2 | 4/1999 |
| EP | 0908744 A1 | 4/1999 |
| EP | 1870736 A1 | 12/2007 |
| GB | 1399301 | 7/1975 |
| JP | 54-081363 | 5/1979 |
| JP | 59-078236 | 5/1984 |
| JP | 63-297411 | 12/1988 |
| JP | 64-084219 | 3/1989 |
| JP | 05-019214 | 1/1993 |
| JP | 06-170857 | 6/1994 |
| JP | 08-025378 | 1/1996 |
| JP | 08-245737 | 9/1996 |
| JP | 08-245790 | 9/1996 |
| JP | 08-304746 | 11/1996 |
| JP | 11-320699 | 11/1999 |
| JP | 2001-055446 | 2/2001 |
| WO | 91-04283 A1 | 4/1991 |
| WO | 93-05085 A1 | 3/1993 |
| WO | 2009-009527 A1 | 1/2009 |
| WO | 2011-037893 A2 | 3/2011 |
| WO | 2011-041523 A2 | 4/2011 |

OTHER PUBLICATIONS

Communication of a notice of opposition for European Patent Application No. 00981765.1 issued by the European Patent Office dated Jun. 2, 2010 (1 page).

John Wiley & Sons, Inc., "Polyesters, Films," Encyclopedia of Polymer Science and Engineering, vol. 12, pp. 193-200, 217, and 225-229 (17 pages).

Holden et al., "Critical Oxygen Levels to Avoid Corneal Edema for Daily and Extended Wear Contact Lenses," Investigative Ophthalmology & Visual Science, vol. 25, Oct. 1984, pp. 1161-1167 (7 pages).

Terry et al., "CCLRU Standards for Success of Daily and Extended Wear Contact Lenses," Optometry and Vision Science, vol. 70, No. 3, pp. 234-243 (10 pages).

Jones et al., "Silicone hydrogel contact lenses Part 1 Evolution and current status," www.optometry.co.uk, pp. 26-32, Sep. 20, 2002 (7 pages).

(56) References Cited

OTHER PUBLICATIONS

Grant et al., "The Oxygen Transmissibility Profile of Siloxane Hydrogel Contact Lenses," (Poster presentation obtained from the Internet in Oct. 2005. Applicant is unaware of the publication date of the poster, but according to document properties of the electronic poster, it was created and last modified in 2002) (3 pages).

Steffen et al., "Finding the Comfort Zone With the Newest Silicone Hydrogel Technology," Contact Lens Spectrum (obtained from the internet in Oct. 2005; applicant is unaware of the publication date) (5 pages).

Nicolson et al., "Soft contact lens polymers: an evolution," Biomaterials, No. 22, 2001, pp. 3273-3283 (11 pages).

Bausch & Lomb (R) PureVision (TM) Contact Lenses (product information page dated Apr. 21, 1999) (1 page).

"Ciba promotes merits of new 30-night lens," (applicant is unaware of publisher and date of this article) (1 page).

Grobe III, et al., "Surface chemical structure for soft contact lenses as a function of polymer processing," Journal of Biomedical Materials Research, vol. 32, 1996, pp. 45-54 (10 pages).

Extended European Search Report issued in corresponding European Patent Application No. 12156774.7, dated May 31, 2012 (3 pages).

International Search Report and Written Opinion issued in corresponding International Patent Application No. PCT/US2012/026215, dated Jun. 7, 2012 (15 pages).

International Preliminary Report on Patentability issued in corresponding International Patent Application No. PCT/US12/126215 mailed Feb. 8, 2013 (with Article 34 claims) (18 pages).

\* cited by examiner

WETTABLE SILICONE HYDROGEL CONTACT LENSES

This application is a continuation of U.S. patent application Ser. No. 13/404,037, filed Feb. 24, 2012, which claims the benefit under 35 U.S.C. §119(e) of prior U.S. Provisional Patent Application No. 61/447,176, filed Feb. 28, 2011, which is incorporated in its entirety by reference herein.

FIELD

The present disclosure is directed to silicone hydrogel contact lenses and related compositions and methods.

BACKGROUND

Commercially and clinically, silicone hydrogel contact lenses are a popular alternative to conventional hydrogel contact lenses (i.e., hydrogel contact lenses that do not contain silicone or silicone-containing ingredients). The presence of siloxanes in silicone hydrogel contact lens formulations is believed to affect the properties of silicone hydrogel contact lenses obtained therefrom. For example, it is believed that the presence of a siloxane component in a contact lens results in a relatively higher oxygen permeability compared to a conventional hydrogel contact lens without a siloxane component. In addition, it is believed that the presence of a silicone component increases the likelihood of hydrophobic domains being present on the lens surface of a silicone hydrogel contact lens as compared to a conventional hydrogel contact lens without a silicone component. The first generation of silicone hydrogel contact lenses provided high levels of oxygen, even though the wettability of the lenses tended to be lower than might be desired. Techniques have been developed to overcome the hydrophobicity issues of silicone hydrogel contact lens surfaces. Based on the popularity of silicone hydrogel contact lenses, there continues to be a need for new silicone hydrogel contact lenses that are ophthalmically compatible, such as new silicone hydrogel contact lenses having ophthalmically acceptable wettable surfaces.

Some documents describing silicone hydrogel contact lenses include: U.S. Pat. No. 4,711,943, U.S. Pat. No. 5,712,327, U.S. Pat. No. 5,760,100, U.S. Pat. No. 7,825,170, U.S. Pat. No. 6,867,245, US20060063852, US20070296914, US7572841, US20090299022, US20090234089, and US20100249356, each of which is incorporated in its entirety by reference herein.

SUMMARY

It has been discovered that miscible polymerizable compositions can be prepared using siloxane monomers having a particular structure in combination with high levels of one or more hydrophilic monomers. These polymerizable compositions can optionally comprise other siloxane monomers, as well as other polymerizable and non-polymerizable ingredients. These miscible polymerizable compositions, when used to prepare silicone hydrogel contact lenses, result in lenses having ophthalmically acceptable wettable surfaces.

The present disclosure relates to new silicone hydrogel contact lenses. A silicone hydrogel contact lens, in accordance with the present disclosure, comprises a polymeric lens body. The polymeric lens body is the reaction product of a polymerizable composition. The polymerizable composition comprises a plurality of lens forming ingredients, such that when the composition is polymerized, a polymeric lens body is obtained.

In one example, the present disclosure is directed to a miscible polymerizable composition used to produce the present silicone hydrogel contact lenses. The polymerizable composition comprises a first siloxane monomer represented by formula (1):

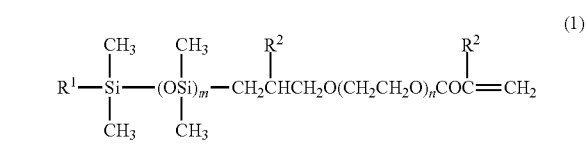

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, where the first siloxane monomer has a number average molecular weight of from 400 daltons to 700 daltons. The polymerizable composition also comprises a second siloxane monomer having a number average molecular weight greater than 7,000 daltons. A total amount of siloxane monomers (i.e., a total unit parts of the first siloxane monomer, the second siloxane monomer, and, if present, any additional siloxane monomers) present in the polymerizable composition is from 30 unit parts to 50 unit parts by weight. In addition to the two or more siloxane monomers, the polymerizable composition also comprises at least one hydrophilic amide monomer having one N-vinyl group (i.e., a vinyl amide monomer). The at least one hydrophilic monomer can comprise a single hydrophilic amide monomer having one N-vinyl group, or can comprise a combination of two or more hydrophilic vinyl amide monomers comprising a hydrophilic vinyl amide monomer component. The hydrophilic vinyl amide monomer component can comprise a first hydrophilic vinyl amide monomer and a second hydrophilic vinyl amide monomer. The hydrophilic vinyl amide monomer or monomer component is present in the polymerizable composition in an amount from 30 to 60 unit parts by weight. The ingredients of the polymerizable composition are present in amounts such that, when polymerized and hydrated, the polymerizable composition results in a silicone hydrogel contact lens having ophthalmically acceptably wettable lens surfaces.

The polymerizable composition can optionally also comprise at least one cross-linking agent. The polymerizable composition can optionally also comprise at least one polymerizable ingredient or non-polymerizable ingredient. Optionally, in the polymerizable compositions described herein, the first siloxane monomer and the second siloxane monomer can be present in the polymerizable composition in a ratio from about 2:1 to about 10:1 based on unit parts by weight. The polymerizable compositions comprising the first siloxane monomer and second siloxane monomers and at least one hydrophilic vinyl amide monomer as described above can further comprise an optional third siloxane monomer or an optional at least one cross-linking agent. The ingredients of the present polymerizable compositions can be miscible, even though high levels of the at least one hydrophilic vinyl amide monomer are present in the composition with a high total amount of siloxane monomers. Due to the unexpectedly high level of miscibility of the first and second siloxane monomers with the hydrophilic vinyl amide monomer or monomer component, the addition of a non-reactive organic diluent or diluents component to the polymerizable composition is not necessary, although one or more organic diluents can optionally be included in the polymerizable composition. Examples of organic diluents include alcohol, such as n-propanol or isopropanol. Additionally, as illustrated in the Examples, the polymerizable composition can further be essentially free of N,N-dimethylacrylamide (DMA), or can be free of DMA.

In another example, the present disclosure is also directed to a silicone hydrogel contact lens which comprises a polymeric lens body that is the reaction product of a polymerizable composition. The polymerizable composition comprises a first siloxane monomer represented by formula (1):

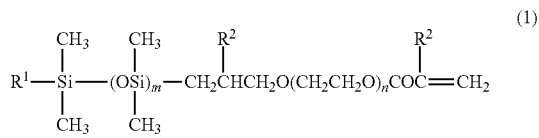

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, where the first siloxane monomer has a number average molecular weight of from 400 daltons to 700 daltons. The polymerizable composition also comprises a second siloxane monomer having a number average molecular weight greater than 7,000 daltons. A total amount of siloxane monomers present in the polymerizable composition is from 30 unit parts to 50 unit parts by weight. The polymerizable composition also comprises at least one hydrophilic vinyl amide monomer present in the polymerizable composition in an amount from 30 to 60 unit parts by weight. The polymerizable composition can optionally also comprise a third siloxane monomer, or at least one cross-linking agent, or at least one polymerizable or non-polymerizable ingredient, or any combination thereof. Optionally, in the polymerizable compositions described herein, the first siloxane monomer and the second siloxane monomer can be present in the polymerizable composition in a ratio from about 2:1 to about 10:1 based on unit parts. The polymerizable composition can optionally be essentially free of an organic diluent, of DMA, or of both an organic diluent and DMA.

Unlike many previously described silicone hydrogel contact lenses, contact lenses comprising polymeric lens bodies which are the reaction product of the polymerizable composition described herein can have ophthalmically acceptably wettable lens surfaces when the polymerizable composition used to form the lens is free of a wetting agent, or when the polymerizable composition used to form the lens is free of an organic diluent, or when the lens is free of a wetting agent, or when the polymeric lens body is washed in liquids free of a volatile organic solvent, or when the lens is free of a surface treatment or surface modification, or any combination thereof. For example, the contact lens can have the ophthalmically acceptably wettable lens surfaces when the polymerizable composition used to form the lens is free of an internal wetting agent, or when the polymerizable composition used to form the lens is free of an organic diluent, or when the lens is only contacted by liquids free of volatile organic solvents during manufacturing, or when the lens is free of a surface plasma treatment, or any combination thereof. In one example, a contact lens which is ophthalmically acceptably wettable can be understood to be a contact lens having a captive bubble dynamic advancing contact angle less than 70 degrees when the contact lens is fully hydrated.

The ingredients of the polymerizable composition can be present in amounts such that the resulting silicone hydrogel contact lens has an equilibrium water content (EWC) from 30% wt/wt to 70% wt/wt when fully hydrated, or has a captive bubble dynamic advancing contact angle less than 90 degrees when fully hydrated, or both.

The at least one hydrophilic vinyl amide monomer of the present polymerizable can be understood to comprise or consist essentially of or consist of a hydrophilic amide monomer having one N-vinyl group. The hydrophilic vinyl amide monomer can comprise or consist essentially of or consist of N-vinyl-N-methyl acetamide (VMA).

The at least one hydrophilic vinyl amide monomer of the polymerizable composition can be present in the polymerizable composition as a single hydrophilic vinyl amide monomer, or can be present as a hydrophilic vinyl amide monomer component comprising two or more hydrophilic vinyl amide monomers, e.g., as a first hydrophilic vinyl amide monomer or monomer component and a second hydrophilic vinyl amide monomer or monomer component. The polymerizable composition can optionally further comprise or consist of a single hydrophilic vinyl ether-containing monomer or a combination of hydrophilic vinyl ether-containing monomers.

As previously stated, the polymerizable composition further comprises a second siloxane monomer. The second siloxane monomer is a siloxane monomer having a number average molecular weight of at least 7,000 daltons. The second siloxane monomer can be a multifunctional siloxane monomer.

Either when the polymerizable composition comprises only the first siloxane monomer and the second siloxane monomer, or comprises the first siloxane monomer, the second siloxane monomer and the at least one third siloxane monomer, the total amount of siloxane monomers present in the polymerizable composition (i.e., the total unit parts by weight of the first siloxane monomer, the second siloxane monomer, and, if present, the third or more siloxane monomers) can be from about 30 unit parts to about 50 unit parts by weight, such as, for example, from about 35 to about 40 unit parts from about 33 unit parts to 45 about unit parts, or from about 35 unit parts to about 40 unit parts by weight.

In one example, the second siloxane monomer can be a siloxane monomer represented by formula (2):

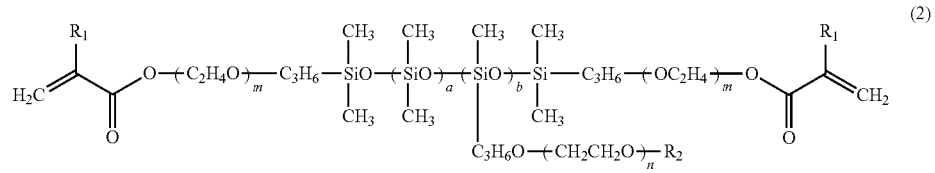

wherein $R_1$ is selected from either hydrogen or a methyl group; $R_2$ is selected from either of hydrogen or a $C_{1-4}$ hydrocarbon group; m represents an integer of from 0 to 10; n represents an integer of from 4 to 100; a and b represent integers of 1 or more; a+b is equal to 20-500; b/(a+b) is equal to 0.01-0.22; and the configuration of siloxane units includes a random configuration. In one example of the siloxane of formula (2), m is 0, n is one integer from 5 to 10, a is one integer from 65 to 90, b is one integer from 1 to 10, and $R_1$ is a methyl group.

When the polymerizable composition comprises the third siloxane monomer, the third siloxane monomer can be a siloxane monomer represented by formula (3):

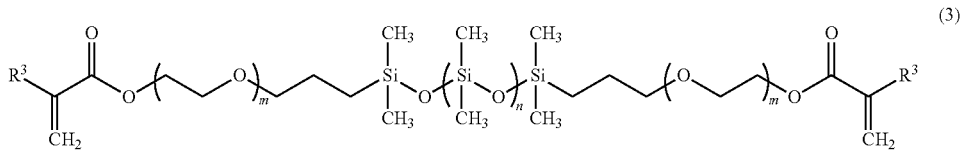

wherein $R^3$ is selected from either hydrogen or a methyl group; m represents an integer from 0 to 10; and n represents an integer from 1 to 500. In one example of the siloxane of formula (3), $R^3$ is a methyl group, m is 0, and n is one integer from 40 to 60.

The present disclosure is also directed to a batch of silicone hydrogel contact lenses comprising a plurality of contact lenses formed from polymeric lens bodies which are the reaction product of the polymerizable composition described herein. In one example, the batch of silicone hydrogel contact lenses can have an average equilibrium water content (EWC) from 30% wt/wt to 70% wt/wt, or an average an oxygen permeability of at least 55 barrers, or an average tensile modulus from about 0.2 MPa to about 0.9 MPa, or an average captive bubble dynamic advancing contact angle less than 90 degrees, or an average captive bubble static contact angle less than 70 degrees, or any combination thereof, based on averages of values determined for at least 20 individual lenses of the batch.

The present disclosure is also directed to methods of manufacturing a silicone hydrogel contact lens. The method of manufacturing comprises the steps of providing a miscible polymerizable composition, said polymerizable composition comprising (a) a first siloxane monomer represented by formula (1):

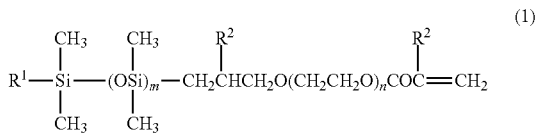

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, the first siloxane having a number average molecular weight of from 400 daltons to 700 daltons; (b) a second siloxane monomer having a number average molecular weight greater than 7,000 daltons; wherein a total amount of siloxane monomers present in the polymerizable composition is from 30 unit parts to 50 unit parts by weight; and (c) a hydrophilic amide monomer having one N-vinyl group or mixture of vinyl amide monomers present in the polymerizable composition in an amount from 30 to 60 unit parts by weight; polymerizing the polymerizable composition in a contact lens mold assembly to form a polymeric lens body; contacting the polymeric lens body with a washing liquid to remove extractable material from the polymeric lens body; and hydrating the polymeric lens body to form a silicone hydrogel contact lens; wherein the silicone hydrogel contact lens has ophthalmically acceptably wettable lens surfaces when fully hydrated. Optionally, in the polymerizable composition, the first siloxane monomer and the second siloxane monomer can be present in the polymerizable composition in a ratio from about 2:1 to about 10:1 based on unit parts by weight. The polymerizable composition can optionally be essentially free of an organic diluent, of DMA, or of both an organic diluent and DMA. The method can further comprise packaging the polymeric lens body or silicone hydrogel contact lens in a contact lens packaging solution in a contact lens package. In one example of the method, the contact lens of the method has the ophthalmically acceptably wettable lens surfaces when the polymerizable composition used to form the polymeric lens body is free of a wetting agent, or when the polymerizable composition used to form the polymeric lens body is free of an organic diluent, or when the polymeric lens body is free of a wetting agent, or when the polymeric lens body is washed in liquids free of a volatile organic solvent, or when the polymeric lens body is free of a surface plasma treatment, or when the silicone hydrogel contact lens is free of a wetting agent physically entrapped within it, or when the silicone hydrogel contact lens is free of a wetting agent bonded to its surfaces, or any combination thereof. In one example, a contact lens which is ophthalmically acceptably wettable can be understood to be a contact lens having a captive bubble dynamic advancing contact angle less than 70 degrees when the contact lens is fully hydrated.

In one example, the polymerizing step of the method can comprise polymerizing the polymerizable composition in a contact lens mold assembly having a molding surface formed of a non-polar thermoplastic polymer to form a polymeric lens body. In another example, the polymerizing step of the method can comprise polymerizing the polymerizable composition in a contact lens mold assembly having a molding surface formed of a polar thermoplastic polymer to form a polymeric lens body.

In one example, the contacting step of the method can comprise contacting the polymeric lens body with a washing liquids comprising at least one volatile organic solvent. In another example, the contacting step of the method can comprise contacting the polymeric lens body with a washing liquid free of a volatile organic solvent. In one particular example, the polymeric lens body, as well as the silicon hydrogel contact lens comprising the polymeric lens body, are not contacted by liquids comprising a volatile organic solvent during the manufacturing.

In one example, the method can further comprise the step of autoclaving the contact lens package to sterilize the silicone hydrogel contact lens and the contact lens packaging solution.

In any of the foregoing polymerizable compositions, or polymeric lens bodies, or silicone hydrogel contact lenses, or batches of silicone hydrogel contact lenses or methods of manufacturing contact lenses, the first siloxane monomer can be represented by formula (1) where m of formula (1) is 4, n of formula (1) is 1, $R^1$ of formula (1) is a butyl group, and each $R^2$ of formula (1) is independently either a hydrogen atom or a methyl group, wherein the first siloxane monomer has a number average molecular weight of from 400 daltons to 700 daltons. The second siloxane is a siloxane monomer having a number average molecular weight of at least 7,000 daltons. The second siloxane monomer of the polymerizable composition can be a siloxane monomer having more than one polymerizable functional group, i.e., a multifunctional siloxane monomer, such as, for example, a bifunctional siloxane monomer or a trifunctional siloxane monomer, etc. In one particular example, the optional second siloxane monomer can be a siloxane monomer having more than one functional group and having a number average molecular weight of at least 7,000 daltons. Additional examples of the optional second siloxane are described below. The optional at least one cross-linking agent of the polymerizable composition can comprise a vinyl-containing cross-linking agent. For example, the optional at least one cross-linking agent can consist of a vinyl-containing cross-linking agent (i.e., all of the non-silicon cross-linking agents present in the polymerizable composition are vinyl-containing cross-linking agents). Alternatively, the optional at least one cross-linking agent can be a cross-linking agent component comprising at least one vinyl-containing cross-linking agent and at least one acrylate-containing cross-linking agent. Optionally, in the polymerizable composition, the first siloxane monomer and the second siloxane monomer can be present in the polymerizable composition in a ratio from about 2:1 to about 10:1 based on unit parts by weight. The polymerizable composition can optionally be essentially free of an organic diluent, of DMA, or of both an organic diluent and DMA.

Additional embodiments of the polymerizable compositions, polymeric lens bodies, present lenses, lens products, batches of lenses, and methods of manufacturing contact lenses will be apparent from the following description, Examples 1-25, and claims. As can be appreciated from the foregoing and following description, each and every feature described herein, and each and every combination of two or more of such features, and each and every combination of one or more values defining a range, are included within the scope of the present invention provided that the features included in such a combination are not mutually inconsistent. In addition, any feature or combination of features or any value(s) defining a range may be specifically excluded from any embodiment of the present invention.

DETAILED DESCRIPTION

As described herein, it has now been discovered that silicone hydrogel contact lenses can be formed from polymerizable compositions comprising a first siloxane monomer of formula (1) wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, the first siloxane having a number average molecular weight of from 400 daltons to 700 daltons; (b) a second siloxane monomer having a number average molecular weight greater than 7,000 daltons; wherein a total amount of siloxane monomers present in the polymerizable composition is from 30 unit parts to 50 unit parts by weight; and (c) a hydrophilic amide monomer having one N-vinyl group or a mixture of vinyl amide monomers present in the polymerizable composition in an amount from 30 to 60 unit parts by weight. While this polymerizable composition, and the resulting silicone hydrogel contact lenses formed therefrom have high levels of two or more siloxane monomers in addition at least one hydrophilic non-silicon-containing amide monomer having one N-vinyl group (i.e., a vinyl amide monomer), these silicone hydrogel contact lenses have been found to have ophthalmically acceptably wettable lens surfaces, for example, a lens surface having a captive bubble dynamic advancing contact angle less than 70 degrees when the contact lens is fully hydrated.

The present contact lenses comprise, or consist of, hydrated lens bodies comprising a polymeric component and a liquid component. The polymeric component comprises units of two or more siloxane monomers (i.e., a first siloxane monomer of formula (1) wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, the first siloxane having a number average molecular weight of from 400 daltons to 700 daltons; a second siloxane monomer having a number average molecular weight greater than 7,000 daltons; and optionally one or more additional siloxane monomers; wherein a total amount of siloxane monomers present in the polymerizable composition is from 30 unit parts to 50 unit parts by weight; and one or more non-silicon reactive ingredients (i.e., one or more hydrophilic vinyl amide monomers as well as optionally other reactive ingredients). It can therefore be understood that the polymeric component is the reaction product of a polymerizable composition comprising two or more siloxane monomers (two or more siloxane monomers present as the siloxane monomer component of the composition), and one or more non-silicon reactive ingredients comprising at least one hydrophilic amide monomer having one N-vinyl group, the hydrophilic vinyl amide monomer being present in the polymerizable composition in an amount from 30 unit parts to 60 unit parts by weight). As used herein, a non-silicon reactive ingredient is understood to be an ingredient which has a polymerizable double bond as part of its molecular structure, but which does not have a silicon atom in its molecular structure. The ingredients of the polymerizable composition can be monomers, macromers, pre-polymers, polymers, or any combination thereof. In addition to the first siloxane monomer of formula (1), the polymerizable composition further includes at least one hydrophilic monomer. Optionally, the polymerizable composition can further comprise a third siloxane monomer, or at least one cross-linking agent, or both a third siloxane monomer and at least one cross-linking agent. Optionally, the ingredients of the polymerizable composition can further comprise at least one hydrophobic monomer, or at least one third siloxane monomer, or any combination thereof. The at least one cross-linking agent, the at least one hydrophilic monomer, and the at least one hydrophobic monomer of the polymerizable composition are understood to be silicon-free polymerizable ingredients. As used herein, the at least one cross-linking agent can be understood to comprise a single cross-linking agent, or to comprise a cross-linking agent component composed of two or more single cross-linking agents. Similarly, the at least one hydrophilic monomer can be understood to comprise a single hydrophilic monomer, or to comprise a hydrophilic monomer component composed of two or more hydrophilic monomers. The at least one hydrophobic monomer can be understood to comprise a single hydrophobic monomer, or to comprise a hydrophobic monomer component composed of two or more hydrophobic monomers. The at least one third siloxane monomer can be understood to comprise a single third siloxane monomer, or to comprise a third siloxane monomer component composed of two or more siloxane monomers. Additionally, the polymerizable composition can optionally include at least one initiator, or at least one organic diluent, or at least one surfactant, or at least one oxygen scavenger, or at least one tinting agent, or at least one UV absorber, or at least one chain transfer agent, or any combination thereof. The optional at least one initiator, at least one organic diluent, at least one surfactant, at least one oxygen scavenger, at least one tinting agent, at least one UV absorber, or at least one chain transfer agent are understood to be non-silicon ingredients, and can be either non-polymerizable ingredients or polymerizable ingredients (i.e., ingredients having a polymerizable functional group as part of their molecular structure).

The combination of the polymeric component and the liquid component are present as a hydrated lens body, which is suitable for placement on an eye of a person. The hydrated lens body has a generally convex anterior surface and a generally concave posterior surface, and has an equilibrium water content (EWC) greater than 10% weight by weight (wt/wt). Thus, the present contact lenses can be understood to be soft contact lenses, which as used herein, refers to contact lenses that, when fully hydrated, can be folded upon themselves without breaking.

As understood in the industry, a daily disposable contact lens is an unworn contact lens that is removed from its sealed, sterilized package (primary package) produced by a contact lens manufacturer, placed on a person's eye, and is removed and discarded after the person is done wearing the lens at the end of the day. Typically, the duration of lens wear for daily disposable contact lenses is from eight to fourteen hours, and they are then disposed of after wear. Daily disposable lenses are not cleaned or exposed to cleaning solutions prior to placement in the eye since they are sterile prior to opening the package. A daily disposable silicone hydrogel contact lens is a disposable silicone hydrogel contact lens that is replaced daily. In contrast, non-daily disposable contact lenses are disposable contact lenses that are replaced less frequently than daily (e.g., weekly, bi-weekly, or monthly). Non-daily disposable contact lenses are either removed from the eye and cleaned with a cleaning solution on a regular basis, or are worn continuously without removal from the eye. The present contact lenses can be either daily disposable contact lenses or non-daily disposable contact lenses.

In accordance with the present disclosure, the miscible polymerizable composition of the present disclosure comprises a first siloxane monomer represented by formula (1):

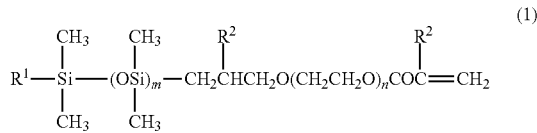

(1)

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group. In other words, on a single molecule of the siloxane monomer represented by formula 1, the first $R^2$ of formula (1), the $R^2$ which is closest to the $R^1$ end group on the left side of the molecule, can be either a hydrogen atom or a methyl group, and the second $R^2$ of formula (1), the $R^2$ which is part of the methacrylate end group on the right side of the molecule, can also be either a hydrogen atom or a methyl group, regardless of whether the first $R^2$ of formula (1) is a hydrogen atom or a methyl group, the first siloxane monomer having a number average molecular weight of from 400 daltons to 700 daltons. The polymerizable composition also comprises a second siloxane monomer having a number average molecular weight greater than 7,000 daltons. The total amount of siloxane monomer present in the polymerizable composition is from 30 unit parts to 50 unit parts by weight. The polymerizable composition also comprises a hydrophilic amide monomer having one N-vinyl group or a mixture of vinyl amide monomers present in the polymerizable composition in an amount from 30 to 60 unit parts by weight. The ingredients of the polymerizable composition can be present in amounts such that the resulting silicone hydrogel contact lens has ophthalmically acceptably wettable lens surfaces when fully hydrated, for example, as demonstrated by a lens surface having a captive bubble dynamic advancing contact angle less than 70 degrees when fully hydrated. The polymerizable composition can also comprise an optional third siloxane monomer, or an optional at least one cross-linking agent, or any combination thereof.

In one example, the first siloxane monomer and the second siloxane monomer can be present in the polymerizable composition in a ratio of at least 1:1 based on unit parts by weight. Optionally, the first siloxane monomer and the second siloxane monomer can be present in a ratio of at least 2:1 based on unit parts by weight. The second siloxane monomer can have more than one polymerizable functional group (i.e., the second siloxane monomer can be a multifunctional siloxane monomer). If the optional second siloxane monomer has two polymerizable functional groups, such as two methacrylate groups, it is a bifunctional monomer. If the second siloxane monomer has three polymerizable functional groups, it is a trifunctional monomer.

When the polymerizable composition comprises a first siloxane monomer of formula (1) and the optional at least one cross-linking agent, the first siloxane monomer and the optional at least one cross-linking agent can be present in the polymerizable composition in a ratio of at least 10:1 based on unit parts by weight. When the at least one cross-linking agent comprises or consists of a vinyl-containing cross-linking agent or cross-linking agent component, the first siloxane monomer and the at least one vinyl-containing cross-linking agent or cross-linking agent component (i.e., the total unit parts of the single vinyl-containing cross-linking agent or the total unit parts of the individual cross-linking agents of vinyl-containing cross-linking agent component) can be present in the polymerizable composition in a ratio of at least 100:1 based on unit parts by weight. For example, the ratio can be from about 100:1 to about 600:1, or from about 200:1 to about 500:1, or from about 300:1 to about 400:1 based on unit parts by weight. In one example, the at least one cross-linking agent can comprise at least one vinyl-containing cross-linking agent, and at least one methacrylate-containing cross-linking agent. In another example, the at least one cross-linking agent can consist of only one or more vinyl-containing cross linking agents. In one particular example, the at least one cross-linking agent can comprise or consist of at least one vinyl ether-containing cross-linking agent.

In one example, the lens can comprise a polymeric lens body that is the reaction product of a miscible polymerizable composition comprising (a) a first siloxane monomer represented by formula (1):

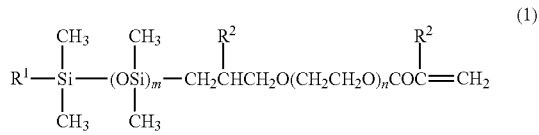

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, the first siloxane monomer having a number average molecular weight of from 400 daltons to 700 daltons; (b) a second siloxane monomer having a number average molecular weight greater than 7,000 daltons, wherein a total amount of siloxane monomers present in the polymerizable composition is from 30 unit parts to 50 unit parts; (c) at least one hydrophilic amide monomer having one N-vinyl group, the hydrophilic amide monomer being present in the polymerizable composition in an amount from 30 to 60 unit parts; and (d) at least one vinyl cross-linking agent; wherein the contact lens has ophthalmically acceptably wettable lens surfaces when fully hydrated. Optionally, the polymerizable composition can be essentially of free of N,N-dimethylacrylamide (DMA), or can be essentially free of an organic diluents, or both. Also optionally in this example, the first siloxane monomer and the second siloxane monomer are present in the polymerizable composition in a ratio from about 2:1 to about 10:1 based on unit parts by weight, or any combination thereof. In this example, the ophthalmic acceptability of the lens can be demonstrated by a lens surface of the polymeric lens having a captive bubble dynamic advancing contact angle less than 70 degrees when fully hydrated. The present disclosure also relates to a new silicone hydrogel contact lens or to new silicone hydrogel contact lenses. A silicone hydrogel contact lens in accordance with the present disclosure comprises a polymeric lens body. The polymeric lens body is the reaction product of a miscible polymerizable composition or contact lens formulation. The miscible polymerizable composition used to produce the present silicone hydrogel contact lens or lenses comprises a first siloxane monomer represented by formula (1):

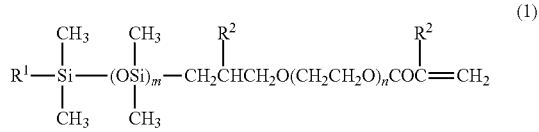

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, the first siloxane monomer having a number average molecular weight of from 400 daltons to 700 daltons. A total amount of siloxane monomers present in the polymerizable composition is from 30 unit parts to 50 unit parts by weight. The polymerizable composition also includes at least one hydrophilic vinyl amide monomer. The at least one hydrophilic vinyl amide monomer is present in the polymerizable composition in an amount from 30 to 60 unit parts by weight.

It has been discovered that by the use of the first siloxane of formula (1) in combination with a second siloxane monomer having a molecular weight greater than 7,000 daltons, it is possible to prepare miscible polymerizable compositions containing high levels of one or more hydrophilic vinyl amide monomers (e.g., from 30 to 60 unit parts). The miscible polymerizable compositions of the present disclosure can be essentially free of, or free of, an organic diluents, or of N,N-dimethylacrylamide (DMA), or of both. The miscible polymerizable compositions of the present disclosure can further comprise a third siloxane monomer, or can further comprise at least one cross-linking agent, or can further comprise both a third siloxane monomer and at least one cross-linking agent.

Typically it has been difficult to prepare miscible polymerizable compositions having high levels of hydrophilic monomers, particularly when higher molecular weight silicone monomers (e.g., monomers having a number average molecular weight of at least 3,000 daltons) are present in the composition. Even when miscible polymerizable compositions having high levels of hydrophilic monomers can be obtained, the resulting contact lens may not have ophthalmically acceptable surface wettabilities. Without being bound by theory, it is believed that the structure of the first siloxane, particularly when the first siloxane monomer is combined with a second siloxane having a high molecular weight, may allow higher levels of hydrophilic vinyl amide monomers to be soluble in the polymerizable compositions, and that polymers formed from units of the first siloxane, the second siloxane, and the at least one hydrophilic vinyl amide monomer present in the polymerizable composition at a high level can be used to produce polymer lens bodies having ophthalmically acceptably wettable lens surfaces such as, for example, lens surfaces which have a captive bubble dynamic advancing contact angle less than 70 degrees when the lenses are fully hydrated.

Similarly, the addition of cross-linking agents to polymerizable compositions used to prepare silicone hydrogel contact lenses has been observed to frequently have detrimental effects on the wettability of the resulting silicone hydrogel contact lenses. When combined with two or more siloxane monomers, the addition of cross-linking agents, particularly at higher levels, can result in miscible polymerizable compositions, but the resulting contact lenses may not have ophthalmically acceptable surface wettabilities. Without being bound by theory, it is believed that the structure of the first siloxane, particularly when the first siloxane monomer is combined with a high molecular weight second siloxane monomer and a high proportion of at least one hydrophilic vinyl amide monomer and at least one cross-linking agent, particularly a vinyl-containing cross-linking agent, is particularly favorable for the production of silicone hydrogel contact lenses having ophthalmically acceptably wettable lens surfaces, such as, for example, lens surfaces which have a captive bubble dynamic advancing contact angle less than 70 degrees when the lenses are fully hydrated.

An example of the disclosed polymerizable composition can be miscible when initially prepared, and can remain miscible over a period of time adequate for the commercial manufacture of contact lenses, such as, for example, for about 2 weeks, or about 1 week, or about 5 days. Typically, when polymerized and processed into contact lenses, miscible polymerizable compositions result in contact lenses having ophthalmically acceptable clarities.

Approaches commonly employed to increase the miscibility of siloxane monomers and hydrophilic monomers include adding organic diluents to the polymerizable composition to act as compatibilizers between the hydrophilic monomers and the siloxane monomers which typically are more hydrophobic, or using only siloxane monomers having low molecular weights (e.g., molecular weights below 2500 daltons). In one example, the use of the first siloxane as described above makes it possible to include both a high molecular weight second siloxane and a high level of one or more hydrophilic vinyl amide monomers in the polymerizable compositions of the present disclosure. And while it is possible to include one or more organic diluents in the present polymerizable compositions disclosed herein, it is not necessary to do so in order to obtain a miscible polymerizable composition in accordance with the present disclosure. In other words, in one example, the silicone hydrogel contact lenses of the present disclosure are formed from polymerizable compositions which are free of an organic diluent.

In one example, the lens can comprise a polymeric lens body that is the reaction product of a miscible polymerizable composition comprising (a) a first siloxane monomer represented by formula (1):

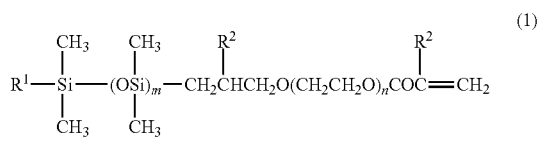

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, the first siloxane monomer having a number average molecular weight of from 400 daltons to 700 daltons; (b) a second siloxane monomer having a number average molecular weight greater than 7,000 daltons, wherein a total amount of siloxane monomers present in the polymerizable composition is from 30 unit parts to 50 unit parts; (c) at least one hydrophilic amide monomer having one N-vinyl group, the hydrophilic amide monomer being present in the polymerizable composition in an amount from 30 to 60 unit parts; wherein the polymerizable composition is essentially free of an organic diluent and the contact lens has ophthalmically acceptably wettable lens surfaces when fully hydrated. Optionally, the polymerizable composition can be essentially of free of N,N-dimethylacrylamide (DMA), or the first siloxane monomer and the second siloxane monomer can be present in the polymerizable composition in a ratio from about 2:1 to about 10:1 based on unit parts by weight, or any combination thereof. In this example, the ophthalmic acceptability of the lens can be demonstrated by a lens surface of the polymeric lens having a captive bubble dynamic advancing contact angle less than 70 degrees when fully hydrated.

As previously stated, the molecular weight of the first siloxane monomer can be from 400 to 700 daltons. Additional details of the first siloxane monomer can be understood from US20090299022, the entire content of which is hereby incorporated by reference. As can be appreciated from formula (1), the first siloxane monomer has a single methacrylate polymerizable functional group present on one end of the main chain of the siloxane monomer.

In one example of the present contact lenses, the first siloxane monomer can be represented by formula (1) where m of formula (1) is 4, n of formula (1) is 1, $R^1$ of formula (1) is a butyl group, and each $R^2$ of formula (1) is independently either a hydrogen atom or a methyl group. One example of such a first siloxane monomer is identified herein as Si1 in Examples 1-25.

In one example, the lens can comprise a polymeric lens body that is the reaction product of a miscible polymerizable composition comprising (a) a first siloxane monomer represented by formula (1):

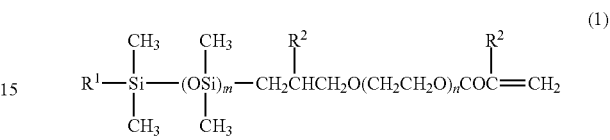

wherein m of formula (1) is 4, n of formula (1) is 1, $R^1$ of formula (1) is a butyl group, and each $R^2$ of formula (1) is independently either a hydrogen atom or a methyl group, the first siloxane monomer having a number average molecular weight of from 400 daltons to 700 daltons; (b) a second siloxane monomer having a number average molecular weight greater than 7,000 daltons, wherein a total amount of siloxane monomers present in the polymerizable composition is from 30 unit parts to 50 unit parts; and (c) at least one hydrophilic amide monomer having one N-vinyl group, the hydrophilic amide monomer being present in the polymerizable composition in an amount from 30 to 60 unit parts; wherein the contact lens has ophthalmically acceptably wettable lens surfaces when fully hydrated. Optionally, the polymerizable composition can be essentially free of an organic diluent, or can be essentially of free of N,N-dimethylacrylamide (DMA), or the first siloxane monomer and the second siloxane monomer can be present in the polymerizable composition in a ratio from about 2:1 to about 10:1 based on unit parts by weight, or any combination thereof. In this example, the ophthalmic acceptability of the lens can be demonstrated by a lens surface of the polymeric lens having a captive bubble dynamic advancing contact angle less than 70 degrees when fully hydrated.

As used herein, a molecular weight is understood to refer to the number average molecular weight. The number average molecular weight is the ordinary arithmetic mean or average of the molecular weights of the individual molecules present in the sample of a monomer. As the individual molecules in a sample of monomer may vary slightly from one another in molar mass, some level of polydispersity may be present in the sample. As used herein, when the siloxane monomer, or any other monomer, macromer, pre-polymer, or polymer, of the polymerizable composition is polydisperse, the term "molecular weight" refers to the number average molecular weight of the monomer or ingredient. As one example, a sample of the siloxane monomer can have a number average molecular weight of about 15,000 daltons, but if the sample is polydisperse, the actual molecular weights of the individual monomers present in the sample may range from 12,000 daltons to 18,000 daltons.

The number average molecular weight can be the absolute number average molecular weight as determined by proton nuclear magnetic resonance (NMR) end group analysis, as understood by persons of ordinary skill in the art. Molecular weights may also be determined using gel permeation chromatography, as understood by persons of ordinary skill in the art, or may be provided by suppliers of the chemicals.

As previously described, the polymerizable compositions of the present invention comprise a first siloxane monomer, a second siloxane monomer, and at least one hydrophilic vinyl amide monomer, wherein the at least one hydrophilic vinyl amide monomer is present in the polymerizable composition in an amount from 30 to 60 unit parts. The polymerizable compositions used to prepare the present silicone hydrogel contact lenses can also include additional optional ingredients other than those described above. For example, the polymerizable composition can optionally include a third siloxane monomer. In such an example, it is understood that the third siloxane monomer has a different molecular structure, a different molecular weight, or both a different molecular structure and a different molecular weight than the first siloxane monomer or the second siloxane monomer. The optional third siloxane monomer can optionally comprise a third siloxane monomer component where the third siloxane monomer component is comprised of two or more siloxane monomers, each of which differs from both the first siloxane monomer and the second siloxane monomer of the polymerizable composition.

The first siloxane monomer, the second siloxane monomer, and, when present, the optional at least one third siloxane monomer, comprise the siloxane monomer component of the polymerizable composition. Each of the first siloxane monomer, or the second siloxane monomer, or the optional at least one third siloxane monomer, or any combination thereof, can be a hydrophilic siloxane monomer, or a hydrophobic siloxane monomer, or can have both hydrophilic regions and hydrophobic regions, depending on the amount and location of any hydrophilic components, such as units of ethylene glycol, polyethylene glycol and the like, present in the molecular structure of the siloxane monomers.

For example, the second siloxane monomer, or the optional at least one third siloxane monomer, or any combination thereof, can contain hydrophilic components within the main chain of the siloxane molecule, can contain hydrophilic components within one or more side chains of the siloxane molecule, or any combination thereof. For example, the siloxane monomer can have at least one unit of ethylene glycol adjacent to a polymerizable functional group in the main chain of the siloxane molecule. As used herein, adjacent is understood to mean both immediately adjacent, and separated only by 10 or fewer carbon atoms. The at least one unit of ethylene glycol adjacent to a polymerizable functional group in the main chain of the siloxane molecule can be separated from the polymerizable functional group by a carbon chain 1-5 units in length (i.e., where the ethylene glycol unit is bonded to the first carbon in the carbon chain 1-5 units in length, and the polymerizable functional group is bonded to the last carbon of the carbon chain 1-5 units in length, in other words, the ethylene glycol unit and the polymerizable group are not immediately adjacent but are separated by 1-5 carbon atoms). The siloxane monomer can have at least one unit of ethylene glycol adjacent to polymerizable functional groups present on both ends of the main chain of the siloxane molecule. The siloxane monomer can have at least one unit of ethylene glycol present in at least one side chain of the siloxane molecule. The at least one unit of ethylene glycol present in at least one side chain of the siloxane molecule can be part of a side chain bonded to a silicon atom of the main chain of the siloxane molecule. The siloxane molecule can have both at least one unit of ethylene glycol adjacent to polymerizable functional groups present on both ends of the main chain of the siloxane molecule, and at least one unit of ethylene glycol present in at least one side chain of the siloxane molecule.

In one example, the lens can comprise a polymeric lens body that is the reaction product of a miscible polymerizable composition comprising (a) a first siloxane monomer represented by formula (1):

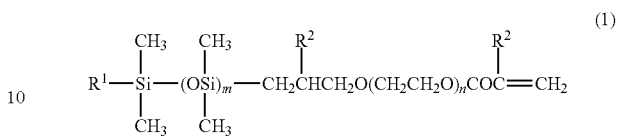

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, the first siloxane monomer having a number average molecular weight of from 400 daltons to 700 daltons; (b) a second siloxane monomer having a number average molecular weight greater than 7,000 daltons, the second siloxane monomer having at least one unit of ethylene glycol adjacent to a polymerizable functional group in the main chain of the siloxane molecule, wherein a total amount of siloxane monomers present in the polymerizable composition is from 30 unit parts to 50 unit parts; and (c) at least one hydrophilic amide monomer having one N-vinyl group, the hydrophilic amide monomer being present in the polymerizable composition in an amount from 30 to 60 unit parts; wherein the contact lens has ophthalmically acceptably wettable lens surfaces when fully hydrated. Optionally, the polymerizable composition can be essentially free of an organic diluent, or can be essentially of free of N,N-dimethylacrylamide (DMA), or the first siloxane monomer and the second siloxane monomer can be present in the polymerizable composition in a ratio from about 2:1 to about 10:1 based on unit parts by weight, or any combination thereof. In this example, the ophthalmic acceptability of the lens can be demonstrated by a lens surface of the polymeric lens having a captive bubble dynamic advancing contact angle less than 70 degrees when fully hydrated.

The hydrophilicity or hydrophobicity of a monomer can be determined using conventional techniques, such as, for example, based on the monomer's aqueous solubility. For purposes of the present disclosure, a hydrophilic monomer is a monomer that is visibly soluble in an aqueous solution at room temperature (e.g. about 20-25 degrees C.). For example, a hydrophilic monomer can be understood to be any monomer for which 50 grams or more of the monomer are visibly fully soluble in 1 liter of water at 20 degrees C. (i.e., the monomer is soluble at a level of at least 5% wt/wt in water) as determined using a standard shake flask method as known to persons of ordinary skill in the art. A hydrophobic monomer, as used herein, is a monomer that is visibly insoluble in an aqueous solution at room temperature, such that separate, visually identifiable phases are present in the aqueous solution, or such that the aqueous solution appears cloudy and separates into two distinct phases over time after sitting at room temperature. For example, a hydrophobic monomer can be understood to be any monomer for which 50 grams of the monomer are not visibly fully soluble in 1 liter of water at 20 degrees C. (i.e., the monomer is soluble at a level of less than 5% wt/wt in water).

The second siloxane monomer or the optional at least one third siloxane monomer of the polymerizable composition can be an acrylate-containing siloxane monomer, in other words, a siloxane monomer having at least one acrylate polymerizable functional group as part of its molecular structure. In one example, the acrylate-containing siloxane monomer can be a methacrylate-containing siloxane monomer, i.e., a siloxane monomer having at least one methacrylate polymerizable functional group as part of its molecular structure.

The second siloxane monomer or the optional at least one third siloxane can be a siloxane monomer having a number average molecular weight of at least 3,000 daltons. In another example, the siloxane monomer can be a siloxane monomer having a molecular weight of at least 4,000 daltons, or of at least 7,000 daltons, or of at least 9,000 daltons, or of at least 11,000 daltons.

The second siloxane monomer or the optional at least one third siloxane monomer can be a siloxane monomer having a molecular weight less than 20,000 daltons. In another example, the optional at least one third siloxane monomer can be a siloxane monomer having a molecular weight less than 15,000 daltons, or less than 11,000 daltons, or less than 9,000 daltons, or less than 7,000 daltons, or less than 5,000 daltons.

monomer of formula (1) having a different molecular weight than the first siloxane monomer of the polymerizable composition. In another example, the second siloxane monomer or the optional at least one third siloxane can comprise at least one of the siloxanes disclosed in the following patents: US2007/0066706, US2008/0048350, U.S. Pat. No. 3,808,178, U.S. Pat. No. 4,120,570, U.S. Pat. No. 4,136,250, U.S. Pat. No. 4,153,641, U.S. Pat. No. 470,533, U.S. Pat. No. 5,070,215, U.S. Pat. No. 5,998,498, U.S. Pat. No. 5,760,100, U.S. Pat. No. 6,367,929, and EP080539, the entire content of which are hereby incorporated by reference.

In another example of the present contact lenses, the second siloxane monomer or the optional at least one third siloxane monomer can be a dual-end methacrylate end-capped polydimethylsiloxane having a number average molecular weight of at least 7,000 daltons, or of at least 10,000 daltons. It will be understood that such siloxane monomers are bifunctional.

As an example of a bifunctional siloxane monomer useful in the present silicone hydrogel contact lenses, the second siloxane monomer or the optional at least one third siloxane monomer can be represented by formula (2):

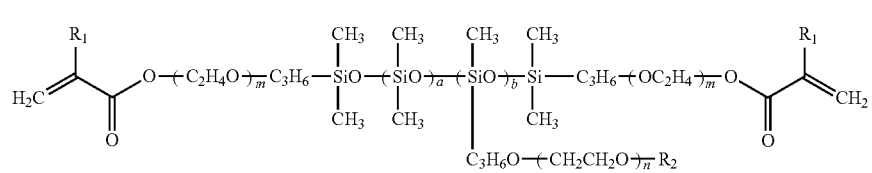

The optional at least one third siloxane monomer can be a siloxane monomer having a molecular weight from 3,000 daltons to 20,000 daltons. In another example, the siloxane monomer can be a siloxane monomer having a molecular weight from 5,000 daltons to 20,000 daltons, or from 5,000 daltons to 10,000 daltons, or from 7,000 daltons to 15,000 daltons.

In one example, the optional at least one third siloxane monomer has more than one functional group and has a number average molecular weight of at least 3,000 daltons.

The optional at least one third siloxane monomer can include poly (organosiloxane) monomers or macromers or prepolymers, such as, for example, 3-[tris(trimethylsiloxy)silyl]propyl allyl carbamate, or 3-[tris(trimethylsiloxy)silyl] propyl vinyl carbamate, or trimethylsilylethyl vinyl carbonate, or trimethylsilylmethyl vinyl carbonate, or 3-[tris(trimethylsilyloxy)silyl]propyl methacrylate (TRIS), or 3-methaycryloxy-2-hydroxypropyloxy)propylbis(trimethylsiloxy)methylsilane (SiGMA), or methyl di(trimethylsiloxy) silylpropylglycerolethyl methacrylate (SiGEMA), or monomethacryloxypropyl terminated polydimethylsiloxane (MCS-M11), MCR-M07, or monomethacryloxypropyl terminated mono-n-butyl terminated polydimethyl siloxane (mPDMS), or any combination thereof. In one example of a polymerizable composition of the present disclosure, the second siloxane monomer or the optional at least one third siloxane can comprise one or more of the first siloxanes described herein, wherein the second siloxane monomer or the optional at least one third siloxane differs from the first siloxane present in the polymerizable composition based on molecular weight, molecular formula, or both molecular weight and formula. For example, the second siloxane monomer or the optional at least one third siloxane monomer can be a siloxane wherein $R_1$ of formula (2) is selected from either hydrogen atom or a methyl group; $R_2$ of formula (2) is selected from either of hydrogen atom or a hydrocarbon group having 1 to 4 carbon atoms; m of formula (2) represents an integer of from 0 to 10; n of formula (2) represents an integer of from 4 to 100; a and b represent integers of 1 or more; a+b is equal to 20-500; b/(a+b) is equal to 0.01-0.22; and the configuration of siloxane units includes a random configuration. In one example in which the siloxane monomer is a monomer represented by formula (2), m of formula (2) is 0, n of formula (2) is an integer from 5 to 15, a is an integer from 65 to 90, b is an integer from 1 to 10, $R_1$ of formula (2) is a methyl group, and $R_2$ of formula (2) is either a hydrogen atom or a hydrocarbon group having 1 to 4 carbon atoms. One example of such a siloxane monomer as represented by formula (2) is abbreviated Si2 in Examples 1-25. The number average molecular weight for this siloxane monomer represented by formula (2) can be from about 9,000 daltons to about 10,000 daltons. In another example, the siloxane monomer represented by formula (2) can have a molecular weight from about 5,000 daltons to about 10,000 daltons. It can be appreciated that the siloxane represented by formula (2) is a bifunctional siloxane having two terminal methacrylate polymerizable functional groups (i.e., a methacrylate group present on each end of the main siloxane chain of the molecule). Additional details of this siloxane monomer can be found in US20090234089, the entire content of which is incorporated herein by reference.

As another example of a bifunctional siloxane monomer useful in the present silicone hydrogel contact lenses, the second siloxane monomer or the optional at least one third siloxane monomer can be represented by formula (3):

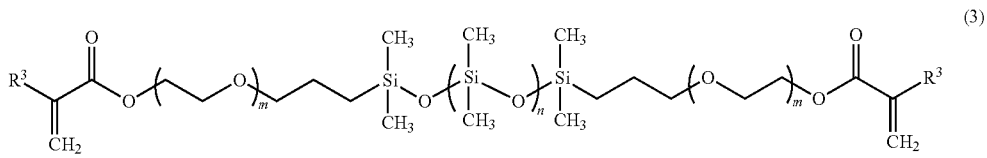

(3)

wherein $R^3$ is selected from either hydrogen atom or a methyl group, m of formula (3) represents an integer from 0 to 10, and n of formula (3) represents an integer from 1 to 500. In one example, the siloxane monomer is a siloxane monomer represented by formula 3, and $R^3$ is a methyl group, m of formula (3) is 0, and n of formula (3) is one integer from 40 to 60.

In another example, the second siloxane monomer or the optional at least one third siloxane monomer can be a bifunctional siloxane monomer represented by formula (4), and is abbreviated Si3 in Examples 1-25 (available from Gelest, Inc., Morrisville, Pa. as product code DMS-R18):

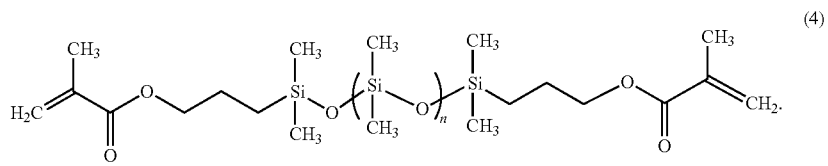

(4)

In one example, the siloxane of formula (4) has a number average molecular weight from about 4,000 to about 4,500 daltons.

Another example of a siloxane monomer which can be used as the optional at least one third siloxane monomer can include monofunctional siloxane monomers having at least one urethane linkage, such as the of the monofunctional siloxane monomers represented by formula (5):

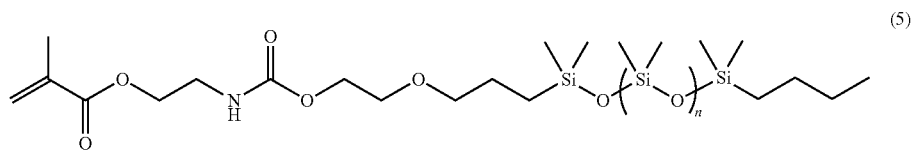

(5)

where n of formula (5) is 0-30, or is 10-15. In one example, the siloxane monomer can be the monomer of formula (5) where n of formula (5) is 12-13 and having a molecular weight of about 1,500 daltons. Such monofunctional siloxane monomers are described in U.S. Pat. No. 6,867,245, which is hereby incorporated by reference.

Yet another example of a siloxane monomer which can be used as the second siloxane monomer or the optional at least one third siloxane monomer can include bifunctional siloxane monomers having at least two urethane linkages, such as the bifunctional siloxane monomers represented by formula (6):

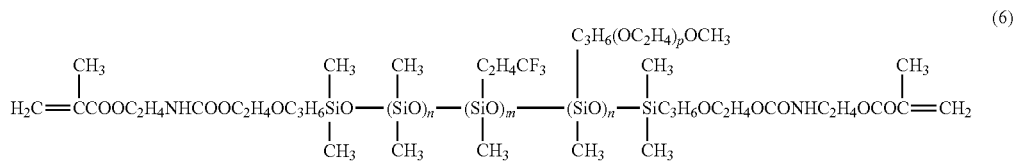

(6)

wherein n of formula (6) is an integer of about 100-150, m of formula (6) is an integer from about 5 to about 15, h is an integer from about 2 to 8, and p is an integer of about from about 5 to about 10. Additional example of such bifunctional siloxane monomer, and methods of making compounds of formula (6) are described in U.S. Pat. No. 6,867,245, which is hereby incorporated by reference. In a particular example, the siloxane monomer can be a bifunctional siloxane monomer having two urethane linkages and having a molecular weight greater than about 5,000 daltons, such as, for example, a molecular weight greater than about 10,000 daltons, or a molecular weight of greater than about 15,000 daltons.

In one example of the present contact lenses, the second siloxane monomer or the optional at least one third siloxane monomer can have a number average molecular weight of at least 9,000 daltons, or at least 11,000 daltons. The number average molecular weight of the siloxane monomer can be less than 20,000 daltons. Thus, in some contexts, the second siloxane monomer or the optional third siloxane monomer can be considered a macromer or a pre-polymer, but it will be referred to as a monomer herein since it forms a unit part of a polymer formed with the other reactive components of the polymerizable composition.

In the present polymerizable composition from which the present silicone hydrogel contact lenses are derived, the first siloxane monomer and the second siloxane monomer can be present in amounts such that the ratio of the first siloxane monomer to the second siloxane monomer is at least 1:1 based on unit parts, or is at least 2:1 based on unit parts. For example, the first siloxane monomer and the second siloxane monomer can be present in the polymerizable composition in a ratio from about 2:1 to about 10:1 based on unit parts. In another example, the first siloxane monomer and the second siloxane monomer can be present in the polymerizable composition in a ratio from about 3:1 to about 6:1 based on unit parts. In one example, the first siloxane monomer and the second siloxane monomer can be present in the polymerizable composition in a ratio of about 4:1 based on unit parts.

In one example, the lens can comprise a polymeric lens body that is the reaction product of a miscible polymerizable composition comprising t (a) a first siloxane monomer represented by formula (1):

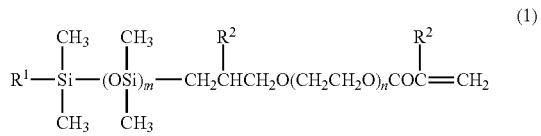

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, the first siloxane monomer having a number average molecular weight of from 400 daltons to 700 daltons; (b) a second siloxane monomer having a number average molecular weight greater than 7,000 daltons, wherein the siloxane monomer and the second siloxane monomer are present in the polymerizable composition in a ratio from about 2:1 to about 10:1 based on unit parts by weight, and a total amount of siloxane monomers present in the polymerizable composition is from 30 unit parts to 50 unit parts; and (c) at least one hydrophilic amide monomer having one N-vinyl group, the hydrophilic amide monomer being present in the polymerizable composition in an amount from 30 to 60 unit parts; wherein the contact lens has ophthalmically acceptably wettable lens surfaces when fully hydrated. Optionally, the polymerizable composition can be essentially free of an organic diluent, or can be essentially free of N,N-dimethylacrylamide (DMA), or can comprise at least one vinyl-containing cross-linking agent, or any combination thereof. In this example, the ophthalmic acceptability of the lens can be demonstrated by a lens surface of the polymeric lens having a captive bubble dynamic advancing contact angle less than 70 degrees when fully hydrated.

The total amount of siloxane monomers present in the polymerizable composition (e.g., the sum of the unit parts of the first siloxane monomer, the optional second siloxane monomer, and any other optional siloxane monomers present in the polymerizable composition) can be from about 25 to about 50 unit parts, or from about 35 to about 40 unit parts.

As used herein, 'unit parts' is understood to mean unit parts by weight. For example, to prepare a formulation described as comprising z unit parts of a siloxane monomer and y unit parts of a hydrophilic monomer, the composition can be prepared by combining z grams of the siloxane monomer with y grams of the hydrophilic monomer to obtain a total of y+z grams of polymerizable composition, or by combining z ounces of the siloxane with y ounces of the hydrophilic monomer to obtain a total of y+z ounces of polymerizable composition, and so on. When the composition further comprises additional optional ingredients such as, for example, x unit parts of a cross-linking agent, x grams of the cross-linking agent are combined with z grams of the siloxane monomer and y grams of the hydrophilic monomer to obtain a total of x+y+z grams of polymerizable composition, and so on. When the composition comprises an additional optional ingredient comprising an ingredient component composed of two ingredients, such as, for example, a hydrophobic monomer component consisting of a first hydrophobic monomer and a second hydrophobic monomer, in addition to the z unit parts of siloxane monomer, the y unit parts of hydrophilic monomer and the x unit parts of the cross-linker, w unit parts of the first hydrophobic monomer and v unit parts of the second hydrophobic monomer are combined to obtain a total amount of v+w+x+y+z unit parts of the polymerizable composition. It is understood that the unit parts of the at least one hydrophobic monomer present in such a polymerizable is the sum of the unit parts of the first hydrophobic monomer and the unit parts of the second hydrophobic monomer, e.g., v+w unit parts in this example. Typically, a formula for a polymerizable composition will be composed of ingredients in amounts totaling from about 90 to about 110 unit parts by weight. When amounts of components of the polymerizable composition are recited herein as being in unit parts, it is to be understood that the unit parts of these component are based on a formula providing a total weight of the composition ranging from about 90 to 110 unit parts. In one example, the unit parts by weight can be based on a formula providing a total weight of the composition ranging from about 95 to 105 unit parts by weight, or from about 98 to 102 unit parts by weight.

The polymerizable compositions of the present disclosure can be understood to comprise a first siloxane monomer, a second siloxane monomer and at least one hydrophilic vinyl amide monomer, and optionally at least one non-silicon hydrophobic monomers, or at least one non-silicon cross-linking agents, or any combination thereof. As used herein, the at least one hydrophilic vinyl amide monomer and the at least one cross-linking agent are non-silicon chemicals (i.e., chemicals whose molecular structure does not include a silicon atom) and thus are different from the siloxane monomers present in the polymerizable compositions. In one example, optionally, the polymerizable composition can comprise at least one hydrophobic monomer, or at least one cross-linking agent, or any combination thereof.

As previously stated, the polymerizable compositions of the present disclosure comprise at least one hydrophilic vinyl amide monomer. The hydrophilic vinyl amide monomer is understood to be a non-silicone polymerizable ingredient having only one polymerizable functional group present in its molecular structure. The polymerizable compositions can comprise a single hydrophilic vinyl amide monomer, or can comprise two or more hydrophilic vinyl amide monomers present as the hydrophilic vinyl amide monomer component. In addition to the hydrophilic vinyl amide monomer, additional non-vinyl amide non-silicon hydrophilic monomers can optionally be included in the polymerizable composition. Non-vinyl amide non-silicon hydrophilic monomers which can be used as the hydrophilic monomer or the hydrophilic monomer component in the polymerizable compositions disclosed herein include, for example, acrylamide-containing monomers, or acrylate-containing monomers, or acrylic acid-containing monomers, or methacrylate-containing monomers, or methacrylic acid-containing monomers, or any combination thereof. In one example, the non-vinyl amide hydrophilic monomer or monomer component can comprise or consist of a methacrylate-containing hydrophilic monomer. It is understood that the vinyl amide hydrophilic monomer or hydrophilic monomer component is a non-silicon monomer.

Examples of non-vinyl amide hydrophilic monomers which can be included in the present polymerizable compositions can include, for example, N,N-dimethylacrylamide (DMA), or 2-hydroxyethyl acrylate, or 2-hydroxyethyl methacrylate (HEMA), or 2-hydroxypropyl methacrylate, or 2-hydroxybutyl methacrylate (HOB), or 2-hydroxybutyl acrylate, or 4-hydroxybutyl acrylate, or glycerol methacrylate, or 2-hydroxyethyl methacrylamide, or polyethyleneglycol monomethacrylate, or methacrylic acid, or acrylic acid, or any combination thereof.

In one example, the non-vinyl amide hydrophilic monomer or hydrophilic monomer component can comprise or consist of a vinyl-containing monomer. Examples of hydrophilic vinyl-containing monomers which can be provided in the polymerizable compositions include, without limitation, N-2-hydroxyethyl vinyl carbamate, or N-carboxy-β-alanine N-vinyl ester, or 1,4-butanediol vinyl ether (BVE), or ethylene glycol vinyl ether (EGVE), or diethylene glycol vinyl ether (DEGVE), or any combination thereof.

As previously discussed, the polymerizable compositions of the present disclosure comprise at least one hydrophilic vinyl amide monomer or hydrophilic monomer component The hydrophilic vinyl amide monomer or monomer component comprises a hydrophilic amide monomer having one N-vinyl group, such as, for example, N-vinyl formamide, or N-vinyl acetamide, or N-vinyl-N-ethyl acetamide, or N-vinyl isopropylamide, or N-vinyl-N-methyl acetamide (VMA), or N-vinyl pyrrolidone (NVP), or N-vinyl caprolactam, or any combination thereof. In one example, the hydrophilic vinyl amide monomer or hydrophilic vinyl amide monomer component comprises N-vinyl-N-methyl acetamide (VMA), or N-vinyl pyrrolidone (NVP), or any combination thereof. In another example, the hydrophilic vinyl amide monomer or hydrophilic vinyl amide monomer component comprises N-vinyl-N-methyl acetamide (VMA). For example, the hydrophilic vinyl amide monomer or monomer component can comprise or consist of VMA. In one particular example, the hydrophilic vinyl amide monomer can be VMA.

In another example, the non-vinyl amide hydrophilic monomer or monomer component can comprise or consist of a vinyl ether-containing monomer. Examples of vinyl ether-containing monomers include, without limitation, 1,4-butanediol vinyl ether (BVE), or ethylene glycol vinyl ether (EGVE), or diethylene glycol vinyl ether (DEGVE), or any combination thereof. In one example, the non-vinyl amide hydrophilic monomer component comprises or consists of BVE. In another example, the non-vinyl amide hydrophilic monomer component comprises or consists of EGVE. In yet another example, the non-vinyl amide hydrophilic monomer component comprises or consists of DEGVE.

In yet another example, the non-vinyl amide hydrophilic monomer component can comprise or consist of a combination of a first non-vinyl amide hydrophilic monomer or monomer component, and a second non-vinyl amide hydrophilic monomer or hydrophilic monomer component. In one example, the first hydrophilic monomer has a different polymerizable functional group than the second hydrophilic monomer. In another example, each monomer of the first hydrophilic monomer has a different polymerizable functional group than the second hydrophilic monomer. In another example, the first hydrophilic monomer has a different polymerizable functional group than each monomer of the second hydrophilic monomer component. In yet another example, each monomer of the first hydrophilic monomer component has a different polymerizable functional group than each monomer of the second hydrophilic monomer component.

As previously discussed, the hydrophilic vinyl amide monomer or a hydrophilic vinyl amide monomer component is present in the polymerizable composition in an amount from 30 to 60 unit parts of the polymerizable composition. The hydrophilic vinyl amide monomer or monomer component can be present in the polymerizable composition from 40 to 55 unit parts, or from 45 to 50 unit parts by weight. When the hydrophilic vinyl amide monomer component of the polymerizable composition comprises a first hydrophilic vinyl amide monomer or monomer component and a second hydrophilic vinyl amide monomer or monomer component, the second hydrophilic vinyl amide monomer or monomer component can be present in the polymerizable composition in an amount from 0.1 to 20 unit parts of the polymerizable composition. For example, of the total amount of from 30 to 60 unit parts of hydrophilic vinyl amide monomer or monomer component present in the polymerizable composition, 29.9 to 40 unit parts can comprise the first hydrophilic vinyl amide monomer or monomer component, and 0.1 to 20 unit parts can comprise the second hydrophilic vinyl amide monomer or monomer component. In another example, the second hydrophilic vinyl amide monomer or monomer component can be present in the polymerizable composition from 1 to 15 unit parts, or from 2 to 10 unit parts, or from 3 to 7 unit parts.

As used herein, a vinyl-containing monomer is a monomer having a single polymerizable carbon-carbon double bond (i.e., a vinyl polymerizable functional group) present in its molecular structure, where, under free radical polymerization, the carbon-carbon double bond in the vinyl polymerizable functional group is less reactive than the carbon-carbon double bond present in an acrylate or a methacrylate polymerizable functional group. In other words, although a carbon-carbon double bond is present in acrylate groups and methacrylate groups, as understood herein, monomers comprising a single acrylate or methacrylate polymerizable group are not considered to be vinyl-containing monomers. Examples of polymerizable groups having carbon-carbon double bonds which are less reactive than the carbon-carbon double bonds of acrylate or methacrylate polymerizable groups include vinyl amide, vinyl ether, vinyl ester, and allyl ester polymerizable groups. Thus, as used herein, examples of vinyl-containing monomers include monomers having a single vinyl amide, a single vinyl ether, a single vinyl ester, or a single allyl ester polymerizable group.

The contact lenses of the present disclosure, as they are configured to be placed or disposed on a cornea of an animal or human eye, are ophthalmically acceptable contact lenses. As used herein, an ophthalmically acceptable contact lens is understood to be a contact lens having at least one of a number of different properties as described below. In one particular example, an ophthalmically acceptable contact lens is understood to be a contact lens having lens surfaces having a captive bubble dynamic advancing contact angle less than 70 degrees when the lens is fully hydrated. An ophthalmically acceptable contact lens can be formed of, and packaged in, ophthalmically acceptable ingredients such that the lens is not cytotoxic and does not release irritating and/or toxic ingredients during wear. An ophthalmically acceptable contact lens can have a level of clarity in the optic zone of the lens (i.e., the portion of the lens providing vision correction) sufficient for its intended use in contact with the cornea of an eye, for example, a transmittance of at least 80%, or at least 90%, or at least 95% of visible light. An ophthalmically acceptable contact lens can have sufficient mechanical properties to facilitate lens handling and care for a duration of time based on its intended lifetime. For example, its modulus, tensile strength, and elongation can be sufficient to withstand insertion, wear, removal and, optionally, cleaning over the intended lifetime of the lens. The level of these properties which are appropriate will vary depending upon the intended lifetime and usage of the lens (e.g., single use daily disposable, multiple use monthly, etc). An ophthalmically acceptable contact lens can have an effective or appropriate ionoflux to substantially inhibit or substantially prevent corneal staining, such as corneal staining more severe than superficial or moderate corneal staining after continuous wear of the lens on a cornea for 8 or more hours. An ophthalmically acceptable contact lens can have a level of oxygen permeability sufficient to allow oxygen to reach the cornea of an eye wearing the lens in an amount sufficient for long term corneal health. An ophthalmically acceptable contact lens can be a lens which does not cause substantial or undue corneal swelling in an eye wearing the lens, for example, no more than about 5% or 10% corneal swelling after being worn on a cornea of an eye during an overnight sleep. An ophthalmically acceptable contact lens can be a lens which allows movement of the lens on the cornea of an eye wearing the lens sufficient to facilitate tear flow between the lens and the eye, in other words, does not cause the lens to adhere to the eye with sufficient force to prevent normal lens movement, and that has a low enough level of movement on the eye to allow vision correction. An ophthalmically acceptable contact lens can be a lens which allows wearing of the lens on the eye without undue or significant discomfort and/or irritation and/or pain. An ophthalmically acceptable contact lens can be a lens which inhibits or substantially prevents lipid and/or protein deposition sufficient to cause the lens wearer to remove the lens because of such deposits. An ophthalmically acceptable contact lens can have at least one of a water content, or a surface wettability, or a modulus or a design, or any combination thereof, that is effective to facilitate ophthalmically compatible wearing of the contact lens by a contact lens wearer at least for one day. Ophthalmically compatible wearing is understood to refer to the wearing of a lens by a lens wearer with little or no discomfort, and with little or no occurrence of corneal staining. Determining whether a contact lens is ophthalmically acceptable can be achieved using conventional clinical methods, such as those performed by an eye care practitioner, and as understood by persons of ordinary skill in the art.

In one example of the present disclosure, the contact lens can have ophthalmically acceptably wettable lens surfaces. For example, the contact lens can have the ophthalmically acceptably wettable lens surfaces when the polymerizable composition used to form the polymeric lens body is free of an internal wetting agent, or when the polymerizable composition used to form the polymeric lens body is free of an organic diluent, or when the polymeric lens body is extracted in water or an aqueous solution free of a volatile organic solvent, or when the polymeric lens body is free of a surface plasma treatment, or any combination thereof.

One approach commonly used in the art to increase the wettability of contact lens surfaces is to apply treatments to the lens surfaces or to modify the lens surfaces. In accordance with the present disclosure, the silicone hydrogel contact lenses can have ophthalmically acceptably wettable lens surfaces without the presence of a surface treatment or surface modification. Surface treatments include, for example, plasma and corona treatments which increase the hydrophilicity of the lens surface. While it is possible to apply one or more surface plasma treatments to the present lens bodies, it is not necessary to do so in order to obtain a silicone hydrogel contact lens having ophthalmically acceptably wettable lens surfaces when fully hydrated. In other words, in one example, the silicone hydrogel contact lenses of the present disclosure can be can be free of a surface plasma or corona treatment.

Surface modifications include binding wetting agents to the lens surface, such as, for example, binding a wetting agent such as a hydrophilic polymer to at least a lens surface by chemical bonding or another form of chemical interaction. In some cases, the wetting agent may be bound to the lens surface as well as a least a portion of the polymeric matrix of the lens, i.e., at least a portion of the bulk of the lens, by chemical bonding or another form of chemical interaction. The ophthalmically acceptably wettable lens surfaces of the present disclosure can be ophthalmically acceptably wettable without the presence of a wetting agent (e.g., a polymeric material or a non-polymeric material) bound to at least the lens surface. While it is possible to bind one or more wetting agents to the present lenses, it is not necessary to do so in order to obtain a silicone hydrogel contact lens having ophthalmically acceptably wettable lens surfaces when fully hydrated. Thus, in one example, the lenses of the present disclosure can comprise wetting agents, such as, for example, hydrophilic polymers and including polyvinyl pyrrolidone, bound to a surface of the lens. Alternatively, in another example, the silicone hydrogel contact lenses of the present disclosure can be free of a wetting agent bound to the lens surface.

Another method of increasing lens wettability is to physically entrap a wetting agent within the lens body or contact lens, such as by introducing the wetting agent into the lens body when the lens body is swollen, and then returning the lens body to a less swollen state, thereby entrapping a portion of a wetting agent within the lens body. The wetting agent can be permanently trapped within the lens body, or can be released from the lens over time, such as during wear. The ophthalmically acceptably wettable lens surfaces of the present disclosure can be ophthalmically acceptably wettable without the presence of a wetting agent (e.g., a polymeric material or a non-polymeric material) physically entrapped in the lens body following formation of the polymeric lens body. While it is possible to physically entrap one or more wetting agents in the present lenses, it is not necessary to do so in order to obtain a silicone hydrogel contact lens having ophthalmically acceptably wettable lens surfaces when fully hydrated. Thus, in one example, the lenses of the present disclosure can comprise wetting agents, such as, for example, hydrophilic polymers and including polyvinyl pyrrolidone, entrapped within the lenses. Alternatively, the silicone hydrogel contact lenses of the present disclosure can be free of a wetting agent physically entrapped within the lens. As used herein, physically entrapped refers to immobilizing a wetting agent, or other ingredient, in the polymeric matrix of the lens with little or no chemical bonding or chemical interaction being present between the wetting agent and or other ingredient and the polymeric matrix. This is in contrast to ingredients that are chemically bound to the polymeric matrix, such as by ionic bonds, covalent bonds, van der Waals forces, and the like.

Another approach commonly used in the art to increase the wettability of silicone hydrogel contact lenses includes adding one or more wetting agents to the polymerizable composition. In one example, the wetting agent can be a polymeric wetting agent. However, the contact lenses of the present disclosure can have ophthalmically acceptably wettable lens surfaces when the polymerizable composition used to form the polymeric lens body is free of a wetting agent. While it is possible to include one or more wetting agents in the present polymerizable compositions to increase the wettability of the silicone hydrogel contact lenses of the present disclosure, it is not necessary to do so in order to obtain a silicone hydrogel contact lens having ophthalmically acceptably wettable lens surfaces. In other words, in one example, the silicone hydrogel contact lenses of the present disclosure can be formed from polymerizable compositions free of wetting agents. Alternatively, in another example, the polymerizable compositions of the present invention can further comprise a wetting agent.

In one example, the wetting agent can be an internal wetting agent. The internal wetting agent can be bound within at least a portion of the polymeric matrix of the lens. For example, the internal wetting agent can be bound within at least a portion of the polymeric matrix of the lens by chemical bonding or another form of chemical interaction. In some cases, the wetting agent may be bound to the lens surface as well. The internal wetting agent can comprise a polymeric material or a non-polymeric material. While it is possible to bind one or more internal wetting agents within the polymeric matrix of the present lenses, it is not necessary to do so in order to obtain a silicone hydrogel contact lens having ophthalmically acceptably wettable lens surfaces when fully hydrated. Thus, in one example, the lenses of the present disclosure can comprise internal wetting agents bound to at least a portion of the polymeric matrix of the lens. Alternatively, in another example, the silicone hydrogel contact lenses of the present disclosure can be free of an internal wetting agent bound to at least a portion of the polymeric matrix of the lens.

In another example, the wetting agent can be an internal polymeric wetting agent. The internal polymeric wetting agent can be present in the polymeric lens body as part of an interpenetrating polymer network (IPN) or a semi-IPN. An interpenetrating polymer network is formed by at least two polymers, each of which is crosslinked to itself, but none of which are crosslinked to each other. Similarly, a semi-IPN is formed by at least two polymers, at least one of which is crosslinked to itself but not to the other polymer, and the other of which is not crosslinked either to itself or the other polymer. In one example of the present disclosure, the contact lens can have ophthalmically acceptably wettable lens surfaces when the polymeric lens body is free of an internal polymeric wetting agent present in the lens body as an IPN or a semi-IPN. Alternatively, the contact lens can comprise an internal polymeric wetting agent present in the lens body as an IPN or a semi-IPN.

In one example, the lens can comprise a polymeric lens body that is the reaction product of a miscible polymerizable composition comprising (a) a first siloxane monomer represented by formula (1):

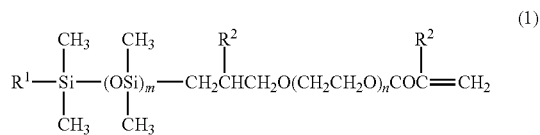

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, the first siloxane monomer having a number average molecular weight of from 400 daltons to 700 daltons; (b) a second siloxane monomer having a number average molecular weight greater than 7,000 daltons, wherein a total amount of siloxane monomers present in the polymerizable composition is from 30 unit parts to 50 unit parts; and (c) at least one hydrophilic amide monomer having one N-vinyl group, the hydrophilic amide monomer being present in the polymerizable composition in an amount from 30 to 60 unit parts; wherein the polymerizable composition is free of a polymeric internal wetting agent, the polymeric lens body is free of a plasma treatment, and the contact lens has ophthalmically acceptably wettable lens surfaces when fully hydrated, having a lens surface of the polymeric lens having a captive bubble dynamic advancing contact angle less than 70 degrees. Optionally, the polymerizable composition can be essentially free of an organic diluent, or can be essentially of free of N,N-dimethylacrylamide (DMA), can comprise at least one vinyl-containing cross-linking agent, or the first siloxane monomer and the second siloxane monomer can be present in the polymerizable composition in a ratio from about 2:1 to about 10:1 based on unit parts by weight, or any combination thereof.

In yet another example, the wetting agent can be a linking compound present in the polymerizable composition used to form the lens body, or a linking agent physically entrapped within the polymeric lens body after the lens body has been formed. When the wetting agent is a linking compound, after polymerization of the lens body or entrapment of the linking agent in the polymeric lens body, the linking compound can subsequently link a second wetting agent to the lens body when the lens body is contacted by the wetting agent. The linking can occur as part of the manufacturing process, for example as a washing process, or can take place when the lens body is contacted by a packaging solution. The linking can take the form of an ionic bond, or a covalent bond, or a form of van der Waals attraction. The linking agent can comprise a boronic acid moiety or group such that a polymerized boronic acid moiety or group is present in the polymeric lens body, or such that a boronic acid moiety or group is physically entrapped in the polymeric lens body. For example, when the linking agent comprises a form of boronic acid, the second wetting agent can comprise a form of poly(vinyl alcohol) which becomes bound to the form of boronic acid. Optionally, silicone hydrogel contact lenses of the present disclosure can be understood to be free of linking agents. In one example, the silicone hydrogel contact lenses can be free of boronic acid moieties or groups, including polymerized boronic acid moieties or groups, that is, specifically, the silicone hydrogel contact lenses can be formed from a polymerizable composition free of a form of boronic acid such as, for example, a polymerizable form of boronic acid including vinyl phenyl boronic acid (VPB), can be formed of a polymer free of units derived from a polymerizable form of boronic acid such as vinyl phenyl boronic acid (VPB), and the polymeric lens body and the silicone hydrogel contact lenses can be free of a form of boronic acid, including polymeric or non-polymeric form of boronic acid, physically entrapped therein. Alternatively, the polymerizable composition, or the polymeric lens body, or the silicone hydrogel contact lens, or any combination thereof, can comprise at least one linking agent.

In addition to including wetting agents in the polymerizable composition and modifying the lens surfaces, washing polymeric lens bodies in volatile organic solvents or aqueous solutions of volatile organic solvent has been used to increase the wettability of lens surfaces. While it is possible to wash the present polymeric lens bodies in a volatile organic solvent or an aqueous solution of a volatile organic solvent, in accordance with the present disclosure, it is not necessary to do so in order to obtain a silicone hydrogel contact lens having ophthalmically acceptably wettable lens surfaces when fully hydrated. In other words, in one example, the silicone hydrogel contact lenses of the present invention have not been exposed to a volatile organic solvent, including a solution of a volatile organic solvent, as part of a manufacturing process. In one example, the silicone hydrogel contact lenses of the present invention can be formed from a polymerizable composition free of a wetting agent, or the polymeric lens body and/or hydrated contact lens can be free of a wetting agent, or free of surface treatment, or free of a surface modification, or was not exposed to a volatile organic solvent during the manufacturing process, or any combination thereof. Instead, for example, the silicone hydrogel contact lenses can be washed in washing liquids free of a volatile organic solvent, such as, for example, water or an aqueous solution free of a volatile organic solvent, including liquids free of a volatile lower alcohol.

The use of volatile organic solvents to extract lens bodies contributes significantly to production costs, due to factors such as the cost of the organic solvents, the cost of disposal of the solvents, the need to employ explosion-proof production equipment, the need to remove the solvents from the lenses prior to packaging, and the like. However, development of polymerizable compositions capable of consistently producing contact lenses with ophthalmically acceptably wettable lens surfaces when extracted in aqueous liquids free of volatile organic solvents can be challenging. For example, it is common to find non-wetting regions present on the lens surfaces of contact lenses which have been extracted in aqueous liquids free of volatile organic solvents.

As previously discussed, in one example of the present disclosure, the contact lenses are contact lenses which have not been exposed to a volatile organic solvent, such as a lower alcohol, during their manufacture. In other words, the washing, extraction and hydration liquids used for such lenses, as well as all liquids used during wet demolding, or wet delensing, or washing, or any other manufacturing step, are all free of volatile organic solvents. In one example, the polymerizable composition used to form these lenses which are not contacted by a volatile organic solvent can comprise a non-vinyl amide hydrophilic monomer or monomer component, such as, for example, a hydrophilic vinyl ether-containing monomer. The vinyl ether-containing monomers can include, for example, BVE, or EGVE, or DEGVE, or any combination thereof. In one particular example, the vinyl ether-containing monomer can be a vinyl ether-containing monomer which is more hydrophilic than BVE, such as, for example, DEGVE. In another example, the hydrophilic monomer component of the polymerizable composition can be a mixture of a first non-vinyl amide hydrophilic monomer and a second non-vinyl amide hydrophilic monomer which is a vinyl ether-containing monomer. Examples of vinyl ether-containing hydrophilic monomers include, for example, BVE, or DEGVE, or EGVE, or any combination thereof.

When present, the hydrophilic vinyl ether-containing monomer or monomer component can be present in the polymerizable composition in an amount from about 1 to about 15 unit parts, or from about 3 to about 10 unit parts. When present as a mixture with a non-vinyl amide hydrophilic vinyl-containing monomer which is not a vinyl ether, the portion of the hydrophilic vinyl-containing monomer or monomer component which is not a vinyl ether and the hydrophilic vinyl ether-containing monomer or monomer component can be present in the polymerizable composition in a ratio of at least 3:1, or from about 3:1 to about 15:1, or of about 4:1 based on the ratio of the unit parts by weight of the hydrophilic vinyl-containing monomer or monomer component which is not a vinyl ether to the unit parts by weight of the hydrophilic vinyl ether-containing monomer or monomer component.

Another approach for producing contact lenses having ophthalmically acceptably wettable lens surfaces in accordance with the present disclosure, particularly lenses extracted in liquids free of a volatile organic solvent and including lenses which are not contacted by a volatile organic solvent during manufacturing, can be to limit the amount of a vinyl-containing cross-linking agent or cross-linking agent component included in the polymerizable composition. For example, a vinyl-containing cross-linking agent or cross-linking agent component can be present in the polymerizable composition in an amount from about 0.01 to about 0.80 unit parts, or from 0.01 to about 0.30 unit parts, or from about 0.05 to about 0.20 unit parts, or in an amount of about 0.1 unit parts. In one example, a vinyl-containing cross-linking agent or cross-linking agent component can be present in the polymerizable composition in an amount effective to produce a contact lens having improved wettability as compared to a contact lens produced from the same polymerizable composition but having an amount of the vinyl-containing cross-linking agent or cross-linking agent component greater than about 2.0 unit parts, or greater than 1.0 unit parts, or greater than about 0.8 unit parts, or greater than about 0.5 unit parts, or greater than about 0.3 unit parts.

While limiting the amount of the vinyl-containing cross-linking agent or cross-linking agent component can improve wettability, in one example, the inclusion of a vinyl-containing cross-linking agent or cross-linking agent component in the polymerizable composition can improve the dimensional stability of the resulting contact lens formed from the polymerizable composition. Thus, in some polymerizable compositions, a vinyl-containing cross-linking agent or cross-linking agent component can be present in the polymerizable in an amount effective to produce a contact lens having improved dimensional stability as compared to a contact lens produced from the same polymerizable composition but without the vinyl-containing cross-linking agent or cross-linking agent component.

Yet another approach for producing contact lenses having ophthalmically acceptable wettable surfaces in accordance with the present disclosure, particularly lenses washed in liquids free of a volatile organic solvent, can be to include an amount of a vinyl-containing cross-linking agent or cross-linking agent component in the polymerizable composition based on the ratio of the unit parts by weight of the hydrophilic vinyl amide monomer or monomer component present in the composition to the unit parts by weight of the vinyl-containing cross-linking agent or cross-linking agent component present in the composition. For example, the total unit parts of the hydrophilic vinyl amide monomer or monomer component and the total unit parts of the vinyl-containing cross-linking agent or cross-linking agent component can be present in the polymerizable composition in a ratio greater than about 125:1, or from about 150:1 to about 625:1, or from about 200:1 to about 600:1, or from about 250:1 to about 500:1, or from about 450:1 to about 500:1, based on the ratio of the unit parts by weight of all the hydrophilic vinyl amide monomers present in the polymerizable composition to the total unit parts by weight of all the vinyl-containing cross-linking agents present in the polymerizable composition.

As previously discussed, optionally, the polymerizable composition can also comprise at least one cross-linking agent. The optional at least one cross-linking agent can be a single cross-linking agent, or can be two or more cross-linking agents present as a cross-linking agent component. As used herein, the one cross-linking agent or the cross-linking agents of the cross-linking agent component are non-silicon chemicals and thus are different from siloxane monomers present in the polymerizable compositions, including multifunctional siloxane monomers.

In accordance with the present disclosure, a cross-linking agent is understood to be a monomer having more than one polymerizable functional group as part of its molecular structure, such as two or three or four polymerizable functional groups, i.e., a multifunctional monomer such as a bifunctional or trifunctional or tetrafunctional monomer. Non-silicon cross-linking agents that can be used in the polymerizable compositions disclosed herein include, for example, without limitation, allyl(meth)acrylate, or lower alkylene glycol di(meth)acrylate, or poly(lower alkylene) glycol di(meth)acrylate, or lower alkylene di(meth)acrylate, or divinyl ether, or divinyl sulfone, or di- and trivinylbenzene, or trimethylolpropane tri(meth)acrylate, or pentaerythritol tetra(meth)acrylate, or bisphenol A di(meth)acrylate, or methylenebis(meth)acrylamide, or triallyl phthalate and diallyl phthalate, or any combination thereof. Cross-linking agents, as disclosed in Examples 1-25, include, for example, ethylene glycol dimethacrylate (EGDMA), or triethylene glycol dimethacrylate (TEGDMA), or triethylene glycol divinyl ether (TEGDVE), or any combination thereof. In one example, the cross-linking agent can have a molecular weight less than 1500 daltons, or less than 1000 daltons, or less than 500 daltons, or less than 200 daltons.

In one example, the cross-linking agent or cross-linking agent component can comprise or consist of a vinyl-containing cross-linking agent. As used herein, a vinyl-containing cross-linking agent is a monomer having at least two polymerizable carbon-carbon double bonds (i.e., at least two vinyl polymerizable functional groups) present in its molecular structure, where each of the at least two polymerizable carbon-carbon double bonds present in the vinyl polymerizable functional groups of the vinyl-containing cross-linking agent is less reactive than a carbon-carbon double bond present in an acrylate or methacrylate polymerizable functional group. Although carbon-carbon double bonds are present in acrylate and methacrylate polymerizable functional groups, as understood herein, cross-linking agents comprising one or more acrylate or methacrylate polymerizable group (e.g., an acrylate-containing cross-linking agent or a methacrylate-containing cross-linking agent) are not considered to be vinyl-containing cross-linking agents. Polymerizable functional groups having carbon-carbon double bonds which are less reactive than the carbon-carbon double bonds of acrylate or methacrylate polymerizable groups include, for example, vinyl amide, vinyl ester, vinyl ether and allyl ester polymerizable functional groups. Thus, as used herein, vinyl-containing cross-linking agents include, for example, cross-linking agents having at least two polymerizable functional groups selected from a vinyl amide, a vinyl ether, a vinyl ester, an allyl ester, and any combination thereof. As used herein, a mixed vinyl-containing cross-linking agent is a cross-linking agent having at least one polymerizable carbon-carbon double bond (i.e., at least one vinyl polymerizable functional group) present in its structure which is less reactive than the carbon-carbon double bond present in an acrylate or methacrylate polymerizable functional group, and at least one polymerizable functional group present in its structure having a carbon-carbon double bond which is at least as reactive as the carbon-carbon double bond in an acrylate or methacrylate polymerizable functional group.

In one example, the cross-linking agent or cross-linking agent component can comprise or consist of a non-vinyl-containing cross-linking agent, i.e., a cross-linking agent which is not a vinyl-containing cross-linking agent. For example, the non-vinyl-containing cross-linking agent or cross-linking agent component can comprise or consist of an acrylate-containing cross-linking agent (i.e., a cross-linking agent having at least two acrylate polymerizable functional groups), or a methacrylate-containing cross-linking agent (i.e., at least two methacrylate polymerizable functional groups), or at least one acrylate-containing cross-linking agent and at least one methacrylate-containing cross-linking agent.

The cross-linking agent component can comprise or consist of a combination of two or more cross-linking agents, each of which has a different polymerizable functional group. For example, the cross-linking agent component can comprise one vinyl-containing cross-linking agent, and one acrylate-containing cross-linking agent. The cross-linking agent component can comprise one vinyl-containing cross-linking agent and one methacrylate-containing cross-linking group. The cross-linking agent component can comprise or consist of one vinyl ether-containing cross-linking agent, and one methacrylate-containing cross-linking agent.

In one example, the lens can comprise a polymeric lens body that is the reaction product of a miscible polymerizable composition comprising (a) a first siloxane monomer represented by formula (1):

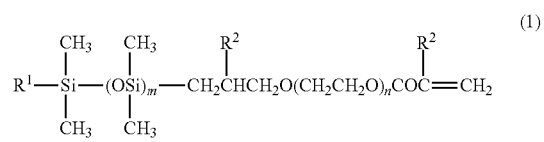

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, the first siloxane monomer having a number average molecular weight of from 400 daltons to 700 daltons; (b) a second siloxane monomer having a number average molecular weight greater than 7,000 daltons, wherein a total amount of siloxane monomers present in the polymerizable composition is from 30 unit parts to 50 unit parts; (c) at least one hydrophilic amide monomer having one N-vinyl group, the hydrophilic amide monomer being present in the polymerizable composition in an amount from 30 to 60 unit parts; (d) at least one vinyl-containing cross-linking agent, and (e) at least one acrylate-containing cross-linking agent; wherein the contact lens has ophthalmically acceptably wettable lens surfaces when fully hydrated. Optionally, the polymerizable composition can be essentially free of an organic diluent, or can be essentially of free of N,N-dimethylacrylamide (DMA), or the first siloxane monomer and the second siloxane monomer can be present in the polymerizable composition in a ratio from about 2:1 to about 10:1 based on unit parts by weight, or the lens can have a lens surface of the polymeric lens having a captive bubble dynamic advancing contact angle less than 70 degrees, or any combination thereof.

Optionally, the polymerizable composition of the present disclosure can comprise or consist of at least one vinyl-containing cross-linking agent or cross-linking agent component, and can be free of a non-silicon non-vinyl crosslinking agent. In other words, in this example, the polymerizable composition comprises the at least one siloxane monomer, the at least one hydrophilic monomer, and at least one cross-linking agent, wherein the at least one cross-linking agent consists of at least one vinyl-containing cross-linking agent (i.e., a single vinyl-containing cross-linking agent or a vinyl-containing cross-linking agent component comprised of two or more vinyl-containing cross-linking agents), as no non-silicone cross-linking agents other than vinyl-containing cross-linking agents are present in the polymerizable composition. In other words, in this example, no non-vinyl cross-linking agents are present in the polymerizable composition.

The optional cross-linking agent or cross-linking agent component can be present in the polymerizable composition in an amount from 0.01 to 10.0 unit parts, such as, for example, from 0.05 to 5.0 unit parts, or from 0.1 to 2.0 unit parts, or from 0.2 to 1.0 unit parts, or from 0.3 to 0.8 unit parts. In one example, when the cross-linking agent or cross-linking agent component comprises a vinyl-containing cross-linking agent, the vinyl-containing cross-linking agent or cross-linking agent component can be present in the polymerizable composition in an amount from 0.01 to 0.50 unit parts, such as, for example, 0.05 to 0.30 unit parts or from 0.1 to 0.2 unit parts. When the at least one cross-linking agent is a acrylate-containing or methacrylate-containing cross-linking agent or cross-linking agent component, the acrylate-containing or methacrylate-containing cross-linking agent or cross-linking agent component can be present in the polymerizable composition in an amount from 0.1 to 2.0 unit parts, such as, for example, 0.3 to 1.2 unit parts or from 0.5 to 0.8 unit parts. When a combination of a vinyl-containing cross-linking agent or crosslinking agent component, and an acrylate-containing or methacrylate-containing cross-linking agent or cross-linking agent component is used, the vinyl-containing cross-linking agent or cross-linking agent component and the acrylate-containing or methacrylate-containing cross-linking agent or cross-linking agent component can be present in the polymerizable composition in a ratio from 1:2 to 1:20, or from 1:3 to 1:12, or from 1:4 to 1:7 based on the ratio by weight of the unit parts of the vinyl-containing cross-linking agent or cross-linking agent component to the unit parts of the acrylate-containing or methacrylate-containing cross-linking agent or cross-linking component.

When the polymerizable composition comprises a first siloxane monomer of formula (1) and at least one cross-linking agent, the first siloxane monomer and the at least one cross-linking agent (i.e., a single cross-linking agent or a cross-linking agent component composed of two or more cross-linking agents) can be present in the polymerizable composition in a ratio of at least 10:1 based on the total unit parts by weight of the first siloxane monomer to the total unit parts by weight of the at least one cross-linking agent (i.e., the sum of the unit parts of all vinyl-containing cross-linking agents present in the polymerizable composition). For example, the ratio can be at least 25:1 or at least 50:1 or at least 100:1 based on unit parts by weight. In one example, the at least one cross-linking agent can comprise at least one vinyl-containing cross-linking agent, and at least one methacrylate-containing cross-linking agent. In another example, the at least one cross-linking agent can consist of only one or more vinyl-containing cross linking agents. In one particular example, the at least one cross-linking agent can comprise or consist of at least one vinyl ether-containing cross-linking agent.

When the at least one cross-linking agent comprises or consists of at least one vinyl-containing cross-linking agent (i.e., a single vinyl-containing cross-linking agent or a vinyl-containing cross-linking agent component composed of two or more vinyl-containing cross-linking agents), the first siloxane monomer and the at least one vinyl-containing cross-linking agent can be present in the polymerizable composition in a ratio of at least about 50:1 based on a ratio of a total number of unit parts of the first siloxane monomer to a total number of unit parts of the least one vinyl-containing cross-linking agent (i.e., the sum of the unit parts of all vinyl-containing cross-linking agents present in the polymerizable composition). For example, the ratio can be from about 50:1 to about 500:1, or from about 100:1 to about 400:1, or from about 200:1 to about 300:1 based on unit parts by weight.

When the polymerizable composition comprises a first siloxane monomer of formula (1) and at least one additional siloxane monomer (i.e., a second siloxane, and optionally a third siloxane monomer, a fourth siloxane monomer, etc.) in combination with at least one cross-linking agent, the siloxane monomers and the at least one vinyl-containing monomer can be present in the polymerizable composition in a ratio of at least about 100:1 based on a ratio of a total number of unit parts of the each siloxane monomer present in the polymerizable composition (i.e., the sum of the unit parts of the first siloxane and the second siloxane monomer and, if present, the third siloxane monomer, etc.) to a total number of unit parts of the least one vinyl-containing cross-linking agent (i.e., the sum of the unit parts of all vinyl-containing cross-linking agents present in the polymerizable composition). For example, the ratio can be from about 50:1 to about 500:1, or from about 100:1 to about 400:1, or from about 200:1 to about 300:1 based on unit parts by weight.

In addition, the polymerizable compositions of the present disclosure can optionally comprise at least one non-silicon hydrophobic monomer. The hydrophobic monomer is understood to be a non-silicone polymerizable ingredient having only one polymerizable functional group present in its molecular structure. The at least one hydrophobic monomer of the polymerizable composition can be one hydrophobic monomer, or can comprise a hydrophilic monomer component composed of at least two hydrophilic monomers. Examples of hydrophobic monomers that can be used in the polymerizable compositions disclosed herein, include, without limitation, acrylate-containing hydrophobic monomers, or methacrylate-containing hydrophobic monomers, or any combination thereof. Examples of hydrophobic monomers include, without limitation, methyl acrylate, or ethyl acrylate, or propyl acrylate, or isopropyl acrylate, or cyclohexyl acrylate, or 2-ethylhexyl acrylate, or methyl methacrylate (MMA), or ethyl methacrylate, or propyl methacrylate, or butyl acrylate, or vinyl acetate, or vinyl propionate, or vinyl butyrate, or vinyl valerate, or styrene, or chloroprene, or vinyl chloride, or vinylidene chloride, or acrylonitrile, or 1-butene, or butadiene, or methacrylonitrile, or vinyltoluene, or vinyl ethyl ether, or perfluorohexylethylthiocarbonylaminoethyl methacrylate, or isobornyl methacrylate, or trifluoroethyl methacrylate, or hexafluoroisopropyl methacrylate, or hexafluorobutyl methacrylate, or ethylene glycol methyl ether methacrylate (EGMA), or any combination thereof. In one particular example, the hydrophobic monomer or monomer component can comprise or consist of MMA, or EGMA, or both.

When present in the polymerizable composition, the hydrophobic monomer or monomer component can be present in an amount from about 5 to about 25 unit parts, or from about 10 to about 20 unit parts.

In one example, the hydrophobic monomer component can comprise at least two hydrophobic monomers each having different polymerizable functional groups. In another example, the hydrophobic monomer component can comprise at least two hydrophobic monomers each having the same polymerizable functional group. The hydrophobic monomer component can comprise or consist of two hydrophobic monomers, both having the same polymerizable functional group. In one example, the hydrophobic monomer component can comprise or consist of two hydrophobic methacrylate-containing monomers. The hydrophobic monomer component can comprise or consist of MMA and EGMA. In one example, the at least two hydrophobic monomers of the hydrophobic monomer component can comprise or consist of MMA and EGMA, and the ratio of the unit parts of MMA to the unit parts of EGMA present in the polymerizable composition can be from about 6:1 to about 1:1. The ratio of the unit parts of MMA and EGMA present in the polymerizable composition can be about 2:1 based on the unit parts of MMA to the unit parts of EGMA.

In one example, the lens can comprise a polymeric lens body that is the reaction product of a miscible polymerizable composition comprising (a) a first siloxane monomer represented by formula (1):

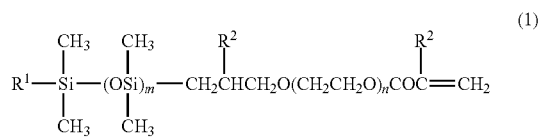

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, the first siloxane monomer having a number average molecular weight of from 400 daltons to 700 daltons; (b) a second siloxane monomer having a number average molecular weight greater than 7,000 daltons, wherein a total amount of siloxane monomers present in the polymerizable composition is from 30 unit parts to 50 unit parts; (c) at least one hydrophilic amide monomer having one N-vinyl group, the hydrophilic amide monomer being present in the polymerizable composition in an amount from 30 to 60 unit parts; and (d) at least hydrophobic monomer, wherein the contact lens has ophthalmically acceptably wettable lens surfaces when fully hydrated. Optionally, the polymerizable composition can be essentially free of an organic diluent, or can be essentially of free of N,N-dimethylacrylamide (DMA), or can comprise at least one vinyl-containing cross-linking agent, or the first siloxane monomer and the second siloxane monomer can be present in the polymerizable composition in a ratio from about 2:1 to about 10:1 based on unit parts by weight, or the lens can have a lens surface of the polymeric lens having a captive bubble dynamic advancing contact angle less than 70 degrees, or any combination thereof.

The polymerizable composition can optionally include one or more organic diluents, one or more polymerization initiators (i.e., ultraviolet (UV) initiators or thermal initiators, or both), or one or more UV absorbing agents, or one or more tinting agents, or one or more oxygen scavengers, or one or more chain transfer agents, or any combination thereof. These optional ingredients can be reactive or non-polymerizable ingredients. In one example, the polymerizable compositions can be diluent-free in that they do not contain any organic diluent to achieve miscibility between the siloxanes and the other lens forming ingredients, such as the optional hydrophilic monomers, hydrophobic monomer, and cross-linking agents. In addition, many of the present polymerizable compositions are essentially free of water (e.g., contain no more than 3.0% or 2.0% water by weight).

The polymerizable compositions disclosed herein can optionally comprise one or more organic diluents, i.e., the polymerizable composition can comprise an organic diluent, or can comprise an organic diluent component comprising two or more organic diluents. Organic diluents that can optionally be included in the present polymerizable compositions include alcohols, including lower alcohols, such as, for example, without limitation, pentanol, or hexanol, or octanol, or decanol, or any combination thereof. When included, the organic diluent or organic diluent component can be provided in the polymerizable composition in an amount from about 1 to about 70 unit parts, or from about 2 unit parts to about 50 unit parts, or from about 5 unit parts to about 30 unit parts.

The present polymerizable compositions can optionally comprise one or more polymerization initiators, i.e., the polymerizable composition can comprise an initiator, or can comprise an initiator component comprising two or more polymerization initiators. Polymerization initiators that can be included in the present polymerizable compositions include, for example, azo compounds, or organic peroxides, or both. Initiators that can be present in the polymerizable composition include, for example, without limitation, benzoin ethyl ether, or benzyl dimethyl ketal, or alpha, alpha-diethoxyacetophenone, or 2,4,6-trimethylbenzoyl diphenyl phosphine oxide, or benzoin peroxide, or t-butyl peroxide, or azobisisobutyronitorile, or azobisdimethylvaleronitorile, or any combination thereof UV photoinitiators can include, for example, phosphine oxides such as diphenyl (2,4,6-trimethyl benzoyl) phosphine oxide, or benzoin methyl ether, or 1-hydroxycyclohexylphenyl ketone, or Darocur (available from BASF, Florham Park, N.J., USA), or Irgacur (also available from BASF), or any combination thereof. In many of Examples 1-25 disclosed herein, the polymerization initiator is the thermal initiator 2,2'-azobis-2-methyl propanenitrile (VAZO-64 from E.I. DuPont de Nemours & Co., Wilmington, Del., USA). Other commonly used thermoinitiators can include 2,2'-azobis(2,4-dimethylpentanenitrile) (VAZO-52) and 1,1'-azo bis(cyanocyclohexane) (VAZO-88). The polymerization initiator or initiator component can be present in the polymerizable composition in an amount from about 0.01 unit parts to about 2.0 unit parts, or in an amount from about 0.1 unit parts to about 1.0 unit parts, or from about 0.2 unit parts to about 0.6 unit parts by weight.

Optionally, the present polymerizable compositions can comprise one or more UV absorbing agents, i.e., the polymerizable composition can comprise an UV absorbing agent, or can comprise an UV absorbing agent component comprising two or more UV absorbing agents. UV absorbing agents that can be included in the present polymerizable compositions include, for example, benzophenones, or benzotriazoles, or any combination thereof. In many of Examples 1-25 disclosed herein, the UV absorbing agent is 2-(4-Benzoyl-3-hydroxyphenoxy)ethyl acrylate (UV-416) or 2-(3-(2H-benzotriazol-2-YL)-4-hydroxy-phenyl)ethyl methacrylate (NORBLOC® 7966 from Noramco, Athens, Ga., USA). The UV absorbing agent or UV absorbing agent component can be present in the polymerizable composition in an amount from about 0.01 unit parts to about 5.0 unit parts, or in an amount from about 0.1 unit parts to about 3.0 unit parts, or from about 0.2 unit parts to about 2.0 unit parts by weight.

The polymerizable compositions of the present disclosure can also optionally include at least one tinting agent (i.e., one tinting agent or a tinting agent component comprising two or more tinting agents), although both tinted and clear lens products are contemplated. In one example, the tinting agent can be a reactive dye or pigment effective to provide color to the resulting lens product. The tinting agent or tinting agent component of the polymerizable composition can comprise a polymerizable tinting agent, or can comprise a non-polymerizable tinting agent, or any combination thereof. The polymerizable tinting agent can be a tinting agent whose molecular structure comprises a polymerizable functional group, or can be a tinting agent whose molecular structure includes both a monomer portion and a dye portion, i.e., the tinting agent can be a monomer-dye compound. The molecular structure of the tinting agent can comprise a beta sulfone functional group, or can comprise a triazine functional group. Tinting agents can include, for example, VAT Blue 6 (7,16-Dichloro-6,15-dihydroanthrazine-5,9,14,18-tetrone), or 1-Amino-4-[3-(beta-sulfatoethylsulfonyl)anilio]-2-anthraquinonesulfonic acid (C. I. Reactive Blue 19, RB-19), or a monomer-dye compound of Reactive Blue 19 and hydroxyethylmethacrylate (RB-19 HEMA), or 1,4-bis[4-[(2-methacryl-oxyethyl)phenylamino]anthraquinone (Reactive Blue 246, RB-246, available from Arran Chemical Company, Athlone, Ireland), or 1,4-Bis[(2-hydroxyethyl)amino]-9,10-anthracenedione bis(2-propenoic)ester (RB-247), or Reactive Blue 4, RB-4, or a monomer-dye compound of Reactive Blue 4 and hydroxyethyl methacrylate (RB-4 HEMA or "Blue HEMA"), or any combination thereof. In one example, the tinting agent or tinting agent component can comprise a polymerizable tinting agent. The polymerizable tinting agent component can comprise, for example, RB-246, or RB-274, or RB-4 HEMA, or RB-19 HEMA, or any combination thereof. Examples of monomer-dye compounds include RB-4 HEMA and RB-19 HEMA. Additional examples of monomer-dye compounds are described in U.S. Pat. No. 5,944,853 and U.S. Pat. No. 7,216,975, both of which are incorporated in their entirety by reference herein. Other exemplary tinting agents are disclosed, for example, in U.S. Patent Application Publication No. 2008/0048350, the disclosure of which is incorporated in its entirety herein by reference. In many of Examples 1-25 disclosed herein, the tinting agent is a reactive blue dye, such as those described in U.S. Pat. No. 4,997,897, the disclosure of which is incorporated in its entirety herein by reference. Other suitable tinting agents for use in accordance with the present invention are phthalocyanine pigments such as phthalocyanine blue, or phthalocyanine green, or chromic-alumina-cobaltous oxide, or chromium oxides, or various iron oxides for red, yellow, brown and black colors, or any combination thereof. Opaquing agents such as titanium dioxide can also be incorporated. For certain applications, a combination of tinting agents having different colors can be employed as the tinting agent component. If employed, the tinting agent or tinting agent component can be present in the polymerizable composition in an amount ranging from about 0.001 unit parts to about 15.0 unit parts, or about 0.005 unit parts to about 10.0 unit parts, or about 0.01 unit parts to about 8.0 unit parts.

The polymerizable compositions of the present disclosure can optionally comprise at least one oxygen scavenger, i.e., one oxygen scavenger or an oxygen scavenger component comprising two or more oxygen scavengers. Examples of oxygen scavengers which can be included as the oxygen scavenger or oxygen scavenger component of the present polymerizable compositions include, for example, Vitamin E, or phenolic compounds, or phosphite compounds, or phosphine compounds, or amine oxide compounds, or any combination thereof. For example, the oxygen scavenger or oxygen scavenger component can consist of or comprise a phosphine-containing compound. In many of Examples 1-25 disclosed herein, the oxygen scavenger or oxygen scavenger component is a phosphine-containing compound, such as triphenyl phosphine, or a polymerizable form of triphenyl phosphine, such as diphenyl(P-vinylphenyl)phosphine.

Chain transfer is a polymerization reaction in which the activity of a growing polymer chain is transferred to another molecule, reducing the average molecular weight of the final polymer. The polymerizable compositions of the present disclosure can optionally comprise at least one chain transfer agent, i.e., can comprise one chain transfer agent or can comprise a chain transfer agent component comprising at least two chain transfer agents. Examples of chain transfer agents which can be included as the chain transfer agent or the chain transfer component of the present polymerizable compositions include, for example, thiol compounds, or halocarbon compounds, or C3-C5 hydrocarbons, or any combination thereof. In many of Examples 1-25 disclosed herein, the chain transfer agent is allyloxy ethanol. When present in the polymerizable composition, the chain transfer agent or chain transfer agent component can be present in an amount from about 0.01 unit parts to about 1.5 unit parts, for example from about 0.1 unit parts to about 0.5 unit parts.

Due to the high level of one or more hydrophilic vinyl amide monomers present in the disclosed polymerizable compositions, the resulting silicone hydrogel contact lenses can have high equilibrium water contents (EWC)s. Methods of determining EWC are known to those of ordinary skill in the art, and can be based on weight loss from a lens during a drying process. For example, the silicone hydrogel contact lenses can have, when fully hydrated, an equilibrium water content from 20% to 75% by weight. The present contact lenses can have an EWC from about 30% to about 70%, or from about 45% to about 65%, or from about 50% to about 67%, or from about 50% to about 63%, or from about 55% to about 65% by weight.

In one example, the contact lenses of the present disclosure are ophthalmically compatible silicone hydrogel contact lenses. Many different criteria can be evaluated to determine whether or not a contact lens is ophthalmically compatible, as will be discussed later. In one example, ophthalmically acceptable contact lenses have ophthalmically acceptably wettable surfaces when fully hydrated. A silicone hydrogel contact lens having an ophthalmically acceptably wettable surfaces can be understood to refer to a silicone hydrogel contact lens that does not adversely affect the tear film of a lens wearer's eye to a degree that results in the lens wearer experiencing or reporting discomfort associated with placing or wearing the silicone hydrogel contact lens on an eye.

One method for evaluating the wettability of a lens surface is to measure the captive bubble dynamic advancing contact angle of the surface. Silicone hydrogel contact lenses of the present invention can have captive bubble dynamic advancing contact angles of less than 120 degrees, such as, for example, less than 90 degrees when fully hydrated, less than 80 degrees when fully hydrated, less than 70 degrees when fully hydrated, or less than 65 degrees when fully hydrated, or less than 60 degrees when fully hydrated, or less than 50 degrees when fully hydrated.

Another method for evaluating the wettability of a lens surface is to measure the captive bubble static contact angle of the lens surface. Silicone hydrogel contact lenses of the present invention can have captive bubble static contact angles of less than 70 degrees when fully hydrated, or less than 60 degrees when fully hydrated, or less than 55 degrees when fully hydrated, or less than 50 degrees when fully hydrated, or less than 45 degrees when fully hydrated.

The present contact lenses can have, when fully hydrated, an oxygen permeability (or Dk) of at least 55 barrers (Dk≥55 barrers), or an oxygen permeability of at least 60 barrers (Dk≥60 barrers), or an oxygen permeability of at least 65 barrers (Dk≥65 barrers). The lenses can have an oxygen permeability from about 55 barrers to about 135 barrers, or from about 60 barrers to about 120 barrers, or from about 65 barrers to about 90 barrers, or from about 50 barrers to about 75 barrers. Various methods of determining oxygen permeability are known to those of ordinary skill in the art.

The silicone hydrogel contact lenses of the present disclosure can have, when fully hydrated, an average tensile modulus about 0.20 MPa to about 0.90 MPa. For example, the average modulus can be from about 0.30 MPa to about 0.80 MPa, or from about 0.40 MPa to about 0.75 MPa, or from about 0.50 MPa to about 0.70 MPa.

As used herein, the modulus of a contact lens or lens body is understood to refer to the tensile modulus, also know as Young's modulus. It is a measure of the stiffness of an elastic material. The tensile modulus can be measured using a method in accordance with ANSI Z80.20 standard. In one example, the tensile modulus can be measured using an Instron Model 3342 or Model 3343 mechanical testing system.

The present contact lenses can have, when fully hydrated, an oxygen permeability of at least 55 barrers (Dk≥55 barrers), or an EWC from about 30% to about 70%, or a tensile modulus from about 0.2 MPa to about 0.9 MPa, or any combination thereof. In one example, the contact lenses can have an oxygen permeability of at least 60 barrers (Dk≥60 barrers), or an EWC from about 35% to about 65%, or a tensile modulus from about 0.3 MPa to about 0.8 MPa, or any combination thereof. In another example, the present contact lenses can have, when fully hydrated, an oxygen permeability of at least 60 barrers, or an EWC from about 45% to about 65%, or a tensile modulus from about 0.40 MPa to about 0.75 MPa, or any combination thereof.

In one example, the present contact lenses can have, when fully hydrated, an oxygen permeability of at least 55 barrers, an EWC from about 30% to about 70%, and a tensile modulus from about 0.2 MPa to about 0.9 MPa.

The silicone hydrogel contact lenses of the present disclosure can have, when fully hydrated, an average percentage of energy loss from about 25% to about 40%. For example, the average percentage of energy loss can be from about 27% to about 40%, or can be from about 30% to about 37%.

As used herein, percentage of energy loss is a measure of the energy lost as heat when energy loading and unloading cycles are applied to viscoelastic materials. Percentage of energy loss can be determined using a number of methods known to those of ordinary skill in the art. For example, the force involved in stretching a sample to 100% strain, and then returning it to 0% at a constant rate can be determined and used to calculate the percentage energy loss for the material.

The present contact lenses can have, when fully hydrated, an ionoflux less than about $8.0 \times 10^{-3}$ mm$^2$/min, or less than about $7.0 \times 10^{-3}$ mm$^2$/min, or less than about $5.0 \times 10^{-3}$ mm$^2$/min. Various methods of determining ionoflux are conventional and are known to those of ordinary skill in the art.

In one example, the present contact lenses can have a wet extractable component. The wet extractable component is determined based on the weight lost during methanol extraction of contact lenses which have been fully hydrated and sterilized prior to drying and extraction testing. The wet extractable component can comprise unreacted or partially reacted polymerizable ingredients of the polymerizable composition. The wet extractable component consists of organic solvent-extractable materials remaining in the lens body after the lens body has been fully processed to form a sterilized contact lens, for lenses formed from polymerizable compositions comprising non-polymerizable ingredients. For lenses extracted during manufacturing in either extraction liquids comprising a volatile organic solvent or extraction liquids free of an organic solvent, in most cases, substantially all of the non-polymerizable ingredients will have been removed from the lens body, and so the wet extractable component may consist essentially of extractable components formed from reactive polymerizable ingredients of the polymerizable composition, i.e., unreacted polymerizable components and partially reacted polymerizable ingredients. In lenses made from a polymerizable composition free of a diluent, the wet extractable component can be present in the contact lens in an amount from about 1% wt/wt to about 15% wt/wt, or from about 2% wt/wt to about 10% wt/wt, or from about 3% wt/wt to about 8% wt/wt based on the dry weight of the lens body prior to extraction testing. In lenses made from a polymerizable composition comprising a diluent, the wet extractable component may consist of a portion of the diluent as well as unreacted and partially reacted polymerizable ingredients, and can be present in the contact lens in an amount from about 1% wt/wt to about 20% wt/wt, or from about 2% wt/wt to about 15% wt/wt of the lens, or from about 3% wt/wt to about 10% wt/wt based on the dry weight of the lens body prior to extraction testing.

In one example, the present contact lenses have a dry extractable component. The dry extractable component is determined based on the weight lost during extraction in methanol of polymeric lens bodies which have not been washed, extracted (as part of a manufacturing process), hydrated or sterilized prior to the drying and extraction testing. The dry extractable component can comprise unreacted or partially reacted polymerizable ingredients of the polymerizable composition. When optional non-polymerizable ingredients such as diluents and the like are present in the polymerizable composition, the dry extractable component may further comprise the non-polymerizable ingredients.

In lenses made from a polymerizable composition free of a diluent, the dry extractable component of the lens consists primarily of dry extractable components contributed by polymerizable ingredients of the polymerizable composition (i.e., unreacted or partially reacted polymerizable ingredients), and may also include dry extractable materials contributed by optional non-polymerizable components present in the polymerizable composition in small amounts (e.g., less than 3% wt/wt), such as, for example, tinting agents, oxygen scavengers, and the like. In lenses made from a polymerizable composition free of a diluent, the dry extractable component can be present in the polymeric lens body in an amount from about 1% wt/wt to about 30% wt/wt of the lens body, or from about 2% wt/wt to about 25% wt/wt, or from about 3% wt/wt to about 20% wt/wt, or from about 4% wt/wt to about 15% wt/wt, or from 2% wt/wt to less than 10% wt/wt based on the dry weight of the lens body prior to extraction testing.

In lenses made from a polymerizable composition comprising a large amount (e.g., more than 3% wt/wt) of an optional non-polymerizable ingredient such as a diluent, the dry extractable component consists of extractable materials contributed by reactive ingredients as well as extractable components contributed by non-polymerizable ingredients of the polymerizable composition. The total amount of dry extractable components contributed by reactive ingredients and non-polymerizable ingredients present in the contact lens can consist of an amount from about 1% wt/wt to about 75% wt/wt, or from about 2% wt/wt to about 50% wt/wt of the lens, or from about 3% wt/wt to about 40% wt/wt, or from about 4% wt/wt to about 20% wt/wt, or from about 5% to about 10% based on the dry weight of the polymeric lens body prior to extraction testing. The total amount of dry extractable components contributed by polymerizable ingredients (i.e., unreacted or partially reacted polymerizable ingredients) can be an amount from about 1% wt/wt to about 30% wt/wt of the lens body, or from about 2% wt/wt to about 25% wt/wt, or from about 3% wt/wt to about 20% wt/wt, or from about 4% wt/wt to about 15% wt/wt, or from 2% wt/wt to less than 10% wt/wt based on the dry weight of the lens body prior to extraction testing.

Certain specific examples of silicone hydrogel contact lenses will now be described, in accordance with the present teachings.

As one example (example A), a silicone hydrogel contact lens comprises a polymeric lens body that is the reaction product of a polymerizable composition comprising a first siloxane monomer represented by formula (1), wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, the first siloxane monomer having a molecular weight of from 400 daltons to 700 daltons; a second siloxane monomer having a number average molecular weight greater than 7,000 daltons, wherein a total amount of siloxane monomers present in the polymerizable composition is from 30 unit parts to 50 unit parts by weight; and a hydrophilic amide monomer or monomer component having one N-vinyl group, wherein the hydrophilic monomer or monomer component is present in the polymerizable composition in an amount from 30 to 60 parts, and the polymeric lens body has an ophthalmically acceptable wettable surface. Specifically the hydrophilic vinyl amide monomer can comprise or consist of N-vinyl-N-methyl acetamide (VMA).

As a second example (example B), a silicone hydrogel contact lens comprises a polymeric lens body that is the reaction product of a polymerizable composition as described in example A, and wherein the polymerizable further comprises a non-vinyl amide hydrophilic monomer or monomer component comprising or consisting of a vinyl ether-containing monomer or monomer component.

As a third example (example C), a silicone hydrogel contact lens comprises a polymeric lens body that is the reaction product of a polymerizable composition as described in example A or B, and wherein the polymerizable composition further comprises a hydrophobic monomer or monomer component, specifically the hydrophilic monomer comprises or consists of methyl methacrylate (MMA).

As a fourth example (example D), a silicone hydrogel contact lens comprises a polymeric lens body that is the reaction product of a polymerizable composition as described in example A or B or C, and wherein the polymerizable composition further comprises a vinyl-containing cross-linking agent or cross-linking agent component. In one example, the cross-linking agent or cross-linking agent component can comprise or consist of a vinyl ether-containing cross-linking agent or cross-linking agent component, specifically the cross-linking agent or cross-linking agent component can comprise or consist of triethylene glycol divinyl ether (TEGVE).

As a fifth example (example E), a silicone hydrogel contact lens comprises a polymeric lens body that is the reaction product of a polymerizable composition as described in example A or B or C or D, and wherein the polymerizable composition further comprises a thermal initiator or thermal initiator component.

As a sixth example (example F), a silicone hydrogel contact lens comprises a polymeric lens body that is the reaction product of a polymerizable composition as described in example A or B or C or D or E, and wherein the polymerizable composition further comprises an oxygen scavenger or oxygen scavenger component.

As a seventh example (example G), a silicone hydrogel contact lens comprises a polymeric lens body that is the reaction product of a polymerizable composition as described in example A or B or C or D or E or F, and wherein the polymerizable composition further comprises a UV absorbing agent or UV absorbing agent component.

As a eighth example (example H), a silicone hydrogel contact lens comprises a polymeric lens body that is the reaction product of a polymerizable composition as described in example A or B or C or D or E or F or G, and wherein the polymerizable composition further comprises a tinting agent or tinting agent component.

As a ninth example (example I), a silicone hydrogel contact lens comprises a polymeric lens body that is the reaction product of a polymerizable composition as described in example A or B or C or D or E or F or G or H, and wherein the polymerizable composition further comprises a second siloxane monomer represented by formula (2) as described above, wherein $R_1$ of formula (2) is selected from either hydrogen atom or a methyl group; $R_2$ of formula (2) is selected from either of hydrogen or a hydrocarbon group having 1 to 4 carbon atoms; m of formula (2) represents an integer of from 0 to 10; n of formula (2) represents an integer of from 4 to 100; a and b represent integers of 1 or more; a+b is equal to 20-500; b/(a+b) is equal to 0.01-0.22; and the configuration of siloxane units includes a random configuration. As one example, the second siloxane monomer can be represented by formula (2) as described above, wherein m of formula (2) is 0, n of formula (2) is one integer from 5 to 10, a is one integer from 65 to 90, b is one integer from 1 to 10, $R_1$ of formula (2) is a methyl group, and $R_2$ of formula (2) is either a hydrogen atom or a hydrocarbon group having 1 to 4 carbon atoms.

As a tenth example (example J), a silicone hydrogel contact lens comprises a polymeric lens body that is the reaction product of a polymerizable composition as described in example A or B or C or D or E or F or G or H or I, and wherein the polymerizable composition further comprises a methacrylate-containing cross-linking agent or cross-linking agent component, specifically the cross-linking agent or agent component can comprise or consist of ethylene glycol dimethacrylate (EGDMA). In this example, when the polymerizable composition also comprises a vinyl ether-containing cross-linking agent as part of the cross-linking agent component, specifically the cross-linking agent component can comprise or consist of triethylene glycol divinyl ether (TGDVE) in combination with a methacrylate-containing cross-linking agent, which can specifically comprise or consist of ethylene glycol dimethacrylate (EGDMA). In this example, it can be appreciated that the polymerizable composition comprises two cross-linking agents, each having different reactivity ratios, i.e., the polymerizable composition comprises a cross-linking agent component comprising or consisting of a vinyl-containing cross-linking agent and a methacrylate-containing cross-linking agent, the methacrylate-containing cross-linking agent having polymerizable functional groups which are more reactive and which thus react at a faster rate than the vinyl polymerizable functional groups present in the vinyl-containing cross-linking agent.

As an eleventh example (example K), a silicone hydrogel contact lens comprises a polymeric lens body that is the reaction product of a polymerizable composition as described in example A or B or C or D or E or F or G or H or I or J, and wherein the polymerizable composition further comprises a chain transfer agent or chain transfer agent component which can specifically comprise or consist of allyloxy ethanol (AE).

As a twelfth example (example L), a silicone hydrogel contact lens comprises a polymeric lens body that is the reaction product of a polymerizable composition as described in example A or B or C or D or E or F or G or H or I or J or K, and wherein the polymerizable composition further comprises a non-vinyl amide hydrophobic monomer or hydrophobic monomer component which can specifically comprise or consist of ethylene glycol methyl ether methacrylate (EGMA).

As a thirteenth example (example M), a silicone hydrogel contact lens comprises a polymeric lens body that is the reaction product of a polymerizable composition as described in example A or B or C or D or E or F or G or H or I or J or K or L, and wherein the polymerizable composition further comprises a non-vinyl amide hydrophilic vinyl ether-containing monomer or monomer component, for example, the hydrophilic vinyl ether-containing monomer or monomer component can comprise or consist of 1,4-butanediol vinyl ether (BVE), or ethylene glycol vinyl ether (EGVE), or diethylene glycol vinyl ether (DEGVE), or any combination thereof.

As a fourteenth example (example N), a silicone hydrogel contact lens comprises a polymeric lens body that is the reaction product of a polymerizable composition as described in example A or B or C or D or E or F or G or H or I or J or K or L or M, wherein the contact lens has the ophthalmically acceptably wettable lens surfaces when the polymerizable composition used to form the lens is free of an internal wetting agent, or when the polymerizable composition used to form the polymeric lens body is free of an organic diluent, or when the polymeric lens body is extracted in liquids free of a volatile organic solvent, or when the lens is free of a surface plasma treatment, or any combination thereof.

In any or each of the foregoing examples A-N, as well as any or all other examples disclosed herein, the amount of the first siloxane monomer can be from 20 to 45 unit parts of the polymerizable composition. The amount of the first siloxane monomer can be from 25 to 40 unit parts of the polymerizable composition. The amount of the first siloxane monomer can be from 27 to 35 unit parts of the polymerizable composition.

In any or each of the foregoing examples A-N, as well as any or all other examples disclosed herein, the amount of the second siloxane monomer can be from 1 to 20 unit parts of the polymerizable composition. The amount of the second siloxane monomer can be from 2 to 15 unit parts of the polymerizable composition. The amount of the second siloxane monomer can be from 5 to 13 unit parts of the polymerizable composition. In another example, the ratio of the unit parts of the first siloxane monomer to the second siloxane can be at least 1:1, or at least 2:1.

In any or each of the foregoing examples A-N, as well as any or all other examples disclosed herein, the amount of the hydrophilic monomer or monomer component present in the polymerizable composition can be from 1 to 60 unit parts of the polymerizable composition. The hydrophilic monomer component can constitute from 4 to 60 unit parts of the polymerizable composition. When the hydrophilic monomer comprises or consists of VMA, it can be present in an amount from 30 unit parts to 60 unit parts. VMA can be present in the polymerizable composition in an amount from about 40 unit parts to about 50 unit parts. When the hydrophilic monomers, N,N-dimethylacrylamide (DMA), 2-hydroxyethyl methacrylate (HEMA), or 2-hydroxylbutyl methacrylate (HOB), or any combination thereof are present in the polymerizable composition as the hydrophilic monomer in the hydrophilic monomer component, each or all can be present in amounts from about 3 to about 10 unit parts.

In any or each of the foregoing examples A-N as well as any or all other examples disclosed herein, the amount of the hydrophobic monomer or monomer component present in the polymerizable composition can be from 1 to 30 unit parts of the polymerizable composition. For example, the total amount of hydrophobic monomer or monomer component can be from about 5 to about 20 unit parts of the polymerizable composition. In polymerizable compositions in which the hydrophobic monomer MMA is present as the hydrophobic monomer or as part of the hydrophobic monomer component, the MMA can be present in an amount from about 5 to about 20 unit parts, or from about 8 to about 15 unit parts.

In any or each of the foregoing examples A-N, as well as any or all other examples disclosed herein, the amount of the cross-linking agent or cross-linking agent component present in the polymerizable composition can be from 0.01 to 4 unit parts of the polymerizable composition. TEGDVE can be present in amounts from 0.01 to 1.0 unit parts. EGDMA can be present in amounts from 0.01 to 1.0 unit parts. TEGDMA can be present in amounts from 0.1 to 2.0 unit parts. Each of these non-silicon cross-linking agents can be present alone or in any combination in the polymerizable composition.

In any or each of the foregoing examples A-N, as well as any or all other examples disclosed herein, when the polymerizable composition contains EGMA, BVE, DEGVE, EGVE, or any combination thereof, they are each present in amounts from 1 unit part to 20 unit parts of the polymerizable composition. EGMA can be present in an amount from about 2 unit parts to about 15 unit parts. BVE can be present in an amount from 1 unit part to about 15 unit parts. BVE can be present in an amount from about 3 unit parts to about 7 unit parts. DEGVE can be present in an amount from 1 unit part to about 15 unit parts. DEGVE can be present in an amount from about 7 unit parts to about 10 unit parts. EGVE can be present in an amount from 1 unit part to about 15 unit parts, or in an amount from about 3 unit parts to about 7 unit parts.

In any or each of the foregoing examples A-N, as well as any or all other examples disclosed herein, the other optional components, such as initiators or initiator component, tinting agents or tinting agent components, UV absorbing agents or UV absorbing agent components, oxygen scavengers or oxygen scavenger components, or chain transfer agents or chain transfer agent components, can each be present in amounts from about 0.01 unit parts to about 3 unit parts. An initiator or initiator component can be present in the polymerizable in an amount from 0.1 unit parts to 1.0 unit parts. When a thermal initiator or thermal initiator component is present, such as Vazo-64, it can be present in an amount from about 0.3 to about 0.5 unit parts. Tinting agents or tinting agent components can be present in amounts from 0.01 unit parts to 1 unit part. When reactive dyes are used as tinting agents or as part of a tinting agent component, such as Reactive Blue 246 or Reactive Blue 247, they can each be present in amounts of about 0.01 unit parts. UV absorbing agents or UV absorbing agent components can be present in amounts from 0.1 unit parts to 2.0 unit parts. For example, the UV absorbing agent UV1 described in the Examples 1-25 below can be present in an amount from about 0.8 to about 1.0 unit parts, such as 0.9 unit parts; or the UV absorbing agent UV2 described in the Examples 1-25 below, can be present in an amount from 0.5 unit parts to 2.5 unit parts, such as from about 0.9 unit parts to about 2.1 unit parts. Oxygen scavengers or oxygen scavenger components can be present in amounts from 0.1 unit parts to 1.0 unit parts. As an example, when triphenyl phosphine (TPP) or diphenyl(P-vinylphenyl)phosphine (pTPP) or any combination thereof is used as an oxygen scavenger or oxygen scavenger component in the polymerizable composition, each or the combination can be present in an amount from 0.3 unit parts to 0.7 unit parts, such as about 0.5 unit parts. Chain transfer reagents or chain transfer reagent components can be present in the polymerizable composition in an amount from 0.1 unit parts to 2.0 unit parts, and in many of Examples 1-25 below is present in an amount from 0.2 unit parts to 1.6 unit parts. For example, the chain transfer reagent allyloxy ethanol (AE) can be present in an amount from about 0.3 to about 1.4 unit parts.

In any or each of the foregoing examples A-N, as well as any or all other examples disclosed herein, the silicone hydrogel contact lenses can be free of a wetting agent that is present in the polymerizable composition, or in the polymeric lens body, or in the silicone hydrogel contact lens. Similarly, the silicone hydrogel contact lens can have lens surfaces that are free of a surface treatment or a surface modification. However, in another example, the silicone hydrogel contact lens can include at least one wetting agent (i.e., a single wetting agent or two or more wetting agents present as a wetting agent component) in the polymerizable composition, in the polymeric lens body, or in the silicone hydrogel contact lens. The silicone hydrogel contact lens can have treated or modified lens surfaces. In addition or alternatively, any or each of the foregoing examples A-N, as well as any or all other examples of silicone hydrogel contact lenses disclosed herein, the contact lenses can be understood to be free of a linking agent such as, for example, a form of boronic acid.

In another example, new polymerizable compositions are provided, including each and every polymerizable composition described herein in reference to the silicone hydrogel contact lenses and methods. The polymerizable compositions can be diluent-free in that they do not contain an organic solvent, such as alcohols and the like, which can help reduce phase separation of the polymerizable composition. However, such diluent-free polymerizable compositions can still contain one or more chain transfer agents, such as allyloxy ethanol. However, if desired, the polymerizable composition can include a diluent or a diluent component, which can be present in an amount from 1 to 20 unit parts.

As described herein, the present silicone hydrogel contact lenses which comprise polymeric lens bodies that comprise units derived from a first siloxane monomer represented by formula (1), an optional second siloxane monomer, such as, for example, a second siloxane monomer having more than one functional group and that has a number average molecular weight of at least 3,000 daltons, such as those represented by formulas (2), (3), or (4), a first hydrophilic monomer or monomer component present in the polymerizable composition in an amount from 30 to 60 unit parts, have ophthalmically acceptable wettable surfaces. In one example, the silicone hydrogel contact lenses can also be dimensionally stable. Thus, the present disclosure also relates to a batch of silicone hydrogel contact lenses.

As used herein, a batch of silicone hydrogel contact lenses refers to a group of two or more silicone hydrogel contact lenses, and frequently, a batch refers to at least 10, or at least 100, or at least 1,000 silicone hydrogel contact lenses. In accordance with the present disclosure, a batch of silicone hydrogel contact lenses comprises a plurality of any of the silicone hydrogel contact lenses described herein.

In one example, the batch of silicone hydrogel contact lenses comprises a plurality of the contact lenses in accordance with the present disclosure, wherein the batch of silicone hydrogel contact lenses has an average equilibrium water content (EWC) from 30% to 70% when fully hydrated, or an average oxygen permeability of at least 55 barrers, or an average tensile modulus from about 0.2 MPa to about 0.9 MPa when fully hydrated, or an average captive bubble dynamic advancing contact angle less than 90 degrees when fully hydrated, or an average captive bubble static contact angle less than 70 degrees when fully hydrated, or any combination thereof, based on averages of values determined for at least 20 individual lenses of the batch.

When initially tested shortly after manufacturing and then tested again at a later time point, a batch of lenses can exhibit a change in its average physical dimensions. As batches of lenses in accordance with the present disclosure are dimensionally stable, they can exhibit an acceptable level of change in their average physical dimensions. As used herein, dimensional stability variance is understood to refer to a variance in a value of a physical dimension between a value of the physical dimension determined when the batch of lenses is initially tested shortly after its manufacture, and the value of the physical dimension determined when the batch of lenses is tested again at a later time point. The later time point can be, for example, from at least 2 weeks after the initial time point, to up to 7 years after the initial time point. The silicone hydrogel contact lenses of the batch have an average dimensional stability variance of less than plus or minus three percent (±3.0%) based on averaging the lens diameter measurements of a representative number of lenses from the batch, such as, for example, 20 lenses from the batch. For a batch of lenses, an average dimensional stability variance of less than plus or minus three percent (±3.0%), where the average dimensional stability variance is the variance in a value of a physical dimension when measured at an initial time point within one day of a manufacturing date of the batch of lenses, and at a second time point, where the second time point is from two weeks to seven years after the initial time point when the batch is stored at room temperature, or, when the batch is stored at a higher temperature (i.e., under accelerated shelf life testing conditions), the second time point is a time point representative of storage of the batch from two weeks to seven years at room temperature, is considered to be a dimensionally stable batch. In one example, accelerated shelf life testing conditions which are especially useful in determining average dimensional stability variance are for 4 weeks at 70 degrees C., although other periods of time and other temperatures can be used. The average dimensional stability variance is determined by averaging the individual dimensional stability variances for each of the representative lenses using the actual diameters of representative lenses measured initially (Diameter$_{Original}$) and the actual diameters of representative lenses measured following (Diameter$_{Final}$) storage at room temperature or under accelerated shelf life conditions. The representative lenses measured initially and the representative lenses measured following storage can be the same lenses or can be different lenses. As used herein, the average dimensional stability variance is represented as a percent (%). The individual dimensional stability variances are determined using the following equation (A):

((Diameter$_{Final}$−Diameter$_{Original}$)/Diameter$_{Original}$)×100    (A).

On average, the diameters of the silicone hydrogel contact lenses of the batch vary by less than three percent in either direction of a target value (±3.0%). As one example, if a contact lens has a target diameter (chord diameter) of 14.20 mm, the present batch of silicone hydrogel contact lenses will have an average diameter (average of the population in the batch) from 13.77 mm to 14.63 mm. In one example, the dimensional stability variance is less than plus or minus two percent (±2.0%). As one example, if a contact lens has a target diameter (chord diameter) of 14.20 mm, the present batch of silicone hydrogel contact lenses will have an average diameter (average of the population in the batch) from 13.92 mm to 14.48 mm. Preferably, the average diameter of the batch of silicone hydrogel contact lenses does not vary by more than plus or minus 0.20 mm from the target diameter, which is commonly from 13.00 mm to 15.00 mm.

In accelerated shelf life studies, the average dimensional stability variance can be determined for contact lenses that were stored for a period of time at an elevated temperature, such as above 40 degrees C., including, for example, 50 degrees C., or 55 degrees C., or 65 degrees C., or 70 degrees C., or 80 degrees C., or 95 degrees C., and the like. Or, the average dimensional stability can be determined for contact lenses that were stored for a period of time at room temperature (e.g., about 20-25 degrees C.).

For accelerated shelf life studies, the following formula can be used to determine the number of months of storage at a particular temperature that are equivalent to storage for a desired length of time at room temperature:

Desired shelf life=[N×2$^y$]+n    (B)

where
N=number of months of storage under accelerated conditions
2$^y$=acceleration factor
y=(test temperature −25° C.)/10° C.
n=age of lenses (in months) at start of the study
Based on this equation, the following storage times have been calculated: 6 months of storage at 35 degrees C. is equivalent to 1 year aging at 25 degrees C., 3 months of storage at 45 degrees C. is equivalent to 1 year of aging at 25 degrees C., 3 months of storage at 55 degrees C. is equivalent to 2 years of aging at 25 degrees C., and 3 months of storage at 65 degrees C. is equivalent to 4 years of aging at 25 degrees C.

The present disclosure also provides methods of manufacturing silicone hydrogel contact lenses. In accordance with the present teachings, the method comprises providing a polymerizable composition. The polymerizable composition, or contact lens formulation, comprises a first siloxane monomer represented by formula (1):

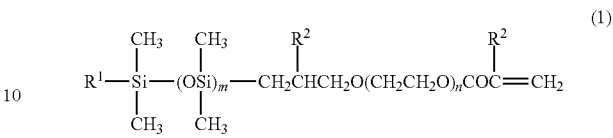

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group. The polymerizable composition also comprises a second siloxane monomer having a number average molecular weight greater than 7,000 daltons. A total amount of siloxane monomers present in the polymerizable composition is from 30 unit parts to 50 unit parts by weight. The polymerizable composition also comprises at least one hydrophilic vinyl amide monomer present in the polymerizable composition in an amount from about 30 to about 60 unit parts by weight. The contact lens has ophthalmically acceptably wettable lens surfaces when fully hydrated. Optionally, the polymerizable composition also comprises at least one third siloxane monomer, or at least one cross-linking agent, or at least one hydrophobic monomer, or any combination thereof.

The method can also comprise a step of polymerizing the polymerizable composition to form a polymeric lens body. The step of polymerizing the polymerizable composition can be conducted in a contact lens mold assembly. The polymerizable composition can be cast molded between molds formed of a thermoplastic polymer. The thermoplastic polymer used to form the molding surfaces of the mold can comprise a polar polymer, or can comprise a non-polar polymer. Alternatively, the polymerizable composition can be formed into a lens via various methods known to those of ordinary skill in the art, such as spin casting, injection molding, forming a polymerized rod that is subsequently lathed to form a lens body, etc.

The method can also comprise contacting the polymeric lens body with washing liquids to remove extractable material, such as unreacted monomers, uncross-linked materials that are otherwise not physically immobilized in the polymeric lens body, diluents, and the like. The washing liquids can be liquids free of a volatile organic solvent, or can comprise a volatile organic solvent (e.g., can be a volatile organic solvent or a solution of a volatile organic solvent).

In accordance with the present disclosure, the polymeric lens body can be packaged along with a contact lens packaging solution in a contact lens package, such as a blister pack or glass vial. Following packaging, the package can be sealed and the polymeric lens body and the contact lens packaging solution can be sterilized, for example, by autoclaving the sealed package, to produce a silicone hydrogel contact lens product.

The present method can further comprise repeating the steps to produce a plurality of the silicone hydrogel contact lenses.

In any of the present methods, a particular first siloxane monomer can be provided in the polymerizable composition, such as a monomer represented by formula (1) wherein m of formula (1) is 4, n of formula (1) is 1, $R^1$ of formula (1) is a butyl group, and each $R^2$ of formula (1) is independently either a hydrogen atom or a methyl group.

In any of the present methods, the second siloxane monomer or the optional at least one third siloxane monomer can be represented by formula (2):

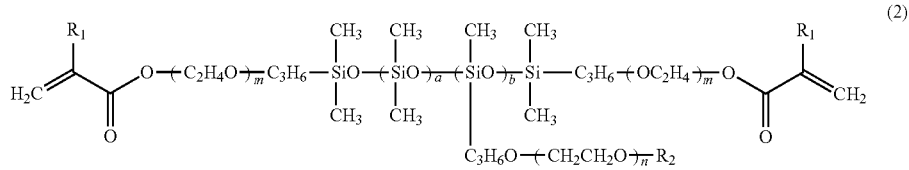

wherein $R_1$ of formula (2) is selected from either hydrogen atom or a methyl group; $R_2$ of formula (2) is selected from either of hydrogen or a hydrocarbon group having 1 to 4 carbon atoms; m of formula (2) represents an integer of from 0 to 10; n of formula (2) represents an integer of from 4 to 100; a and b represent integers of 1 or more; a+b is equal to 20-500; b/(a+b) is equal to 0.01-0.22; and the configuration of siloxane units includes a random configuration. As one example, the siloxane monomer can be represented by formula (2), wherein m of formula (2) is 0, n of formula (2) is one integer from 5 to 15, a is one integer from 65 to 90, b is one integer from 1 to 10, $R_1$ of formula (2) is a methyl group, and $R_2$ of formula (2) is either a hydrogen atom or a hydrocarbon group having 1 to 4 carbon atoms.

In the present methods, the step of contacting the polymeric lens body with washing liquids can be understood to be an extraction step because extractable materials can be removed from the polymeric lens body during the process. When the washing liquids comprise water or aqueous solutions free of a volatile organic solvent, the contacting step can be understood to be both an extraction step and a hydration step. In another example of the method, the contacting step can comprise contacting the polymeric lens body with washing liquids comprising a volatile organic solvent, such as a liquid containing a primary alcohol, such as methanol, ethanol, n-propyl alcohol, and the like. Some washing liquids can contain a secondary alcohol, such as isopropyl alcohol, and the like. Using a washing liquid containing one or more volatile organic solvents can be helpful in removing hydrophobic materials from the polymeric lens body, and thus may increase wettability of the resulting silicone hydrogel contact lens. Such methods may be understood to be volatile organic solvent-based extraction steps. In other methods, the contacting step comprises contacting the polymeric lens body with an aqueous washing liquid that is free of a volatile organic solvent. Such methods may be understood to be entirely aqueous washing steps, as no volatile organic solvents are included in the washing liquid. Water-based washing liquids that can be used in such methods include water, such as deionized water, saline solutions, buffered solutions, or aqueous solutions containing surfactants or other non-volatile ingredients that can improve the removal of hydrophobic components from the polymeric contact lens bodies, or can reduce distortion of the polymeric contact lens bodies, compared to the use of deionized water alone.

After washing, the contact lenses can be placed in packages, such as plastic blister packs, with a packaging solution, such as a buffered saline solution, which may or may not contain surfactants, anti-inflammatory agents, anti-microbial agents, contact lens wetting agents, and the like, and can be sealed and sterilized. The packaging solution used to package the silicone hydrogel contact lenses of the present disclosure can comprise a wetting agent to increase wettability of the lens surfaces. However, it will be understood that the lens surfaces of the silicone hydrogel contact lenses of the present disclosure have ophthalmically acceptable wettable surfaces prior to contact with a packaging solution comprising a wetting agent, and the use of a wetting agent in the packaging solution is only to increase the wettability of the already ophthalmically acceptable wettable surfaces, and thus is not needed to provide the contact lens with an ophthalmically acceptable wettable surface.

EXAMPLES

The following Examples 1-25 illustrate certain aspects and advantages of the present invention, which should be understood not to be limited thereby.

As can be readily determined by a review of the Examples below, all of the Example formulations are free of an organic diluent. Also, all of the Example formulations are free of N,N-dimethylacrylamide (DMA). Additionally, all of the Example formulations below are free of a polymeric wetting agent. Furthermore, all of the Example formulations comprise at least one hydrophilic amide monomer having one N-vinyl group. A majority of the Example formulations (Ex. 4-5, 8-13, 15, and 17-25) comprise a second siloxane having a number average molecular weight greater than 7,000 daltons.

The following chemicals are referred to in Examples 1-25, and may be referred to by their abbreviations.

Si1: 2-propenoic acid, 2-methyl-, 2-[3-(9-butyl-1,1,3,3,5,5,7,7,9,9-decamethylpentasiloxane-1-yl)propoxy]ethyl ester (CAS number of 1052075-57-6). (Si1 was obtained from Shin-Etsu Chemical Co., Ltd., Tokyo, Japan, as product number X-22-1622).

Si2: α,ω-Bis(methacryloxypropyl)-poly(dimethyl siloxane)-poly(ω-methoxy-poly(ethyleneglycol)propylmethylsiloxane) (the synthesis of this compound can be performed as described in US20090234089, which is incorporated herein by reference)

Si3: Poly(dimethyl siloxane), methacryloxypropyl terminated (CAS number 58130-03-3; DMS-R18 available from Gelest)

VMA: N-vinyl-N-methylacetamide (CAS number 003195786)

DMA: N,N-dimethylacrylamide (CAS number 2680-03-7)

HEMA: 2-hydroxyethyl methacrylate (CAS number 868-77-9)

HOB: 2-hydroxylbutyl methacrylate (CAS number 29008-35-3)

EGMA: Ethylene glycol methyl ether methacrylate (CAS number 6976-93-8)

MMA: Methyl methacrylate (CAS number 80-62-6)

EGDMA: Ethylene glycol dimethacrylate (CAS number 97-90-5)

TEGDMA: triethylene glycol dimethacrylate (CAS number 109-16-0)
BVE: 1,4-butanediol vinyl ether (CAS number 17832-28-9)
DEGVE: diethylene glycol vinyl ether (CAS number 929-37-3)
EGVE: ethylene glycol vinyl ether (CAS number 764-48-7)
TEGDVE: triethylene glycol divinyl ether (CAS number 765-12-8)
AE: 2-Allyloxy ethanol (CAS number 111-45-5)
V-64: 2,2'-Azobis-2-methyl propanenitrile (CAS number 78-67-1)
UV1: 2-(4-benzoyl-3-hydroxyphenoxy)ethyl acrylate (CAS number 16432-81-8)
UV2: 2-(3-(2H-benzotriazol-2-YL)-4-hydroxy-phenyl) ethyl methacrylate (CAS number 96478-09-0)
RBT1: 1,4-Bis[4-(2-methacryloxyethyl)phenylamino]anthroquinone (CAS number 121888-69-5)
RBT2: 1,4-Bis[(2-hydroxyethyl)amino]-9,10-anthracene-dione bis(2-propenoic)ester (CAS Reg. No. 109561071)
TPP: Triphenyl phosphine (CAS number 603-35-0)
pTPP: polymerizable TPP: diphenyl(P-vinylphenyl)phosphine (CAS number 40538-11-2)

Silicone Hydrogel Contact Lens Fabrication and Testing Procedure

The chemical compounds set forth in Examples 1-25 were, for each example, weighed out in amounts corresponding to the described unit parts, and combined to form a mixture. The mixture was filtered through a 0.2-5.0 micron syringe filter into a bottle. Mixtures were stored for up to about 2 weeks. The mixtures are understood to be polymerizable silicone hydrogel contact lens precursor compositions, or as used herein, polymerizable compositions. In Examples 1-25, the listed amounts of ingredients are given as unit parts of the polymerizable composition by weight.

A volume of the polymerizable composition was cast molded by placing the composition in contact with a lens defining surface of a female mold member. In all of the following Examples 1-25, the molding surface of the female mold member was formed of a non-polar resin, specifically polypropylene. A male mold member was placed in contact with the female mold member to form a contact lens mold assembly comprising a contact lens shaped cavity containing the polymerizable composition. In the following Examples 1-25, the molding surface of the male mold member was formed of a non-polar resin, specifically polypropylene.

Contact lens mold assemblies were placed in a nitrogen flushed oven to allow the polymerizable composition to thermally cure. For all of Examples 1-25, the contact lens mold assemblies were exposed to temperatures of at least about 55° C. for about 2 hours. Examples of curing profiles which can be used to cure silicone hydrogel contact lenses described herein include exposing the contact lens mold assemblies to temperatures of 55° C. for 40 minutes, 80° C. for 40 minutes, and 100° C. for 40 minutes. Other contact lenses can be made with the same curing profile, but instead of the first temperature being at 55° C., it can be at 65° C.

After polymerizing the polymerizable composition to form a polymeric lens body contained in a mold assembly, the contact lens mold assemblies were demolded to separate the male and female mold members. The polymeric lens body remained adhered to the male mold or the female mold. A dry demolding process where the mold assembly is not contacted with a liquid medium can be used, or a wet demolding process where the mold assembly is contacted with a liquid medium such as, for example, water or an aqueous solution, can be used. A mechanical dry demolding process can involve applying mechanical force to a portion of one or both of the mold members in order to separate the mold members. In all of the following Examples 1-25, a dry demolding process was used.

The polymeric lens body was then delensed from the male mold or female mold to produce a delensed polymeric lens body. In one example of a delensing method, the polymeric lens body can be delensed from the male mold member using a dry delensing process, such as by manually peeling the lens from the male mold member or by compressing the male mold member and directing a gas toward the male mold member and the polymeric lens body, and lifting the dry polymeric lens body with a vacuum device from the male mold member, which is discarded. In other methods, the polymeric lens body can be delensed using a wet delensing process by contacting the dry polymeric lens body with a liquid releasing medium, such as water or an aqueous solution. For example, a male mold member with the attached polymeric lens body can be dipped into a receptacle containing a liquid until the polymeric lens body separates from the male mold member. Or, a volume of liquid releasing medium can be added to the female mold to soak the polymeric lens body in the liquid and to separate the lens body from the female mold member. In the following Examples 1-25, a dry delensing process was used. Following separation, the lens body can be lifted from the mold member manually using tweezers or using a vacuum device and placed into a tray.

The delensed lens product was then washed to remove extractable materials from the polymeric lens body, and hydrated. Extractable materials included polymerizable components such as, for example, monomers, or cross-linking agents, or any optional polymerizable ingredients such as tints or UV blockers, or combinations thereof, present in the polymerizable composition which remain present in the polymeric lens body in an unreacted form, in a partially reacted form, or in an uncross-linked form, or any combination thereof, following polymerization of the lens body and prior to extraction of the lens body. Extractable materials may have also included any non-polymerizable ingredients present in the polymerizable composition, for example, any optional non-polymerizable tinting agents, or UV blockers, or diluents, or chain transfer agent, or any combination thereof, remaining present in the polymeric lens body following polymerization of the polymeric lens body but prior to extraction of the polymeric lens body.

In other methods, such as those involving wet delensing by contacting the mold and lens with a liquid releasing medium, the delensed polymerized contact lens bodies can be washed to remove extractable components from the lens bodies using a washing liquid that is free of a volatile organic solvent, such as a lower alcohol, for example, methanol, ethanol, or any combination thereof. For example, the delensed polymerized contact lens bodies can be washed to remove extractable components from the lens bodies by contacting the lens bodies with aqueous washing liquid free of a volatile organic solvent, such as, for example, deionized water, or a surfactant solution, or a saline solution, or a buffer solution, or any combination thereof. The washing can take place in the final contact lens package, or can take place a in washing tray or a washing tank.

In the following Examples 1-25, following the dry demolding and dry delensing steps, the dry delensed lens bodies were placed in cavities of trays, and the delensed polymeric lens bodies were extracted and hydrated by contacting the polymeric lens bodies with one or more volumes of extraction liquid. The extraction and hydration liquids used in the extraction and hydration process consisted of either a) a combination of volatile organic solvent-based extraction liquids and volatile organic solvent-free hydration liquids, or b) volatile organic solvent-free extraction and hydration liquids, i.e., entirely aqueous-based extraction and hydration liquids. Specifically, in Examples 1-5 below, the extraction and hydration process comprised at least two extraction steps in separate portions of ethanol, followed by at least one extraction step in a portion of a 50:50 wt/wt ethanol:water solution of Tween 80, followed by at least three extraction and hydration steps in separate portions of a solution of Tween 80 in deionized water, wherein each extraction or extraction and hydration step lasted from about 5 minutes to 3 hours. In Examples 6-25 below, the extraction and hydration process used comprised at least three extraction and hydration steps in separate portions of a solution of Tween 80 in deionized water, wherein the temperature of the Tween 80 solution of the portions ranged from room temperature to about 90 degrees C., and wherein each extraction and hydration step lasted from about 15 minutes to about 3 hours.

Washed, extracted and hydrated lenses were then placed individually in contact lens blister packages with a phosphate buffered saline packaging solution. The blister packages were sealed and sterilized by autoclaving.

Following sterilization, lens properties such as contact angle, including dynamic and static contact angle, oxygen permeability, ionoflux, modulus, elongation, tensile strength, water content, and the like were determined, as described herein.

For the present contact lenses, contact angles including dynamic and static contact angles, can be determined using routine methods known to persons of ordinary skill in the art. For example, the advancing contact angle and receding contact angle of the contact lenses provided herein can be measured using a conventional drop shape method, such as the sessile drop method or captive bubble method.

In the following Examples 1-25, the advancing and receding contact angle of silicone hydrogel contact lenses was determined using a Kruss DSA 100 instrument (Kruss GmbH, Hamburg), and as described in D. A. Brandreth: "Dynamic contact angles and contact angle hysteresis", Journal of Colloid and Interface Science, vol. 62, 1977, pp. 205-212 and R. Knapikowski, M. Kudra: Kontaktwinkelmessungen nach dem Wilhelmy-Prinzip-Ein statistischer Ansatz zur Fehierbeurteilung", Chem. Technik, vol. 45, 1993, pp. 179-185, and U.S. Pat. No. 6,436,481, all of which are incorporated by reference herein.

As an example, the advancing contact angle and receding contact angle was be determined using a captive bubble method using phosphate buffered saline (PBS; pH=7.2). The lens was flattened onto a quartz surface and rehydrated with PBS for at least 10 minutes before testing. An air bubble was placed onto a lens surface using an automated syringe system. The size of the air bubble was increased and decreased to obtain the receding angle (the plateau obtained when increasing the bubble size) and the advancing angle (the plateau obtained when decreasing the bubble size).

The modulus, elongation, and tensile strength values of the present lenses can be determined using routine methods known to persons of ordinary skill in the art, such as, for example, a test method in accordance with ANSI Z80.20. The modulus, elongation, and tensile strength values reported herein were determined by using an Instron Model 3342 or 3343 mechanical testing system (Instron Corporation, Norwood, Mass., USA) and Bluehill Materials Testing Software, using a custom built rectangular contact lens cutting die to prepare the rectangular sample strip. The modulus, elongation and tensile strength were determined inside a chamber having a relative humidity of least 70%. The lens to be tested was soaked in phosphate buffered solution (PBS) for at least 10 minutes prior to testing. While holding the lens concave side up, a central strip of the lens was cut using the cutting die. The thickness of the strip was determined using a calibrated gauge (Rehder electronic thickness gauge, Rehder Development Company, Castro Valley, Calif., USA). Using tweezers, the strip was loaded into the grips of the calibrated Instron apparatus, with the strip fitting over at least 75% of the grip surface of each grip. A test method designed to determine the maximum load (N), the tensile strength (MPa), the strain at maximum load (% elongation) and the mean and standard deviation of the tensile modulus (MPa) was run, and the results were recorded.

The percent energy loss of the present silicone hydrogel contact lenses can be determined using routine methods known to persons of ordinary skill in the art. For the following Examples 1-25, the percent energy loss was determined using an Instron Model 3343 (Instron Corporation, Norwood, Mass., USA) mechanical testing system, with a 10N force transducer (Instron model no. 2519-101) and Bluehill Materials Testing Software including a TestProfiler module. The energy loss was determined inside a chamber having a relative humidity of least 70%. Before testing, each lens was soaked in phosphate buffered solution (PBS) for at least 10 minutes. Using tweezers, the lens was loaded into the grips of the calibrated Instron apparatus, with the lens loaded vertically between the grips as symmetrically as possible so that the lens fit over at least 75% of the grip surface of each grip. A test designed to determine the energy required to stretch the lens to 100% strain and then return it to 0% strain at a rate of 50 mm/minute was then run on the lens. The test was conducted only once on a single lens. Once the test was finished, energy loss was calculated using the following equation: Lost Energy (%)=(Energy to 100% strain−Energy to return to 0% strain)/Energy to 100% strain×100%.

The ionoflux of the present lenses can be determined using routine methods known to persons of ordinary skill in the art. For the lenses of the following Examples 1-25, the ionoflux was measured using a technique substantially similar to the "Ionoflux Technique" described in U.S. Pat. No. 5,849,811, which is incorporated by reference herein. Prior to measurement, a hydrated lens was equilibrated in deionized water for at least 10 minutes. The lens to be measured was placed in a lens-retaining device, between male and female portions. The male and female portions included flexible sealing rings which were positioned between the lens and the respective male or female portion. After positioning the lens in the lens-retaining device, the lens-retaining device was then placed in a threaded lid. The lid was screwed onto a glass tube to define a donor chamber. The donor chamber was filled with 16 ml of 0.1 molar NaCl solution. A receiving chamber was filled with 80 ml of deionized water. Leads of the conductivity meter were immersed in the deionized water of the receiving chamber and a stir bar was added to the receiving chamber. The receiving chamber was placed in a water bath and the temperature was held at about 35° C. Finally, the donor chamber was immersed in the receiving chamber such that the NaCl solution inside the donor chamber was level with the water inside the receiving chamber. Once the temperature inside the receiving chamber was equilibrated to 35 degrees C., measurements of conductivity were taken every 2 minutes for at least 10 minutes. The conductivity versus time data was substantially linear, and was used to calculate the ionoflux value for the lenses tested.

The oxygen permeability (Dk) of the present lenses can be determined using routine methods known to persons of ordinary skill in the art. For example, the Dk value can be determined using a commercially available instrument under the model designation of MOCON® Ox-Tran System (Mocon Inc., Minneapolis, Minn., USA), for example, using the Mocon Method, as described in U.S. Pat. No. 5,817,924, which is incorporated by reference herein. The Dk values of the lenses of the following Examples 1-25 were determined using the method described by Chhabra et al. (2007), *A single-lens polarographic measurement of oxygen permeability (Dk) for hypertransmissible soft contact lenses*. Biomaterials 28: 4331-4342, which is incorporated by reference herein.

The equilibrium water content (EWC) of the present lenses can be determined using routine methods known to persons of ordinary skill in the art. For the lenses of the following Examples 1-25 a hydrated silicone hydrogel contact lens was removed from an aqueous liquid, wiped to remove excess surface water, and weighed. The weighed lens was then dried in an oven at 80 degrees C. under a vacuum, and the dried lens was then weighed. The weight difference was determined by subtracting the weight of the dry lens from the weight of the hydrated lens. The water content (%) is the (weight difference/hydrated weight)×100.

The percentage of the wet extractable component or dry extractable component in a lens can be determined by extracting the lenses in an organic solvent in which the polymeric lens body is not soluble in accordance to methods known to those of ordinary skill in the art. For the lenses of the following Examples 1-25, an extraction in methanol using a Sohxlet extraction process was used. For determination of the wet extractable component, a sample (e.g., at least 5 lenses per lot) of fully hydrated and sterilized contact lenses was prepared by removing excess packaging solution from each lens and drying them overnight in an 80° C. vacuum oven. For determination of the dry extractable component, a sample of polymeric lens bodies which had not been washed, extracted, hydrated or sterilized was prepared by drying the lens bodies overnight in an 80° C. vacuum oven. When dried and cooled, each lens was weighed to determine its initial dry weight (W1). Each lens was then placed in a perforated, stackable Teflon thimble, and the thimbles were stacked to form an extraction column with an empty thimble placed at the top of the column. The extraction column was placed into a small Sohxlet extractor attached to a condenser and a round bottom flask containing 70-80 ml methanol. Water was circulated through the condenser and the methanol was heated until it gently boiled. The lenses were extracted for at least 4 hours from the time condensed methanol first appeared. The extracted lenses were again dried overnight at 80° C. in a vacuum oven. When dried and cooled, each lens was weighed to obtain the dry weight of the extracted lens (W2), and the following calculation was made for each lens to determine the percent wet extractable component: [(W1−W2)/W1]×100.

Example 1

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
|---|---|
| Si1 | 30 |
| Si3 | 3 |
| VMA | 45 |
| EGMA | 7 |
| MMA | 15 |
| TEGDMA | 0.8 |
| AE | 0.5 |
| V-64 | 0.3 |
| UV1 | 0.9 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used washing liquids comprising volatile organic solvent-based extraction liquids and hydration liquids consisting of volatile organic solvent-free liquids. These contact lenses contained units derived from two siloxane monomers, Si1 and Si3, and from the hydrophilic monomer, VMA. This batch of contact lenses had ophthalmically acceptably wettable lens surfaces.

Additionally, the batch of silicone hydrogel contact lenses when fully hydrated had an average EWC from 30% wt/wt to 70% wt/wt when tested at the start of the shelf life study and had an average dimensional stability variance of less than ±3.0% after storage for 22 days at 95 degrees C.

Example 2

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
|---|---|
| Si1 | 30 |
| Si3 | 3 |
| VMA | 45 |
| EGMA | 7 |
| MMA | 15 |
| EGDMA | 0.5 |
| TEGDVE | 0.1 |
| AE | 0.8 |
| V-64 | 0.3 |
| UV2 | 0.9 |
| RBT1 | 0.01 |
| TPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used washing liquids comprising volatile organic solvent-based extraction liquids and hydration liquids consisting of volatile organic solvent-free liquids. These contact lenses contained units derived from two siloxane monomers, Si1 and Si3, and from the hydrophilic monomer, VMA. This batch of contact lenses had ophthalmically acceptably wettable lens surfaces.

In addition, these lenses, when fully hydrated, had an EWC of 52% wt/wt, a modulus of 0.63 MPa, and an ionoflux of 3.62

($\times 10^{-3}$ mm$^2$/min) when tested at the start of the shelf life study and had an average dimensional stability variance less than +3.0% following storage for 20 days at 95 degrees C.

Example 3

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
|---|---|
| Si1 | 30 |
| Si3 | 3 |
| VMA | 45 |
| EGMA | 7 |
| MMA | 15 |
| EGDMA | 0.5 |
| TEGDVE | 0.1 |
| AE | 1.4 |
| V-64 | 0.5 |
| UV2 | 0.9 |
| RBT1 | 0.01 |
| TPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used washing liquids comprising volatile organic solvent-based extraction liquids and hydration liquids consisting of volatile organic solvent-free liquids. These contact lenses contained units derived from two siloxane monomers, Si1 and Si3, and from the hydrophilic monomer, VMA. This batch of contact lenses had ophthalmically acceptably wettable lens surfaces.

In addition, these silicone hydrogel contact lenses, when fully hydrated, had an EWC of about 52% wt/wt, a modulus of about 0.58 MPa, a wet extractable content of about 0.67%, a captive bubble static contact angle of about 30 degrees; and a captive bubble dynamic advancing contact angle of about 50.1 degrees when tested at the start of the shelf life study, and had an average dimensional stability variance less than ±3.0% following storage for 22 days at 95 degrees C.

Example 4

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
|---|---|
| Si1 | 30 |
| Si2 | 10 |
| VMA | 45 |
| EGMA | 7 |
| MMA | 15 |
| EGDMA | 0.5 |
| TEGDVE | 0.1 |
| AE | 1.4 |
| V-64 | 0.5 |
| UV2 | 0.9 |
| RBT1 | 0.01 |
| TPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used washing liquids comprising volatile organic solvent-based extraction liquids and hydration liquids consisting of volatile organic solvent-free liquids. These contact lenses contained units derived from two siloxane monomers, Si1 and Si2, and from the hydrophilic monomer, VMA. This batch of contact lenses had ophthalmically acceptably wettable lens surfaces.

In addition, these silicone hydrogel contact lenses, when fully hydrated, had an EWC from 53% wt/wt to 54% wt/wt, a modulus of about 0.43 MPa, a wet extractable content of about 1.23% wt/wt, a captive bubble static contact angle of about 38 degrees, a captive bubble dynamic advancing contact angle of about 50.0 degrees, an ionoflux from 2.5 to 3.0 ($\times 10^{-3}$ mm$^2$/min), a Dk of 70 barrers, an elongation of about 450%, a tensile strength of 1.40 MPa, a percent transmittance of 98%, an energy loss of 36%, and a swell factor of about 21% when tested at the start of the shelf life study, and had an average dimensional stability variance less than ±3.0% following storage for 20 days at 95 degrees C. When tested prior to extraction and hydration, the polymeric lens bodies had a dry extractable content of about 17% wt/wt.

Example 5

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
|---|---|
| Si1 | 30 |
| Si2 | 10 |
| VMA | 48 |
| EGMA | 7 |
| MMA | 15 |
| EGDMA | 0.5 |
| TEGDVE | 0.1 |
| AE | 1.4 |
| V-64 | 0.5 |
| UV2 | 0.9 |
| RBT1 | 0.01 |
| TPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used washing liquids comprising volatile organic solvent-based extraction liquids and hydration liquids consisting of volatile organic solvent-free liquids. These contact lenses contained units derived from two siloxane monomers, Si1 and Si2, and from the hydrophilic monomer, VMA. This batch of contact lenses had ophthalmically acceptably wettable lens surfaces.

In addition, these silicone hydrogel contact lenses had, when fully hydrated, an oxygen permeability greater than 60 barrers, an EWC of about 53% wt/wt, an ionoflux of about 2.90 ($\times 10^{-3}$ mm$^2$/min), a modulus of about 0.40 MPa, an elongation of about 425%, a tensile strength of about 1.4 MPa, a static captive bubble contact angle of about 37 degrees, a dynamic captive bubble advancing contact angle from about 48 to 52 degrees, a light transmittance of about 98%, a wet extractable content of about 1.30% wt/wt, an energy loss from about 35% to about 36%, and a swell factor of about 21% when tested at the start of the shelf life study, and had an average dimensional stability variance of less than plus or minus 3.0% after storage for at least 2 weeks at 80 degrees C.

Example 6

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
|---|---|
| Si1 | 32 |
| Si3 | 4 |
| VMA | 40 |
| EGMA | 5 |
| MMA | 12 |
| TEGDMA | 1.0 |
| TEGDVE | 0.3 |
| BVE | 7 |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si3, and from the mixture of hydrophilic monomers, VMA and BVE. This batch of contact lenses had ophthalmically acceptably wettable lens surfaces.

In addition, these silicone hydrogel contact lenses had, when fully hydrated, an EWC of about 55% wt/wt, an ionoflux from about 3.1 ($\times 10^{-3}$ mm$^2$/min), a Dk of about 72 barrers, a modulus of about 0.70 MPa, an elongation of about 345%, a tensile strength of about 2.4 MPa, a water break up time greater than 20 seconds, a wet extractable component of about 3.9% wt/wt, and an energy loss of about 40% when tested at the start of the shelf life study, and had an average dimensional stability variance less than plus or minus 3.0% after storage for more than 2 weeks at 80 degrees C. When tested prior to extraction and hydration, the polymeric lens bodies had a dry extractable component of about 11% wt/wt.

Example 7

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
|---|---|
| Si1 | 32 |
| Si3 | 4 |
| VMA | 50 |
| MMA | 14 |
| TEGDMA | 0.8 |
| TEGDVE | 0.2 |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si3, and from the hydrophilic monomer, VMA. This batch of contact lenses had ophthalmically acceptably wettable lens surfaces.

In addition, these silicone hydrogel contact lenses, when fully hydrated, had an EWC of about 58% wt/wt, an ionoflux from about 4.14 ($\times 10^{-3}$ mm$^2$/min), a modulus of about 0.77 MPa, an elongation of about 349%, a tensile strength of about 1.75 MPa, a water break up time greater than 20 seconds, a wet extractable content of about 4.42% wt/wt, and an energy loss of about 41% when tested at the start of the shelf life study, and had an average dimensional stability variance less than plus or minus 3.0% after storage for at least 2 weeks at 80 degrees C.

Example 8

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
|---|---|
| Si1 | 23 |
| Si2 | 15 |
| VMA | 40 |
| MMA | 10 |
| EGMA | 5 |
| BVE | 7 |
| TEGDMA | 1.0 |
| TEGDVE | 0.1 |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2, and from the mixture of hydrophilic monomers, VMA and BVE. This batch of contact lenses had ophthalmically acceptably wettable lens surfaces.

In addition, these silicone hydrogel contact lenses, when fully hydrated, had an EWC of about 55% wt/wt, an ionoflux from about 4.19 ($\times 10^{-3}$ mm$^2$/min), a modulus of about 0.61 MPa, an elongation of about 275%, a tensile strength of about 1.51 MPa, a water break up time greater than 20 seconds, and a wet extractable component of about 4.10% wt/wt when tested at the start of the shelf life study, and had an average dimensional stability variance less than plus or minus 3.0% for more than 2 weeks at 80 degrees C.

Example 9

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
|---|---|
| Si1 | 23 |
| Si2 | 15 |
| VMA | 45 |
| MMA | 10 |
| BVE | 7 |
| TEGDMA | 1.0 |
| TEGDVE | 0.1 |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2, and from the mixture of hydrophilic monomers, VMA and BVE. This batch of contact lenses had ophthalmically acceptably wettable lens surfaces.

In addition, these silicone hydrogel contact lenses, when fully hydrated, had an EWC of about 58% wt/wt, an ionoflux from about 2.75 ($\times 10^{-3}$ mm$^2$/min), a modulus of about 0.66 MPa, an elongation of about 216%, a tensile strength of about 0.87 MPa, a water break up time greater than 20 seconds, and a wet extractable component of about 4.56% wt/wt when tested at the start of the shelf life study, and had an average dimensional stability variance less than plus or minus 3.0% after storage for 6 days at 95 degrees C.

Example 10

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
|---|---|
| Si1 | 26 |
| Si2 | 10 |
| VMA | 40 |
| MMA | 12 |
| EGMA | 5 |
| BVE | 7 |
| TEGDMA | 1.2 |
| TEGDVE | 0.1 |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2, and from the mixture of hydrophilic monomers, VMA and BVE. This batch of contact lenses had ophthalmically acceptably wettable lens surfaces.

In addition, these silicone hydrogel contact lenses, when fully hydrated, had an EWC of about 56% wt/wt, an ionoflux from about 3.54 ($\times 10^{-3}$ mm$^2$/min), a modulus of about 0.57 MPa, an elongation of about 310%, a tensile strength of about 1.90 MPa, a water break up time greater than 20 seconds, a wet extractable component of about 4.74% wt/wt, and an energy loss from about 34 to 36% when tested at the start of the shelf life study, and had an average dimensional stability variance less than plus or minus 3.0% after storage for 7 days at 80 degrees C. When tested prior to extraction and hydration, the polymeric lens bodies had a dry extractable component of about 14.39% wt/wt.

Example 11

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
|---|---|
| Si1 | 26 |
| Si2 | 10 |
| VMA | 45 |
| MMA | 12 |
| EGMA | 2 |
| BVE | 5 |
| TEGDMA | 1.2 |
| TEGDVE | 0.2 |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2, and from the mixture of hydrophilic monomers, VMA and BVE. This batch of contact lenses had ophthalmically acceptably wettable lens surfaces.

In addition, these silicone hydrogel contact lenses, when fully hydrated, had an EWC of about 57% wt/wt, an ionoflux from about 3.68 ($\times 10^{-3}$ mm$^2$/min), a modulus of about 0.69 MPa, an elongation of about 314%, a tensile strength of about 1.30 MPa, a water break up time greater than 20 seconds, a wet extractable component of about 1.81% wt/wt, and an energy loss of about 34% when tested at the start of the shelf life study, and had an average dimensional stability variance less than plus or minus 3.0% after storage for 14 days at 80 degrees C.

Example 12

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
|---|---|
| Si1 | 26 |
| Si3 | 2 |
| Si2 | 10 |
| VMA | 45 |
| MMA | 12 |
| BVE | 5 |
| TEGDMA | 1.2 |
| TEGDVE | 0.2 |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from three siloxane monomers, Si1, Si2 and Si3, and from the mixture of hydrophilic monomers, VMA and BVE. This batch of contact lenses had ophthalmically acceptably wettable lens surfaces.

In addition, these silicone hydrogel contact lenses, when fully hydrated, had an EWC of about 55% wt/wt, an ionoflux from about 3.06 ($\times 10^{-3}$ mm$^2$/min), a modulus of about 0.85 MPa, an elongation of about 284%, a tensile strength of about 1.88 MPa, a water break up time greater than 20 seconds, a wet extractable component of about 2.38% wt/wt, and an energy loss of about 36% when tested at the start of the shelf life study, and had an average dimensional stability variance less than plus or minus 3.0% after storage for 14 days at 80 degrees C.

Example 13

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
|---|---|
| Si1 | 26 |
| Si2 | 10 |
| VMA | 40 |
| MMA | 12 |
| EGMA | 5 |
| BVE | 7 |
| TEGDMA | 1.3 |
| TEGDVE | 0.2 |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2, and from the mixture of hydrophilic monomers, VMA and BVE. This batch of contact lenses had ophthalmically acceptably wettable lens surfaces.

In addition, these silicone hydrogel contact lenses, when fully hydrated, had an EWC of about 54% wt/wt, an ionoflux from about 3.57 ($\times 10^{-3}$ mm$^2$/min), a modulus of about 0.66 MPa, an elongation of about 274%, a tensile strength of about 1.40 MPa, and a wet extractable content of about 3.8% wt/wt when tested at the start of the shelf life study, and had an average dimensional stability variance less than plus or minus 3.0% after storage for 7 days at 80 degrees C.

Example 14

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
|---|---|
| Si1 | 26 |
| Si3 | 2 |
| Si2 | 10 |
| VMA | 45 |
| MMA | 12 |
| BVE | 5 |
| TEGDMA | 1.1 |
| TEGDVE | 0.2 |

| Chemical Compound (Abbrev.) | Unit amount |
| --- | --- |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from three siloxane monomers, Si1, Si2 and Si3, and from the mixture of hydrophilic monomers, VMA and BVE. This batch of contact lenses had ophthalmically acceptably wettable lens surfaces.

In addition, these silicone hydrogel contact lenses, when fully hydrated, had a modulus of about 0.81 MPa, an elongation of about 351%, a tensile strength of about 1.61 MPa, and EWC from 30% wt/wt to 70% wt/wt when tested at the start of the shelf life study, and had an average dimensional stability variance less than plus or minus 3.0% for 14 days at 80 degrees C.

Example 15

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
| --- | --- |
| Si1 | 26 |
| Si3 | 2 |
| Si2 | 10 |
| VMA | 40 |
| EGMA | 15 |
| BVE | 7 |
| TEGDMA | 1.6 |
| TEGDVE | 0.2 |
| V-64 | 0.5 |
| UV2 | 0.9 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from three siloxane monomers, Si1, Si2 and Si3, and from the mixture of hydrophilic monomers, VMA and BVE. This batch of contact lenses had ophthalmically acceptably wettable lens surfaces.

In addition, these silicone hydrogel contact lenses, when fully hydrated, had an ionoflux from about 3.33 ($\times 10^{-3}$ mm$^2$/min), a modulus of about 0.74 MPa, and an elongation of about 222% when tested at the start of the shelf life study, and had an average dimensional stability variance less than plus or minus 3.0% for 14 days at 80 degrees C.

Example 16

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
| --- | --- |
| Si1 | 32 |
| Si3 | 4 |
| VMA | 45 |
| MMA | 13 |
| EGMA | 3 |
| BVE | 3 |
| TEGDMA | 1.0 |
| TEGDVE | 0.2 |
| V-64 | 0.5 |
| UV2 | 1.3 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si3, and from the mixture of hydrophilic monomers, VMA and BVE. This batch of contact lenses had ophthalmically acceptably wettable lens surfaces.

In addition, these silicone hydrogel contact lenses, when fully hydrated, had an EWC of about 57% wt/wt, a modulus of about 0.70 MPa, an energy loss of about 40%, and a captive bubble dynamic advancing contact angle of from about 50 to about 60 degrees when tested at the start of the shelf life study, and had an average dimensional stability variance less than plus or minus 3.0% for 14 days at 80 degrees C.

Example 17

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
| --- | --- |
| Si1 | 26 |
| Si2 | 10 |
| VMA | 40 |
| MMA | 12 |
| EGMA | 5 |
| BVE | 7 |
| TEGDMA | 1.2 |
| TEGDVE | 0.2 |

| Chemical Compound (Abbrev.) | Unit amount |
| --- | --- |
| V-64 | 0.5 |
| UV2 | 1.3 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2, and from the mixture of hydrophilic monomers, VMA and BVE. This batch of contact lenses had ophthalmically acceptably wettable lens surfaces.

In addition, these silicone hydrogel contact lenses, when fully hydrated, had an EWC of about 56% wt/wt, a modulus of about 0.50 MPa, and a captive bubble dynamic advancing contact angle of from about 47 to about 51 degrees when tested at the start of the shelf life study, and had an average dimensional stability variance less than plus or minus 3.0% for 4.4 weeks at 80 degrees C.

Example 18

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
| --- | --- |
| Si1 | 26 |
| Si2 | 10 |
| VMA | 40 |
| MMA | 12 |
| EGMA | 5 |
| BVE | 3 |
| EGDMA | 0.5 |
| TEGDVE | 0.1 |
| V-64 | 0.5 |
| UV2 | 1.3 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2, and from the mixture of hydrophilic monomers, VMA and BVE. This batch of contact lenses had ophthalmically acceptably wettable lens surfaces.

In addition, these silicone hydrogel contact lenses, when fully hydrated, had an EWC of about 55% wt/wt, a modulus of about 0.60 MPa, and a captive bubble dynamic advancing contact angle of from about 47 to about 55 degrees when tested at the start of the shelf life study, and had an average dimensional stability variance less than plus or minus 3.0% after storage for 2 weeks at 80 degrees C.

Example 19

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
| --- | --- |
| Si1 | 29 |
| Si2 | 8 |
| VMA | 42 |
| MMA | 14 |
| DEGVE | 7 |
| EGDMA | 0.6 |
| TEGDVE | 0.08 |
| V-64 | 0.5 |
| UV2 | 1.3 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2, and from the mixture of hydrophilic monomers, VMA and DEGVE. This batch of contact lenses had ophthalmically acceptably wettable lens surfaces.

In addition, these silicone hydrogel contact lenses, when fully hydrated, had an EWC from about 55% wt/wt to about 56% wt/wt, a modulus of about 0.71 MPa, and a captive bubble dynamic advancing contact angle of from about 45 to about 47 degrees when tested at the start of the shelf life study, and had an average dimensional stability variance less than plus or minus 3.0% for at least 2 weeks at 80 degrees C.

Example 20

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
| --- | --- |
| Si1 | 29 |
| Si2 | 8 |
| VMA | 44 |
| MMA | 14 |
| EGVE | 5 |
| EGDMA | 0.6 |
| TEGDVE | 0.15 |

| Chemical Compound (Abbrev.) | Unit amount |
|---|---|
| V-64 | 0.5 |
| UV2 | 1.3 |
| RBT2 | 0.01 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2, and from the mixture of hydrophilic monomers, VMA and EGVE. This batch of contact lenses had ophthalmically acceptably wettable lens surfaces.

In addition, these silicone hydrogel contact lenses, when fully hydrated, had an EWC of about 56% wt/wt, and a modulus of about 0.65 MPa when tested at the start of the shelf life study, and had an average dimensional stability variance less than plus or minus 3.0% for 2 weeks at 80 degrees C.

Example 21

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
|---|---|
| Si1 | 29 |
| Si2 | 8 |
| VMA | 45 |
| MMA | 13 |
| HEMA | 4 |
| EGDMA | 0.5 |
| TEGDVE | 0.1 |
| V-64 | 0.5 |
| UV2 | 1.7 |
| RBT2 | 0.01 |
| pTPP | 0.5 |
| AE | 0.3 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2, and from the mixture of hydrophilic monomers, VMA and HEMA. This batch of contact lenses had ophthalmically acceptably wettable lens surfaces.

In addition, these silicone hydrogel contact lenses, when fully hydrated, had an EWC of from about 55% wt/wt to about 56% wt/wt, a modulus of about 0.53 MPa, a captive bubble dynamic advancing contact angle of from about 51 to about 53 degrees, and an energy loss of about 34% when tested at the start of the shelf life study, and had an average dimensional stability variance less than plus or minus 3.0% for 4.4 weeks at 80 degrees C.

Example 22

A polymerizable silicone composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
|---|---|
| Si1 | 29 |
| Si2 | 8 |
| VMA | 42 |
| MMA | 8 |
| EGMA | 6 |
| DEGVE | 7 |
| EGDMA | 0.6 |
| TEGDVE | 0.1 |
| V-64 | 0.5 |
| UV2 | 1.7 |
| RBT2 | 0.01 |
| pTPP | 0.5 |
| AE | 0.4 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2, and from the mixture of hydrophilic monomers, VMA and DEGVE. This batch of contact lenses had ophthalmically acceptably wettable lens surfaces.

In addition, these silicone hydrogel contact lenses, when fully hydrated, had an EWC from 57% wt/wt to 58% wt/wt, an ionoflux of about 2.9 ($\times 10^{-3}$ mm$^2$/min), a modulus of about 0.7 MPa, an elongation of about 300%, a tensile strength of about 1.5 MPa, a captive bubble dynamic advancing contact angle of from about 44 to about 48 degrees, a wet extractable component of about 5.10% wt/wt, and an energy loss from about 32% to about 33% when tested at the start of the shelf life study, and had an average dimensional stability variance less than plus or minus 3.0% after storage for 4.4 weeks at 80 degrees C. When tested prior to extraction and hydration, the polymeric lens bodies had a dry extractable component of about 12.2% wt/wt.

Example 23

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
|---|---|
| Si1 | 29 |
| Si2 | 8 |
| VMA | 45 |
| HOB | 7 |
| EGMA | 10 |
| EGDMA | 0.5 |
| TEGDVE | 0.1 |
| V-64 | 0.5 |
| UV2 | 1.7 |
| RBT2 | 0.01 |
| pTPP | 0.5 |
| AE | 0.3 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2, and from the mixture of hydrophilic monomers, VMA and HOB. This batch of contact lenses had ophthalmically acceptably wettable lens surfaces.

In addition, these silicone hydrogel contact lenses, when fully hydrated, had an EWC from about 55% wt/wt to about 56% wt/wt, an ionoflux of about 4.1 ($\times 10^{-3}$ mm$^2$/min), a modulus of about 0.6 MPa, an elongation of about 275%, a tensile strength of about 1.2 MPa, a captive bubble dynamic advancing contact angle of from about 55 to about 58 degrees, a wet extractable component of about 4.6% wt/wt, an energy loss from about 31% to about 32%, and a swell factor of about 27% when tested at the start of the shelf life study, and had an average dimensional stability variance less than plus or minus 3.0% for after storage for 4.4 weeks at 80 degrees C. When tested prior to extraction and hydration, the polymeric lens bodies had a dry extractable component of about 10.6% wt/wt.

Example 24

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
|---|---|
| Si1 | 30 |
| Si2 | 7 |
| VMA | 44 |
| MMA | 8 |
| EGMA | 6 |
| BVE | 4 |
| DEGVE | 10 |
| EGDMA | 0.6 |
| TEGDVE | 0.1 |
| V-64 | 0.5 |
| UV2 | 1.8 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2, and from the mixture of hydrophilic monomers, VMA. BVE and DEGVE. This batch of contact lenses had ophthalmically acceptably wettable lens surfaces.

In addition, these silicone hydrogel contact lenses, when fully hydrated, had an EWC of about 61% wt/wt, an ionoflux of about 3.8 ($\times 10^{-3}$ mm$^2$/min), a modulus of about 0.5 MPa, an elongation of about 279%, a tensile strength of about 1.2 MPa, a captive bubble dynamic advancing contact angle of from about 45 to about 47 degrees, a wet extractable component of about 4.55% wt/wt, and an energy loss from about 30% to about 33% when tested at the start of the shelf life study, and had an average dimensional stability variance less than plus or minus 3.0% after storage for 14 days at 80 degrees C. When tested prior to extraction and hydration, the polymeric lens bodies had a dry extractable component of about 13.65% wt/wt.

Example 25

A polymerizable composition was obtained by mixing and filtering the following chemical compounds in the specified amounts, using the procedure described in the Silicone Hydrogel Contact Lens Fabrication and Testing Procedure given above.

| Chemical Compound (Abbrev.) | Unit amount |
|---|---|
| Si1 | 30 |
| Si2 | 7 |
| VMA | 45 |
| MMA | 12 |
| EGMA | 5 |
| BVE | 5 |
| TEGDMA | 1.4 |
| TEGDVE | 0.2 |
| V-64 | 0.5 |
| UV2 | 1.8 |
| RBT2 | 0.01 |
| pTPP | 0.5 |

A batch of silicone hydrogel contact lenses was prepared using this formulation and tested in accordance with the fabrication procedure and test methods described in the Silicone Hydrogel Contact Lens Fabrication and Testing Procedure, using a dry demolding process, a dry delensing process, and a washing process which used extraction and hydration liquids consisting of volatile organic solvent-free extraction liquids. The lenses of this batch were not exposed to a volatile organic solvent during their manufacture. These contact lenses contained units derived from two siloxane monomers, Si1 and Si2, and from the mixture of hydrophilic monomers, VMA and BVE. This batch of contact lenses had ophthalmically acceptably wettable lens surfaces.

In addition, these silicone hydrogel contact lenses, when fully hydrated, had an EWC from about 55% wt/wt to about 57% wt/wt, an ionoflux of about 3.6 ($\times 10^{-3}$ mm$^2$/min), a modulus of about 0.7 MPa, an elongation of about 285%, a tensile strength of about 1.3 MPa, a captive bubble dynamic advancing contact angle of from about 47 to about 53 degrees, a wet extractable component of about 4.10% wt/wt, and an energy loss from about 34% to about 35% when tested at the start of the shelf life study, and had an average dimensional stability variance less than plus or minus 3.0% after storage for 14 days at 80 degrees C. When tested prior to extraction and hydration, the polymeric lens bodies were found to have a dry extractable component of about 9.80% wt/wt.

Although the disclosure herein refers to certain illustrated embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the additional disclosure.

A number of publications and patents have been cited hereinabove. Each of the cited publications and patents are hereby incorporated by reference in their entireties.

What is claimed is:

1. A silicone hydrogel contact lens, comprising:
a polymeric lens body that is the reaction product of a miscible polymerizable composition, said polymerizable composition comprising
(a) a first siloxane monomer represented by formula (1):

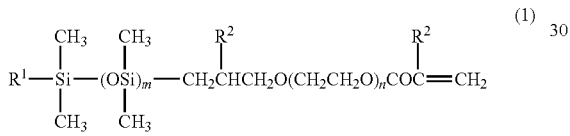

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, the first siloxane monomer having a number average molecular weight of from 400 daltons to 700 daltons;
(b) a second siloxane monomer having a number average molecular weight greater than 7,000 daltons,
wherein a total amount of siloxane monomers present in the polymerizable composition is from 30 unit parts to 50 unit parts by weight, and
(c) at least one hydrophilic amide monomer having one N-vinyl group, the hydrophilic amide monomer being present in the polymerizable composition in an amount from 30 unit parts to 60 unit parts by weight;
wherein the contact lens has ophthalmically acceptably wettable lens surfaces when fully hydrated and the contact lens has an equilibrium water content (EWC) from 30% to 70% when fully hydrated.

2. The contact lens of claim 1, wherein the contact lens has the ophthalmically acceptably wettable surfaces when the polymerizable composition used to form the polymeric lens body is free of an internal wetting agent, or when the polymerizable composition used to form the polymeric lens body is free of an organic diluent, or when the lens is washed in a liquid free of a volatile organic solvent, or when the lens is free of a surface plasma treatment, or any combination thereof.

3. The contact lens of claim 1, wherein the polymeric lens has a captive bubble dynamic advancing contact angle less than 70 degrees when fully hydrated.

4. The contact lens of claim 1, wherein the polymerizable composition is essentially free of N,N-dimethylacrylamide (DMA).

5. The contact lens of claim 1, wherein the first siloxane monomer and the second siloxane monomer are present in the polymerizable composition in a ratio from about 2:1 to about 10:1 based on unit parts.

6. The contact lens of claim 1, wherein in the first siloxane monomer, m of formula (1) is 4, n of formula (1) is 1, $R^1$ of formula (1) is a butyl group, and each $R^2$ of formula (1) is independently either a hydrogen atom or a methyl group.

7. The contact lens of claim 1, wherein the polymerizable composition is essentially free of an organic diluent.

8. A batch of silicone hydrogel contact lenses, comprising a plurality of the contact lens recited in claim 1, wherein the batch of silicone hydrogel contact lenses has an average oxygen permeability of at least 55 barrers, or an average tensile modulus from about 0.2 MPa to about 0.9 MPa when fully hydrated, or an average captive bubble dynamic advancing contact angle less than 70 degrees when fully hydrated, or an average captive bubble static contact angle less than 55 degrees when fully hydrated, or any combination thereof, based on averages of values determined for at least 20 individual lenses of the batch.

9. A method of manufacturing a silicone hydrogel contact lens, comprising:
providing a miscible polymerizable composition, said polymerizable composition comprising
(a) a first siloxane monomer represented by formula (1):

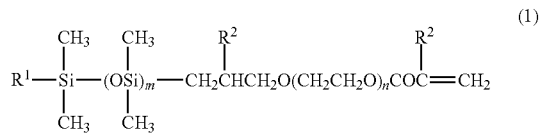

wherein m of formula (1) represents one integer from 3 to 10, n of formula (1) represents one integer from 1 to 10, $R^1$ of formula (1) is an alkyl group having from 1 to 4 carbon atoms, and each $R^2$ of formula (1) is independently either a hydrogen atom or a methyl group, the first siloxane monomer having a number average molecular weight of from 400 daltons to 700 daltons;
(b) a second siloxane monomer having a number average molecular weight greater than 7,000 daltons;
wherein a total amount of siloxane monomers present in the polymerizable composition is from 30 unit parts to 50 unit parts by weight; and
(c) at least one hydrophilic amide monomer having one N-vinyl group, the hydrophilic amide monomer being present in the polymerizable composition in an amount from 30 unit parts to 60 unit parts by weight;
polymerizing the polymerizable composition in a contact lens mold assembly to form a polymeric lens body;
contacting the polymeric lens body with a washing liquid to remove extractable material from the polymeric lens body; and
packaging the polymeric lens body in a contact lens packaging solution in a contact lens package;
wherein the contact lens has ophthalmically acceptably wettable lens surfaces when fully hydrated and the contact lens has an equilibrium water content (EWC) from 30% to 70% when fully hydrated.

10. The method of claim 9, wherein the contact lens has the ophthalmically acceptably wettable lens surfaces when the polymerizable composition used to form the polymeric lens body is free of an internal wetting agent, or when the polymerizable composition used to form the lens is free of an organic diluent, or when the lens is washed in a liquid free of a volatile organic solvent, or when the lens is free of a surface plasma treatment, or any combination thereof.

11. The method of claim 9, further comprising the step of autoclaving the contact lens package to sterilize the polymeric lens body and the contact lens packaging solution.

12. The method of claim 9, wherein in the first siloxane monomer, m of formula (1) is 4, n of formula (1) is 1, $R^1$ of formula (1) is a butyl group, and each $R^2$ of formula (1) is independently either a hydrogen atom or a methyl group.

13. The method of claim 9, wherein the polymerizing step comprises polymerizing the polymerizable composition in a contact lens mold assembly having a molding surface formed of a non-polar thermoplastic polymer to form a polymeric lens body.

14. The method of claim 9, wherein the polymerizing step comprises polymerizing the polymerizable composition in a contact lens mold assembly having a molding surface formed of a polar thermoplastic polymer to form a polymeric lens body.

15. The method of claim 9, wherein the contacting step comprises contacting the polymeric lens body with a washing liquid comprising at least one volatile organic solvent.

* * * * *